US012700379B2

(12) United States Patent
Ooga

(10) Patent No.: US 12,700,379 B2
(45) Date of Patent: Aug. 4, 2026

(54) DISPLAY DEVICE AND METHOD OF CONTROLLING BACKLIGHT

(71) Applicant: SHANGHAI TIANMA MICRO-ELECTRONICS CO., LTD., Shanghai (CN)

(72) Inventor: Kouichi Ooga, Kawasaki (JP)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 18/973,861

(22) Filed: Dec. 9, 2024

(65) Prior Publication Data

US 2025/0218408 A1 Jul. 3, 2025

(30) Foreign Application Priority Data

Dec. 27, 2023 (JP) ................................ 2023-221819

(51) Int. Cl.
*G09G 3/34* (2006.01)
*G09G 3/20* (2006.01)

(52) U.S. Cl.
CPC ........... *G09G 3/342* (2013.01); *G09G 3/2007* (2013.01); *G09G 2310/027* (2013.01); *G09G 2320/0646* (2013.01)

(58) Field of Classification Search
None
See application file for complete search history.

(56) References Cited

U.S. PATENT DOCUMENTS

2008/0117160 A1 5/2008 Oka et al.
2009/0115907 A1* 5/2009 Baba .................... G09G 3/3406 348/E5.062
2011/0248974 A1* 10/2011 Murai ............... G02F 1/133603 345/207
2017/0018231 A1* 1/2017 Liu ...................... G09G 3/3426

FOREIGN PATENT DOCUMENTS

JP 2019124784 A 7/2019

* cited by examiner

*Primary Examiner* — Matthew Yeung
(74) *Attorney, Agent, or Firm* — NIXON & VANDERHYE

(57) ABSTRACT

A display device includes a backlight including a plurality of backlight blocks, a display panel configured to display an image with light from the backlight, and a controller. The controller is configured to acquire a video frame, determine gray-level feature values to be associated with the plurality of backlight blocks from gray levels of pixels specified in the video frame, determine emission amounts for the plurality of backlight blocks from the gray-level feature values in accordance with a current conversion function, and determine whether to change the current conversion function based on results of comparison of a statistic of the emission amounts of the plurality of backlight blocks with one or more predetermined threshold emission amounts.

14 Claims, 37 Drawing Sheets

| GRAY-LEVEL FEATURE VALUES OF BACKLIGHT BLOCKS | EMISSION AMOUNTS OF BACKLIGHT BLOCKS (THRESHOLD GRAY LEVEL = 64) | EMISSION AMOUNTS OF BACKLIGHT BLOCKS (THRESHOLD GRAY LEVEL = 80) |
|---|---|---|

411

| | | | | |
|---|---|---|---|---|
| 160 | 48 | 160 | 48 | 160 |
| 160 | 160 | 160 | 160 | 160 |
| 160 | 80 | 160 | 80 | 160 |

412

| | | | | |
|---|---|---|---|---|
| 1.00 | 0.75 | 1.00 | 0.75 | 1.00 |
| 1.00 | 1.00 | 1.00 | 1.00 | 1.00 |
| 1.00 | 1.00 | 1.00 | 1.00 | 1.00 |

413

| | | | | |
|---|---|---|---|---|
| 1.00 | 0.60 | 1.00 | 0.60 | 1.00 |
| 1.00 | 1.00 | 1.00 | 1.00 | 1.00 |
| 1.00 | 1.00 | 1.00 | 1.00 | 1.00 |

*FIG. 6*

| | GRAY-LEVEL FEATURE VALUE | EMISSION AMOUNTS AND AVERAGE WHEN THRESHOLD GRAY LEVEL = 64 | EMISSION AMOUNTS AFTER FIRST CONTROL | EMISSION AMOUNTS AFTER SECOND CONTROL |
|---|---|---|---|---|
| C1 | 72 72 72 72 72<br>64 64 64 64 64<br>72 72 72 72 72 | 1.00 1.00 1.00 1.00 1.00<br>1.00 1.00 1.00 1.00 1.00<br>1.00 1.00 1.00 1.00 1.00<br>AVE = 1.0 | 0.90 0.90 0.90 0.90 0.90<br>0.80 0.80 0.80 0.80 0.80<br>0.90 0.90 0.90 0.90 0.90<br>AVE = 0.87 | NO SECOND CONTROL |
| C2 | 160 48 160 48 160<br>160 160 160 160 160<br>160 80 160 80 160 | 1.00 0.75 1.00 0.75 1.00<br>1.00 1.00 1.00 1.00 1.00<br>1.00 1.00 1.00 1.00 1.00<br>AVE = 0.97 | 1.00 0.60 1.00 0.60 1.00<br>1.00 1.00 1.00 1.00 1.00<br>1.00 1.00 1.00 1.00 1.00<br>AVE = 0.95 | 0.90 0.60 0.90 0.60 0.90<br>0.90 0.90 0.90 0.90 0.90<br>0.90 0.82 0.90 0.82 0.90<br>AVE = 0.85 |
| C3 | 48 48 48 200 200<br>200 200 200 200 200<br>200 200 200 200 200 | 0.75 0.75 0.75 1.00 1.00<br>1.00 1.00 1.00 1.00 1.00<br>1.00 1.00 1.00 1.00 1.00<br>AVE = 0.95 | 0.60 0.60 0.60 1.00 1.00<br>1.00 1.00 1.00 1.00 1.00<br>1.00 1.00 1.00 1.00 1.00<br>AVE = 0.92 | 0.60 0.60 0.60 0.94 0.94<br>0.94 0.94 0.94 0.94 0.94<br>0.94 0.94 0.94 0.94 0.94<br>AVE = 0.87 |

FIG. 16

MONOTONICALLY INCREASING FUNCTION
(COMBINATION OF UPWARD CONCAVE CURVE AND DOWNWARD CONCAVE CURVE)

MONOTONICALLY INCREASING FUNCTION
(COMBINATION OF DOWNWARD CONCAVE CURVE AND UPWARD CONCAVE CURVE)

VIDEO FRAME AND DISPLAY REGION BLOCKS

DISPLAY REGION BLOCK AND GRAY LEVELS OF PIXELS (SUBPIXELS)

| | | | | | |
|---|---|---|---|---|---|
| 48 | 255 | 255 | 255 | 255 | 120 |
| 48 | 255 | 128 | 128 | 255 | 120 |
| 44 | 255 | 128 | 128 | 255 | 120 |
| 42 | 255 | 255 | 255 | 255 | 120 |

| | | | | | |
|---|---|---|---|---|---|
| 0.75 | 1.0 | 1.0 | 1.0 | 1.0 | 1.0 |
| 0.75 | 1.0 | 1.0 | 1.0 | 1.0 | 1.0 |
| 0.688 | 1.0 | 1.0 | 1.0 | 1.0 | 1.0 |
| 0.656 | 1.0 | 1.0 | 1.0 | 1.0 | 1.0 |

CALCULATION OF EMISSION AMOUNTS

CALCULATION OF AVERAGE EMISSION AMOUNT

LS1

GRAY-LEVEL FEATURE VALUE 611A

| | | |
|---|---|---|
| 48 | 255 | 255 |
| 48 | 255 | 128 |
| 44 | 255 | 128 |
| 42 | 255 | 255 |

EMISSION AMOUNT 613A

| | | |
|---|---|---|
| 0.75 | 1.0 | 1.0 |
| 0.75 | 1.0 | 1.0 |
| 0.688 | 1.0 | 1.0 |
| 0.656 | 1.0 | 1.0 |

CONVERSION FUNCTION 401

*FIG. 25A*

LS2

GRAY-LEVEL FEATURE VALUE 611B

| | | |
|---|---|---|
| 48 | 255 | 255 |
| 48 | 255 | 128 |
| 44 | 255 | 128 |
| 42 | 255 | 255 |

EMISSION AMOUNT 613B

| | | |
|---|---|---|
| 0.667 | 1.0 | 1.0 |
| 0.667 | 1.0 | 1.0 |
| 0.611 | 1.0 | 1.0 |
| 0.583 | 1.0 | 1.0 |

CONVERSION FUNCTION 404

*FIG. 25B*

LS3

GRAY-LEVEL FEATURE VALUE 611C

| | | |
|---|---|---|
| 48 | 255 | 255 |
| 48 | 255 | 128 |
| 44 | 255 | 128 |
| 42 | 255 | 255 |

EMISSION AMOUNT 613C

| | | |
|---|---|---|
| 0.6 | 1.0 | 1.0 |
| 0.6 | 1.0 | 1.0 |
| 0.55 | 1.0 | 1.0 |
| 0.525 | 1.0 | 1.0 |

CONVERSION FUNCTION 402

*FIG. 25C*

LS4

GRAY-LEVEL FEATURE VALUE 611D

| | | |
|---|---|---|
| 48 | 255 | 255 |
| 48 | 255 | 128 |
| 44 | 255 | 128 |
| 42 | 255 | 255 |

EMISSION AMOUNT 613D

| | | |
|---|---|---|
| 0.6 | 1.0 | 1.0 |
| 0.6 | 1.0 | 0.931 |
| 0.55 | 1.0 | 0.931 |
| 0.525 | 1.0 | 1.0 |

CONVERSION FUNCTION 432

*FIG. 25D*

LS5

GRAY-LEVEL FEATURE VALUE 611E

| | | |
|---|---|---|
| 48 | 255 | 255 |
| 48 | 255 | 128 |
| 44 | 255 | 128 |
| 42 | 255 | 255 |

EMISSION AMOUNT 613E

| | | |
|---|---|---|
| 0.6 | 1.0 | 1.0 |
| 0.6 | 1.0 | 0.898 |
| 0.55 | 1.0 | 0.898 |
| 0.525 | 1.0 | 1.0 |

CONVERSION FUNCTION 433

*FIG. 25E*

RS1

GRAY-LEVEL FEATURE VALUE 631A

| | | |
|---|---|---|
| 255 | 255 | 120 |
| 128 | 255 | 120 |
| 128 | 255 | 120 |
| 255 | 255 | 120 |

EMISSION AMOUNT 633A

| | | |
|---|---|---|
| 1.0 | 1.0 | 1.0 |
| 1.0 | 1.0 | 1.0 |
| 1.0 | 1.0 | 1.0 |
| 1.0 | 1.0 | 1.0 |

CONVERSION FUNCTION 401

FIG. 26A

RS2

GRAY-LEVEL FEATURE VALUE 631B

| | | |
|---|---|---|
| 255 | 255 | 120 |
| 128 | 255 | 120 |
| 128 | 255 | 120 |
| 255 | 255 | 120 |

EMISSION AMOUNT 633B

| | | |
|---|---|---|
| 1.0 | 1.0 | 1.0 |
| 1.0 | 1.0 | 1.0 |
| 1.0 | 1.0 | 1.0 |
| 1.0 | 1.0 | 1.0 |

CONVERSION FUNCTION 404

FIG. 26B

RS3

GRAY-LEVEL FEATURE VALUE 631C

| | | |
|---|---|---|
| 255 | 255 | 120 |
| 128 | 255 | 120 |
| 128 | 255 | 120 |
| 255 | 255 | 120 |

EMISSION AMOUNT 633C

| | | |
|---|---|---|
| 1.0 | 1.0 | 1.0 |
| 1.0 | 1.0 | 1.0 |
| 1.0 | 1.0 | 1.0 |
| 1.0 | 1.0 | 1.0 |

CONVERSION FUNCTION 402

FIG. 26C

RS4

GRAY-LEVEL FEATURE VALUE 631D

| | | |
|---|---|---|
| 255 | 255 | 120 |
| 128 | 255 | 120 |
| 128 | 255 | 120 |
| 255 | 255 | 120 |

EMISSION AMOUNT 633D

| | | |
|---|---|---|
| 1.0 | 1.0 | 0.926 |
| 0.931 | 1.0 | 0.926 |
| 0.931 | 1.0 | 0.926 |
| 1.0 | 1.0 | 0.926 |

CONVERSION FUNCTION 432

*FIG. 26D*

RS5

GRAY-LEVEL FEATURE VALUE 631E

| | | |
|---|---|---|
| 255 | 255 | 120 |
| 128 | 255 | 120 |
| 128 | 255 | 120 |
| 255 | 255 | 120 |

EMISSION AMOUNT 633E

| | | |
|---|---|---|
| 1.0 | 1.0 | 0.892 |
| 0.898 | 1.0 | 0.892 |
| 0.898 | 1.0 | 0.892 |
| 1.0 | 1.0 | 0.892 |

CONVERSION FUNCTION 433

*FIG. 26E*

| | | | | | |
|---|---|---|---|---|---|
| 48 | 255 | 255 | 255 | 255 | 120 |
| 48 | 255 | 128 | 128 | 255 | 120 |
| 44 | 255 | 128 | 128 | 255 | 120 |
| 42 | 255 | 255 | 255 | 255 | 120 |
| 42 | 255 | 255 | 255 | 255 | 120 |
| 44 | 255 | 128 | 128 | 255 | 120 |
| 48 | 255 | 128 | 128 | 255 | 120 |
| 48 | 255 | 255 | 255 | 255 | 120 |

GRAY-LEVEL FEATURE VALUES OF BACKLIGHT BLOCKS

EMISSION AMOUNTS OF BACKLIGHT BLOCKS

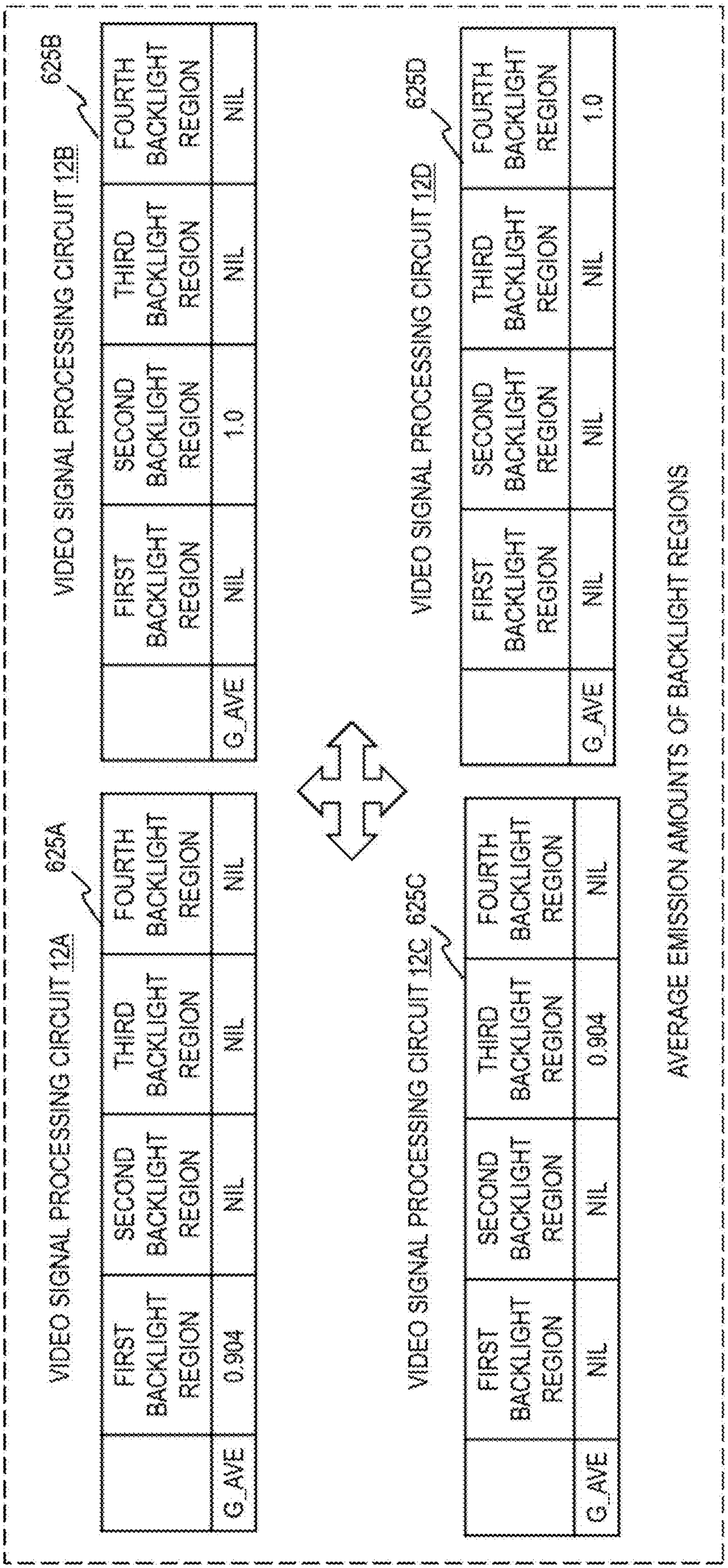

VIDEO SIGNAL PROCESSING CIRCUIT 12A

| | FIRST BACKLIGHT REGION | SECOND BACKLIGHT REGION | THIRD BACKLIGHT REGION | FOURTH BACKLIGHT REGION |
|---|---|---|---|---|
| G_AVE | 0.904 | NIL | NIL | NIL |

VIDEO SIGNAL PROCESSING CIRCUIT 12B

| | FIRST BACKLIGHT REGION | SECOND BACKLIGHT REGION | THIRD BACKLIGHT REGION | FOURTH BACKLIGHT REGION |
|---|---|---|---|---|
| G_AVE | NIL | 1.0 | NIL | NIL |

VIDEO SIGNAL PROCESSING CIRCUIT 12C

| | FIRST BACKLIGHT REGION | SECOND BACKLIGHT REGION | THIRD BACKLIGHT REGION | FOURTH BACKLIGHT REGION |
|---|---|---|---|---|
| G_AVE | NIL | NIL | 0.904 | NIL |

VIDEO SIGNAL PROCESSING CIRCUIT 12D

| | FIRST BACKLIGHT REGION | SECOND BACKLIGHT REGION | THIRD BACKLIGHT REGION | FOURTH BACKLIGHT REGION |
|---|---|---|---|---|
| G_AVE | NIL | NIL | NIL | 1.0 |

AVERAGE EMISSION AMOUNTS OF BACKLIGHT REGIONS

FIG. 30

| | FIRST BACKLIGHT REGION | SECOND BACKLIGHT REGION | THIRD BACKLIGHT REGION | FOURTH BACKLIGHT REGION |
|---|---|---|---|---|
| G_AVE | 0.904 | 1.0 | 0.904 | 1.0 |
| UNIFIED_G_AVE | 0.952 | | | |

MANAGEMENT INFORMATION ON AVERAGE EMISSION AMOUNT COMMON TO ALL VIDEO SIGNAL PROCESSING CIRCUITS

DISPLAY DEVICE AND METHOD OF CONTROLLING BACKLIGHT

CROSS-REFERENCE TO RELATED APPLICATIONS

This non-provisional application claims priority under 35 U.S.C. § 119(a) on Patent Application No. 2023-221819 filed in Japan on Dec. 27, 2023 and Patent Application No. 2024-185915 filed in Japan on Oct. 22, 2024, the entire contents of which are hereby incorporated by reference.

BACKGROUND

This disclosure relates to control of the backlight of a display device.

A technology called local dimming is used to reduce the power consumption of the backlight of a liquid crystal display device and improve the contrast ratio in the displayed image. Local dimming divides the light emitting plane of the backlight into a plurality of blocks and controls the emission amount of each block individually by increasing or decreasing it depending on the brightness in the video frame.

For example, in displaying a white window in a full black background, the local dimming controls the backlight so that the region (blocks) opposite the region to display the white window will emit more light (at higher luminance) and the region (blocks) opposite the region to display the background (in black) will emit less light.

Such control achieves reduction in the power for the backlight, compared to the case where the whole backlight lights at 100% all the time. Furthermore, the increased difference in luminance between the region emitting a large amount of light and the region emitting a small amount of light provides a higher contrast ratio in the same plane, which improves the display quality.

SUMMARY

A display device according to an aspect of this disclosure includes a backlight including a plurality of backlight blocks, a display panel configured to display an image with light from the backlight, and a controller. The controller is configured to acquire a video frame, determine gray-level feature values to be associated with the plurality of backlight blocks from gray levels of pixels specified in the video frame, determine emission amounts for the plurality of backlight blocks from the gray-level feature values in accordance with a current conversion function, and determine whether to change the current conversion function based on results of comparison of a statistic of the emission amounts of the plurality of backlight blocks with one or more predetermined threshold emission amounts.

It is to be understood that both the foregoing general description and the following detailed description are exemplary and explanatory and are not restrictive of this disclosure.

BRIEF DESCRIPTION OF THE DRAWINGS

FIG. 6 provides examples of gray-level feature values and emission amounts of backlight blocks for one frame.

FIG. 16 provides results of the control in the fifth embodiment for gray-level feature values based on some video frames.

FIG. 25A provides relations between gray-level feature values and emission amounts in a first backlight region.

FIG. 25B provides relations between gray-level feature values and emission amounts in the first backlight region.

FIG. 25C provides relations between gray-level feature values and emission amounts in the first backlight region.

FIG. 25D provides relations between gray-level feature values and emission amounts in the first backlight region.

FIG. 25E provides relations between gray-level feature values and emission amounts in the first backlight region.

FIG. 26A provides relations between gray-level feature values and emission amounts in a second backlight region.

FIG. 26B provides relations between gray-level feature values and emission amounts in the second backlight region.

FIG. 26C provides relations between gray-level feature values and emission amounts in the second backlight region.

FIG. 26D provides relations between gray-level feature values and emission amounts in the second backlight region.

FIG. 26E provides relations between gray-level feature values and emission amounts in the second backlight region.

FIG. 30 provides average emission amounts of four backlight regions calculated by the associated four video signal processing circuits.

EMBODIMENTS

Figure 1:
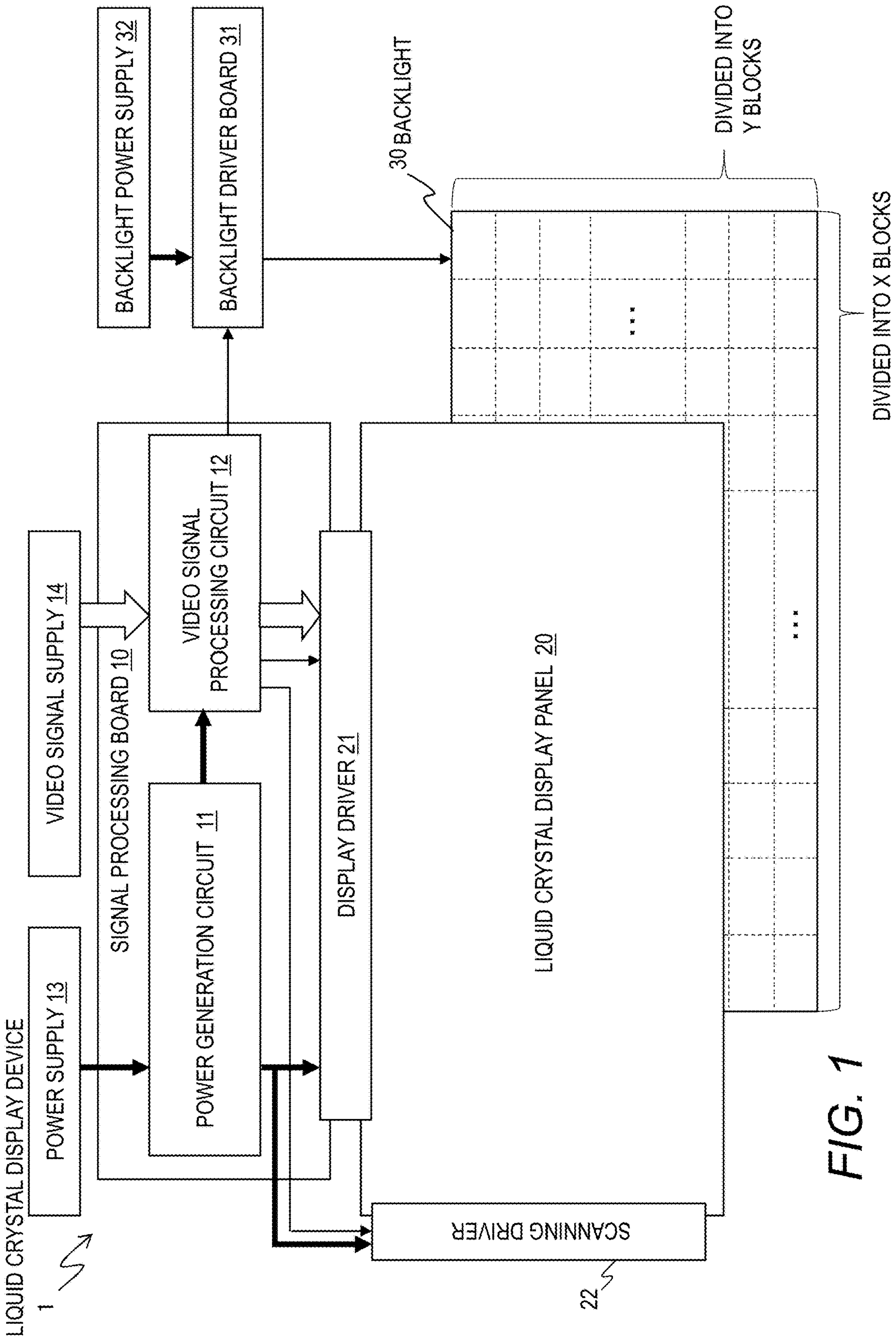
FIG. 1 illustrates a configuration example of a display device in an embodiment of this disclosure.

Hereinafter, embodiments of this disclosure will be described with reference to the accompanying drawings. It should be noted that the embodiments are merely examples to implement this disclosure and are not to limit the technical scope of this disclosure. Elements common to the drawings are denoted by the same reference signs and some elements in the drawings are exaggerated in size or shape for clear understanding of the description.

An embodiment of this disclosure describes local dimming (LD) control for the backlight of a display device. The local dimming control divides the backlight into a plurality of blocks (backlight blocks) and controls the emission amounts of the backlight blocks depending on the gray levels of individual pixels specified in video data.

A method of local dimming control is considered as follows: using one threshold gray level, the method performs luminance reduction control that reduces the luminance of a backlight block more for a lower input gray level if the input gray level is lower than the threshold gray level and does not perform such control if the input gray level is equal to or higher than the threshold gray level.

According to this method, however, when all the gray levels of an input image are higher than the threshold gray level, the emission amount of the backlight has to be 100% and the power saving effect of the backlight is not attained. If the threshold gray level is raised to increase the power saving effect, the emission amount of the backlight for a low gray-level image becomes too small, so that the display quality may degrade.

Hereinafter, display devices in the embodiments of this disclosure will be described specifically. The display devices in the embodiments of this disclosure determine emission amounts of individual backlight blocks from gray-level data of a video frame with a conversion function. The display devices determine whether to change the conversion function to be used next based on the determined emission amounts and change the conversion function if predetermined conditions are satisfied. This configuration achieves effective power saving while suppressing degradation of display quality.

First Embodiment

FIG. 1 illustrates a configuration example of a display device in an embodiment of this disclosure. The display device displays an image by controlling transmission of light from the backlight. FIG. 1 illustrates a configuration example of a liquid crystal display device 1 as an example of a display device. The liquid crystal display device 1 includes a signal processing board 10, a power supply 13, a video signal supply 14, a liquid crystal display panel 20, a display driver 21, and a scanning driver 22. The liquid crystal display device 1 further includes a backlight 30, a backlight driver board 31, and a backlight power supply 32. The signal processing board 10 includes a power generation circuit 11 and a video signal processing circuit 12. The signal processing board 10, the display driver 21, and the scanning driver 22 can be included in the controller for controlling the liquid crystal display panel 20.

The liquid crystal display device 1 displays a picture in accordance with video data input from the external. The video data includes video frames (also simply referred to as frames) to be displayed successively. The liquid crystal display panel 20 is disposed in front (on the viewer side) of the backlight 30 and controls the amount of the light from the backlight 30 to be transmitted therethrough to display successively input video frames (images).

The power generation circuit 11 can include a DC-DC converter; it generates and supplies electric power for the other circuits to operate. The video signal processing circuit 12 performs processing involved in displaying a picture, such as generating a signal for displaying an image on the liquid crystal display panel 20 and a signal for controlling the backlight 30. The power supply 13 supplies electric power to the power generation circuit 11. The video signal supply 14 supplies a video signal to the video signal processing circuit 12 in accordance with video data from the external.

The power generation circuit 11 generates electric power to drive ICs such as the video signal processing circuit 12, the display driver 21, and the scanning driver 22. The display driver 21 and the scanning driver 22 are configured to operate to perform their processing, using the power supplied from the power generation circuit 11.

The display driver 21 generates a data signal from the video signal sent from the video signal processing circuit 12 and supplies the data signal to the liquid crystal display panel 20. The scanning driver 22 selects scanning lines of the liquid crystal display panel 20 one by one in accordance with a timing signal sent from the video signal processing circuit 12. The video signal processing circuit 12 also sends the timing signal to the display driver 21 and the display driver 21 generates a data signal from the received video signal and supplies the data signal to the liquid crystal display panel 20 in accordance with the timing signal.

The video signal processing circuit 12 converts the data arrangement of the video signal input from the external to send it to the display driver 21 and generates and sends the timing signal for the display driver 21 and the scanning driver 22 to operate, using the power supplied from the power generation circuit 11.

The video signal processing circuit 12 further generates a driving control signal for controlling the driving of a plurality of backlight blocks included in the backlight 30 and sends the driving control signal to the backlight driver board 31. A backlight block can be simply referred to as block. Examples of the driving control signal include a backlight ON/OFF control signal and a dimming control signal. The dimming control signal is a signal for controlling a pulse width modulation (PWM) signal for controlling the lighting periods of light sources by time sharing and the amounts of electric current flowing in the light sources.

The backlight 30 is a planar light source device disposed behind the liquid crystal display panel 20 to emit light required for the liquid crystal display panel 20 to display an image. The backlight driver board 31 includes a backlight driver circuit and controls the emission amount (luminance) of the backlight 30 in accordance with the driving control signal sent from the video signal processing circuit 12. The backlight driver board 31 operates using the power supplied from the backlight power supply 32.

The liquid crystal display device 1 employs local dimming. In the configuration example of FIG. 1, the backlight 30 is divided into X blocks (regions) along the x-axis and Y blocks along the y-axis. Each backlight block has a rectangular shape and the backlight blocks are disposed in a matrix.

The backlight 30 consists of a plurality of backlight block rows. Each backlight block row consists of backlight blocks aligned in the x-axis direction (row direction). In an example, all backlight block rows include the same number of backlight blocks. Although it is stated that all backlight block rows have the same number of backlight blocks for convenience of explanation, each backlight block row can have a different number of backlight blocks.

From another point of view, the backlight 30 consists of a plurality of backlight block columns. Each backlight block column consists of backlight blocks aligned in the y-axis direction (column direction). All backlight block columns have the same number of backlight blocks. Although it is stated that all backlight block columns have the same number of backlight blocks for convenience of explanation, ach backlight block column can have a different number of backlight blocks. The backlight blocks can be disposed in a layout other than the matrix layout.

The liquid crystal display device 1 can individually control the emission amounts of the (X×Y) blocks. The liquid crystal display device 1 controls the emission amount of each block individually by increasing or decreasing it depending on the brightness of the pixels in the video frame in order to reduce the power consumption and improve the contrast ratio.

The backlight 30 can be a direct backlight, which includes a light source array disposed within the backlight plane to be opposite the liquid crystal display panel 20 and a diffuser panel between the light source array and the liquid crystal display panel 20. A typical example of the light source is an LED. One or more LEDs can be disposed in each block. A desirable number of LEDs can be included in one block. An optimum number of LEDs are disposed at optimum locations based on the luminance efficiency and luminance distribution of the LEDs.

Instead of the above-described direct type, the backlight 30 can be of an edge type, which includes a light guide panel and light sources disposed on the sides. The light-emitting area of the backlight 30 can be composed of blocks disposed in a matrix or blocks disposed in a horizontal or vertical line.

The video signal processing circuit 12 generates a driving control signal for controlling the emission amounts of individual blocks of the backlight 30 and sends the driving control signal to the backlight driver board 31. The backlight driver board 31 drives and controls the light sources (for example, LEDs) of the backlight 30 so that the individual blocks light at the emission amounts specified in the driving control signal from the video signal processing circuit 12.

The video signal processing circuit 12 generates a timing signal for the display driver 21 and the scanning driver 22 in accordance with the timing signal for the input video signal and also, successively sends a signal (frame signal) of each video frame in the video signal to the display driver 21. The frame signal can specify gray levels of individual pixels in a video frame. In full-color display, each pixel specifies a gray level of the color of red (R), green (G), or blue (B); in monochrome display, each pixel specifies a gray level of the color of white.

The video signal processing circuit 12 further analyzes the video frame, generates a driving control signal for the backlight 30 to illuminate the liquid crystal display panel 20 from its behind based on the analysis result, and sends the driving control signal to the backlight 30. The driving control signal to the backlight 30 is a driving control signal for the analyzed video frame or a video frame following the analyzed video frame. The following description is based on an assumption that the driving control signal to the backlight 30 be for a video frame following the analyzed video frame. This configuration enables processing with a smaller amount of memory.

As described above, the liquid crystal display device 1 employs local dimming. The video signal processing circuit 12 determines provisional emission amounts for individual blocks of the backlight 30 based on the analysis result on a video frame. Furthermore, the video signal processing circuit 12 determines adjusted emission amounts for individual backlight blocks based on the provisional emission amounts for the backlight blocks. The adjusted emission amount includes the provisional emission amount maintained in view of the determination that no adjustment is necessary. The video signal processing circuit 12 determines the adjusted emission amounts to be the emission amounts for the individual backlight blocks to light.

The video signal processing circuit 12 generates driving control signals corresponding to the adjusted emission amounts and outputs them to individual backlight blocks. The relation between the adjusted emission amount and the driving control signal is predetermined for each backlight block. A driving control signal specifies the actual emission amount of a backlight block. In an example, the driving control signal specifies the duty ratio of the pulse width in the pulse width modulation (PWM) for power control.

Figure 2:
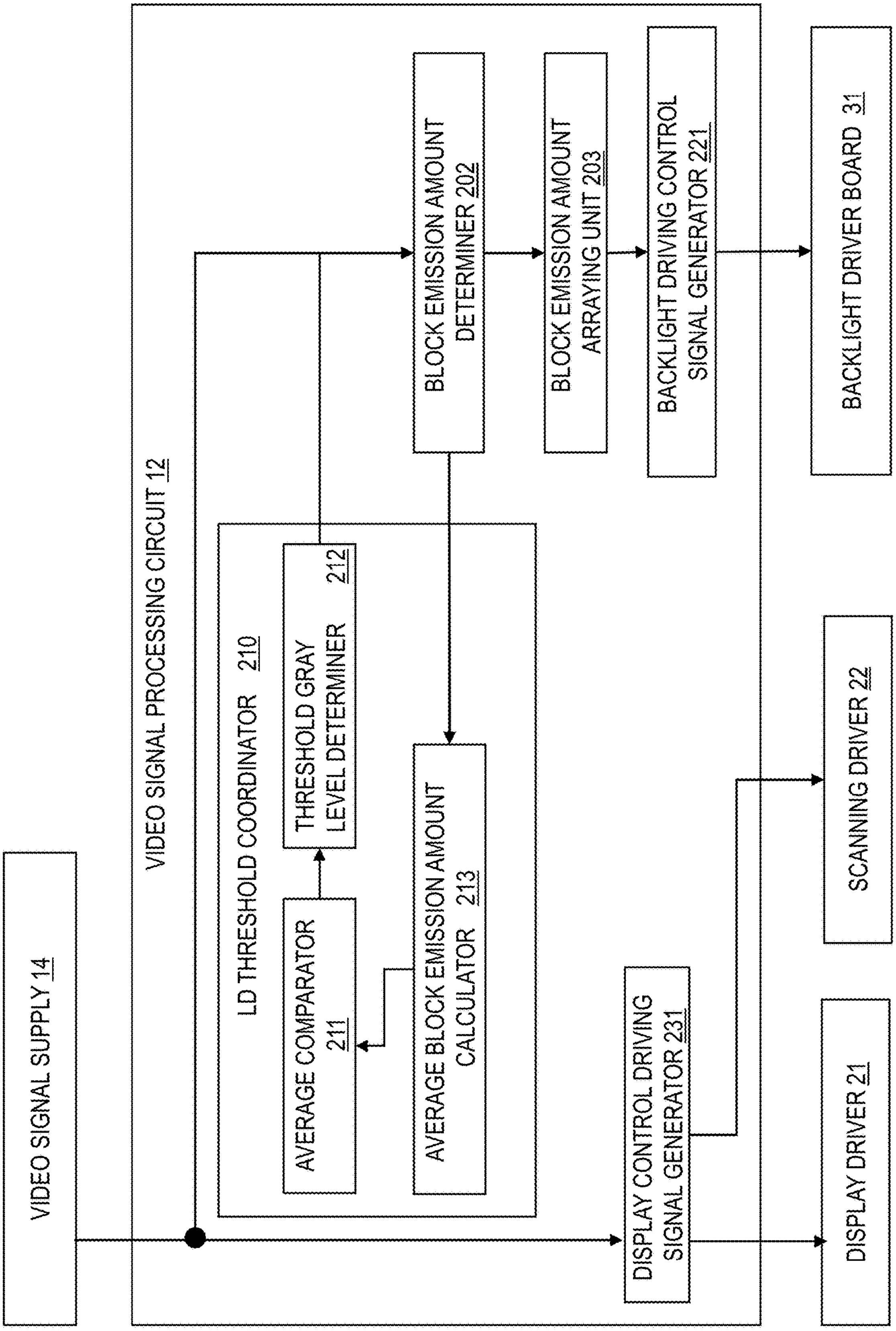
FIG. 2 schematically illustrates an example of the functional configuration of a video signal processing circuit.

Hereinafter, control of the backlight 30 by the video signal processing circuit 12 is described in detail. FIG. 2 schematically illustrates an example of the functional configuration of the video signal processing circuit 12. The video signal processing circuit 12 includes a display control driving signal generator 231, a block emission amount determiner 202, a block emission amount arraying unit 203, a local dimming (LD) threshold coordinator 210, and a backlight driving control signal generator 221. The LD threshold coordinator 210 includes an average comparator 211, a threshold gray level determiner 212, and an average block emission amount calculator 213.

The display control driving signal generator 231 generates signals to be sent to the display driver 21 and the scanning driver 22 from a video signal received from the video signal supply 14. The display control driving signal generator 231 sends the display driver 21 a signal specifying the gray level of each pixel in a video frame together with a timing signal and sends the scanning driver 22 the timing signal.

The block emission amount determiner 202 and the block emission amount arraying unit 203 determine emission amounts for individual backlight blocks based on the gray levels of pixels specified in a video frame. Specifically, the block emission amount determiner 202 determines emission amounts for individual blocks of the backlight 30 based on the gray levels of the pixels of a video frame.

The block emission amount determiner 202 determines a gray-level feature value from the gray levels of the pixels in a part of the display region (also referred to as display region block) opposite a backlight block by a predetermined method. Each backlight block is associated with the opposite display region block. The gray-level feature value can be a statistic of the gray levels in the display region block; it can be the maximum, the mean, or the mode. From the standpoint of the display quality and the scale of the operational circuit, the maximum is preferred.

The block emission amount determiner 202 has a function for relating gray-level feature values to block emission amounts. The block emission amount determiner 202 calculates an emission amount for a backlight block by inputting a gray-level feature value to the function. The emission amount of a backlight block is a normalized relative value ranging from 0 to 1. The block emission amount determiner 202 forwards the emission amounts of individual backlight blocks to the LD threshold coordinator 210.

The block emission amount determiner 202 determines a function (relation) to determine an emission amount from a gray-level feature value based on a threshold gray level acquired from the LD threshold coordinator 210. The LD threshold coordinator 210 in this example determines a threshold gray level for the current video frame based on the backlight block emission amount for a previous video frame and forwards the determined threshold gray level to the block emission amount determiner 202.

The average block emission amount calculator 213 calculates the average of the emission amounts of all backlight blocks for one video frame received from the block emission amount determiner 202. The average comparator 211 compares the average of the emission amounts calculated by the average block emission amount calculator 213 with predetermined one or more threshold emission amounts to make determination on them. The threshold gray level determiner 212 determines a threshold gray level based on the determination result of the average comparator 211 and forwards it to the block emission amount determiner 202. The details of the processing of the LD threshold coordinator 210 will be described later.

The block emission amount arraying unit 203 generates an array of the emission amounts for the backlight blocks calculated by the block emission amount determiner 202. In the array, individual blocks of the backlight 30 are associated with the emission amounts therefor. The block emission amount arraying unit 203 forwards the generated array of the emission amounts to the backlight driving control signal generator 221.

The backlight driving control signal generator 221 acquires the emission amounts determined for the individual backlight blocks from the block emission amount arraying unit 203 and generates driving control signals in accordance therewith. For example, the backlight driving control signal generator 221 generates driving control signals that make the specified emission amounts conform to the physical characteristics of the light sources included in individual backlight blocks. The backlight driving control signal generator 221 sends the driving control signals for the individual backlight blocks to the backlight driver board 31. It should be noted that the actual luminance (emission amounts) of different backlight blocks can be the same or different even if the relative values of the emission amounts for those backlight blocks are the same value.

Figure 3:
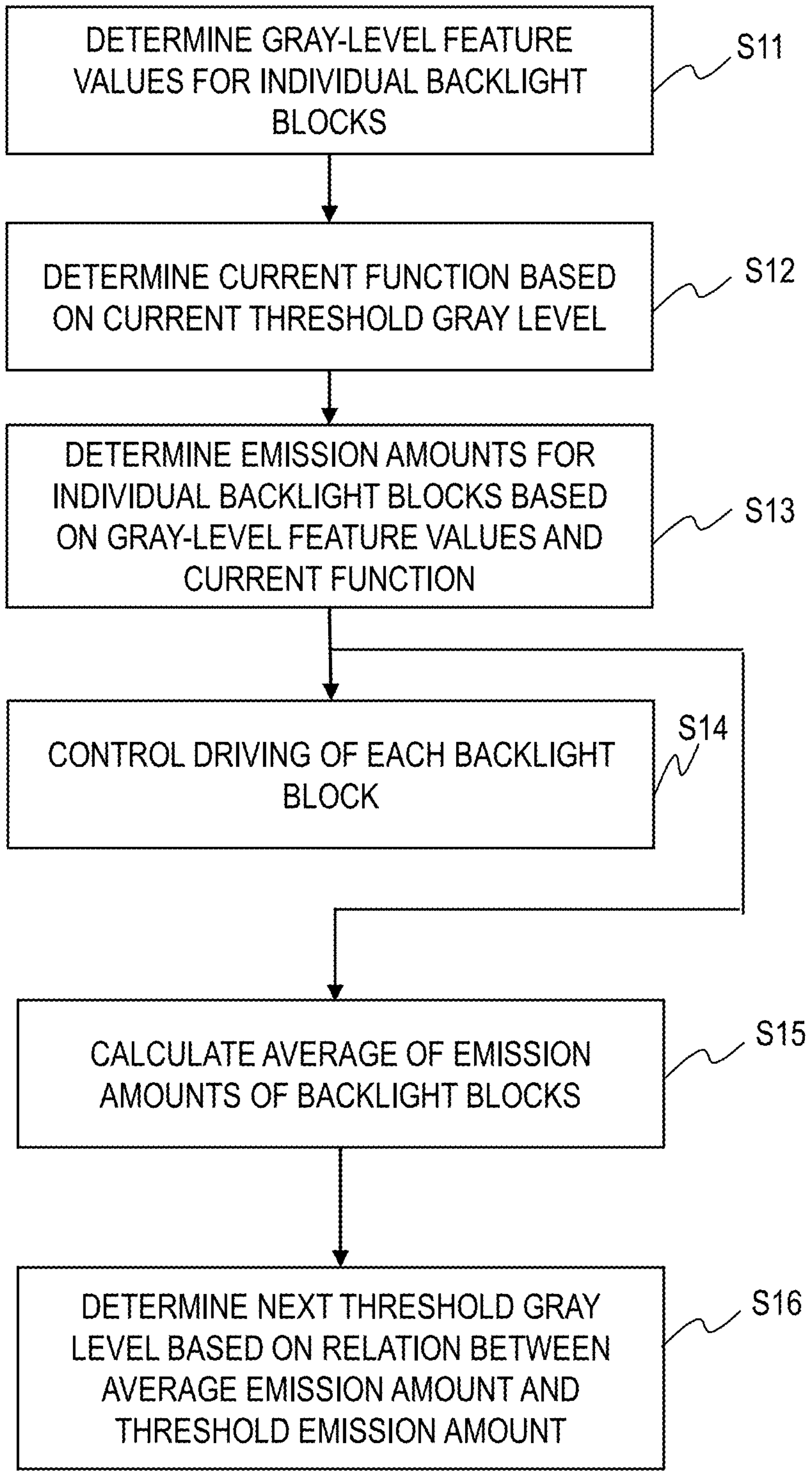
FIG. 3 is a flowchart of an example of the overall processing of the video signal processing circuit to control the emission amounts of backlight blocks.

FIG. 3 is a flowchart of an example of the overall processing of the video signal processing circuit 12 to control the emission amounts of backlight blocks. The flowchart of FIG. 3 illustrates the processing for one video frame.

The block emission amount determiner 202 analyzes the gray levels of the pixels of the video frame received from the video signal supply 14 and determines gray-level feature values to be associated with individual backlight blocks (S11). The gray-level feature value is a statistic determined by a predetermined method from the gray levels of individual pixels in a pixel group (a region composed of a plurality of pixels) that is associated with a backlight block in advance. The gray-level feature value in this example is the highest gray level in the pixel group associated with the backlight block.

Next, the block emission amount determiner 202 determines the current function based on the current threshold gray level acquired from the LD threshold coordinator 210 (S12). The function defines the relation between the gray-level feature value and the emission amount of a backlight block. The relation between the threshold gray level and the function is specified in advance. The block emission amount determiner 202 further determines emission amounts for individual backlight blocks based on the gray-level feature values of the backlight blocks and the current function (S13).

Next, the backlight driving control signal generator 221 controls driving of each backlight block in accordance with the emission amount determined for the backlight block (S14). Specifically, the emission amounts determined for individual backlight blocks are forwarded to the block emission amount arraying unit 203. The block emission amount arraying unit 203 generates an array of the emission amounts for the individual backlight blocks. The array associates the backlight blocks with their emission amounts. The array of emission amounts is forwarded to the backlight driving control signal generator 221.

The backlight driving control signal generator 221 acquires the emission amounts determined for individual backlight blocks from the block emission amount arraying unit 203 and generates driving control signals conforming to them. The backlight driving control signal generator 221 sends the driving control signals for individual backlight blocks to the backlight driver board 31.

The emission amounts of the backlight blocks determined at Step S13 are forwarded to the LD threshold coordinator 210. The average block emission amount calculator 213 calculates the average (arithmetic mean) of the emission amounts of the backlight blocks (S15). The average comparator 211 and the threshold gray level determiner 212 determine the next threshold gray level based on the relation between the average of the emission amounts and the threshold emission amount (S16). Regarding the average of the emission amounts, the arithmetic mean can be calculated with a smallest scale of operational circuit. However, a different calculation method or a different statistic can be employed.

For example, in displaying an image such that the most of the display region is bright and a part is dark, the calculation result of the arithmetic mean may be significantly affected by the emission amounts of the backlight blocks for the bright region. To cope with such a case, the geometric mean can be employed as the average. Alternatively, the harmonic mean can also be employed, considering that the emission amounts of individual backlight blocks are based on the gray-level feature values of the display region blocks. In view of the magnitude relation of arithmetic mean≥geometric mean≥harmonic mean, the power for the backlight can be saved more by employing the geometric mean or harmonic mean, if already knowing that high gray-level images will be displayed frequently.

Still alternatively, the root-mean-square, the weighted mean based on the distribution (histogram) of emission amounts, or the trimmed mean calculated after excluding extreme emission amounts can be employed. In the case of using a histogram, the emission amount can be determined based on the class of high frequency or the median.

Figure 4:
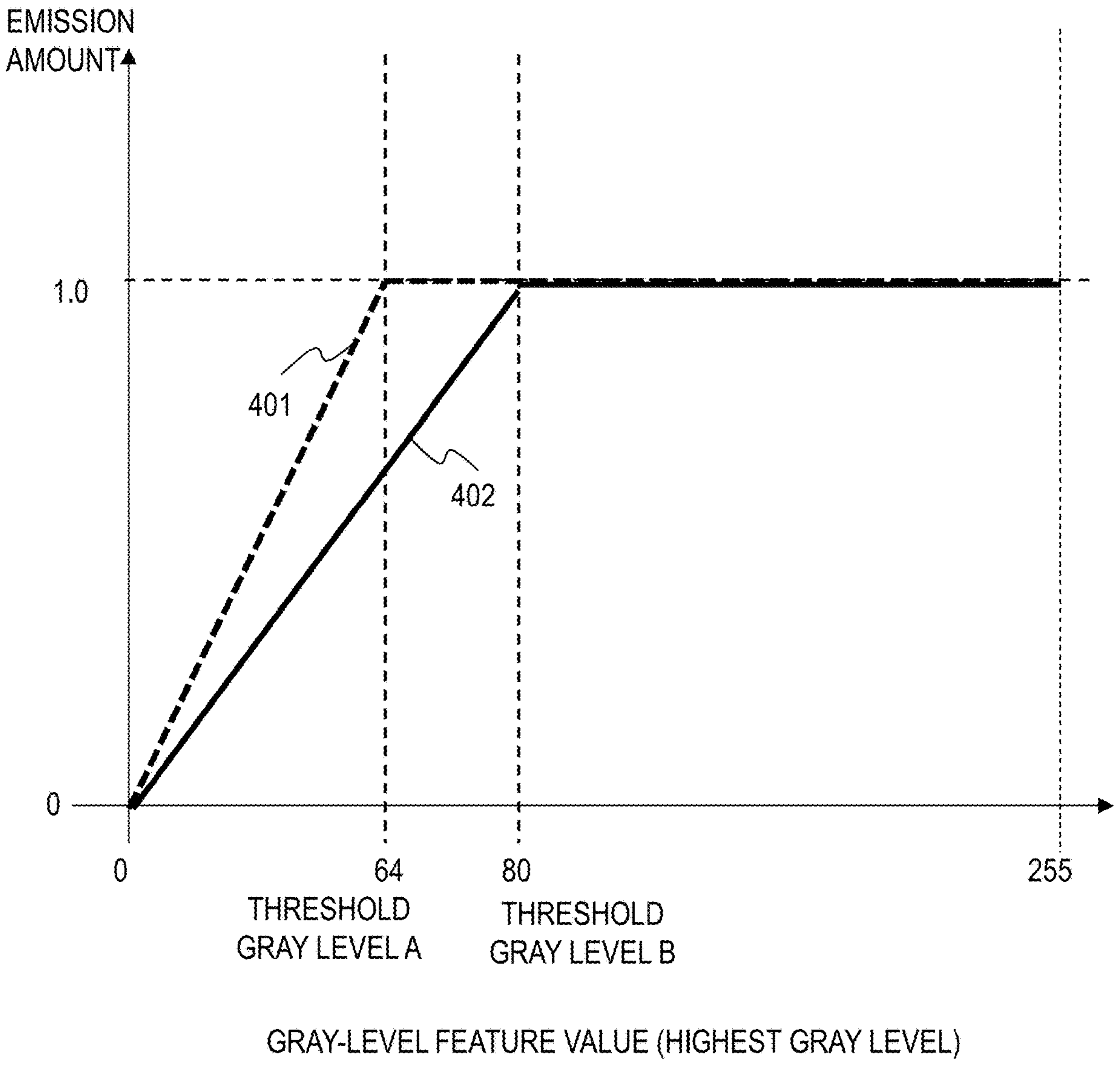
FIG. 4 provides examples of the function defining the relation between the gray-level feature value and the emission amount of a backlight block.

FIG. 4 provides examples of the function (gray-level feature value—emission amount conversion formula) defining the relation between the gray-level feature value and the emission amount of a backlight block. As described above, the block emission amount determiner 202 determines the function defining the relation between the gray-level feature value and the emission amount, depending on the threshold gray level received from the LD threshold coordinator 210. In the example of FIG. 4, the block emission amount determiner 202 selects one from two functions, depending on the designated threshold gray level.

In the graph of FIG. 4, the horizontal axis represents the gray-level feature value of a backlight block or the highest gray level in the associated pixel group. In this example, the gray level of a pixel takes one of the integers from 0 to 255. The vertical axis represents the emission amount of the backlight block. The emission amount is expressed by a relative value; the maximum value is 1 and the minimum value is 0.

The function 401 (first conversion function) is the initial function and its threshold gray level A (first threshold gray level) is 64. The function 402 (second conversion function) is a function revised from the initial function and its threshold gray level B (second threshold gray level) is 80. The emission amounts in accordance with the function 402 are equal to or less than the ones in accordance with the function 401 for all gray-level feature values and the emission amounts in accordance with the function 402 are less than the ones in accordance with the function 401 for at least a partial gray-level feature value range. The values of the threshold gray levels A and B are examples and can be other values. The threshold gray levels A and B in this example are fixed values.

The function 401 is expressed as a linear function intercepting 0 in the range where the gray-level feature value is from 0 to 64 and takes a constant value of the maximum emission amount of 1.0 in the range where the gray-level feature value is from 64 to 255. In other words, the emission amount in accordance with the initial function increases from 0 to 1.0 in the range where the gray-level feature value is from 0 to 64 and keeps the maximum value of 1.0 in the range where the gray-level feature value is from 64 to 255.

The function 402 is expressed as a linear function intercepting 0 in the range where the gray-level feature value is from 0 to 80 and takes a constant value of the maximum emission amount of 1.0 in the range where the gray-level feature value is from 80 to 255. In other words, the emission amount in accordance with the initial function increases from 0 to 1.0 in the range where the gray-level feature value is from 0 to 80 and keeps the maximum value of 1.0 in the range where the gray-level feature value is from 80 to 255.

In the range where the gray-level feature value is from 1 to 79, the emission amount in accordance with the revised function 402 is less than the emission amount in accordance with the initial function 401. Accordingly, the power consumption can be reduced more. However, since the emission amount in accordance with the revised function 402 is less than the emission amount in accordance with the initial function 401 in the low gray-level range, the emission amount for a low gray-level image becomes too small to provide good visibility of the image. An embodiment of this disclosure determines the threshold gray level depending on the overall emission amount of the backlight. Hence, the possibility that the emission amount for a low gray-level image becomes too small to provide good visibility of the image can be reduced.

Figure 5:
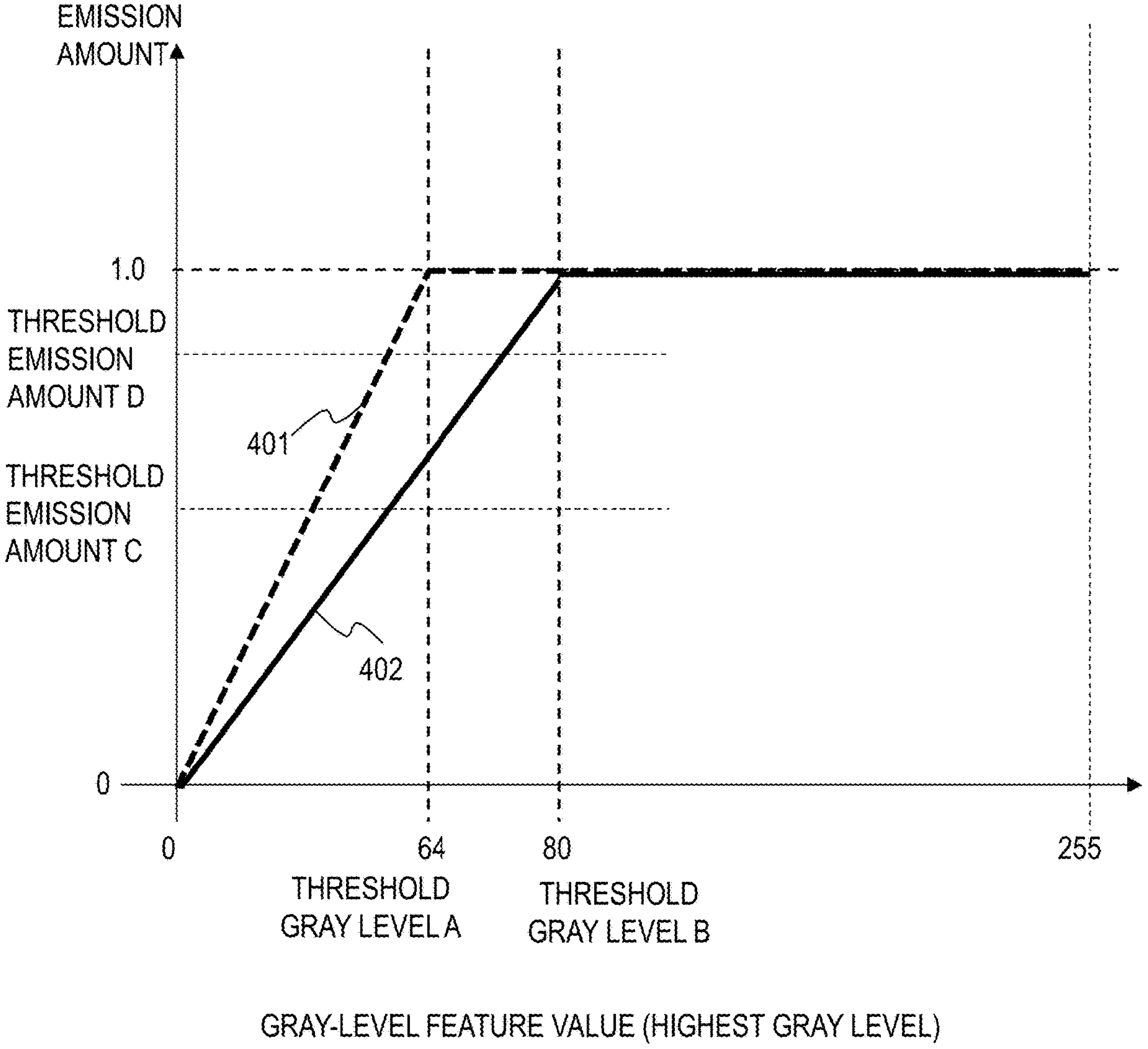
FIG. 5 illustrates relations between the threshold emission amount to be referenced to determine a threshold gray level and the function to determine the emission amount for a backlight block.

FIG. 5 illustrates relations between the threshold emission amount to be referenced to determine a threshold gray level and the function to determine the emission amount for a backlight block. In this example, two threshold emission amounts C and D are predetermined. For example, the threshold emission amount C (first threshold emission amount) is 0.5 and the threshold emission amount D (second threshold emission amount) is 0.8.

The LD threshold coordinator 210 calculates the average of the emission amounts (average emission amount) of the backlight blocks for one frame and determines the threshold gray level for the next frame based on the relations of the average emission amount with the threshold emission amounts C and D. In an embodiment of this disclosure, the LD threshold coordinator 210 determines the threshold gray level in view of the following conditions.

First Condition: Average Emission Amount≤Threshold Emission Amount C

If the average emission amount of the backlight blocks is equal to or less than the threshold emission amount C, the LD threshold coordinator 210 determines the threshold gray level to be the initial threshold gray level A. In the case where the threshold emission amount C is 0.5, the threshold gray level is determined to be 64 if the average emission amount of the backlight blocks is equal to or less than 0.5.

Second Condition: Average Emission Amount>Threshold Emission Amount D

If the average emission amount of the backlight blocks is more than the threshold emission amount D for consecutive N frames (for a predetermined number of times consecutively), the LD threshold coordinator 210 determines the threshold gray level to be a revised threshold gray level B. The revised threshold gray level B can be a fixed value or a function of the average emission amount. The value N is an integer greater than 0. In the case where N is greater than 1 (a plurality of consecutive frames), degradation in display quality or difficulty in backlight control caused by frequent changes of the threshold gray level can be reduced.

Third Condition: Threshold Emission Amount C<Average Emission Amount≤Threshold Emission Amount D If the average emission amount of the backlight blocks is more than the threshold emission amount C and equal to or less than the threshold emission amount D, the LD threshold coordinator 210 maintains the threshold gray level for the previous frame. Then, degradation in display quality or difficulty in backlight control caused by frequent changes of the threshold gray level can be reduced.

The number of predetermined threshold emission amounts can be only one; if the average emission amount is more than the threshold emission amount, the threshold gray level B is selected and if the average emission amount is equal to or less than the threshold emission amount, the threshold gray level A is selected. The condition to select the threshold gray level B can be that the average emission amount is more than the threshold emission amount for a plurality of consecutive frames.

FIG. 6 provides examples of gray-level feature values and emission amounts of backlight blocks for one frame. In the disclosed example in FIG. 6, the backlight consists of fifteen backlight blocks (five blocks along the x-axis by three blocks along the y-axis). Video data for one frame is for fifteen display region blocks opposite the fifteen backlight blocks. A gray-level feature value is determined from gray-level data for the pixels included in a display region block and the cell matrix 411 in FIG. 6 indicates the gray-level feature values of the backlight blocks. The cell matrix 412 indicates the emission amounts of the backlight blocks in the case where the threshold gray level is 64. The cell matrix 413 indicates the emission amounts of the backlight blocks in the case where the threshold gray level is 80.

The numerical values in individual cells of the cell matrix 411 are the gray-level feature values of the individual backlight blocks. The numerical values in individual cells of the cell matrices 412 and 413 are the emission amounts of the individual backlight blocks.

FIG. 6 indicates that, in the case where the threshold gray level is 64, the emission amounts of the backlight blocks having a gray-level feature value of 48 are 48/64=0.75 and in the case where the threshold gray level is 80, the emission amounts of the backlight blocks having a gray-level feature value of 48 are 48/80=0.60. As noted from this example, raising the threshold gray level leads to reduction in power consumption of the backlight.

However, raising the threshold gray level too much increases the difference in emission amount between a backlight block for a low gray level and a backlight block for a high gray level and the display quality may degrade significantly. Accordingly, the adjustment amount to the initial value (the threshold gray level B−the threshold gray level A) is determined to be in an appropriate range.

Figure 7:
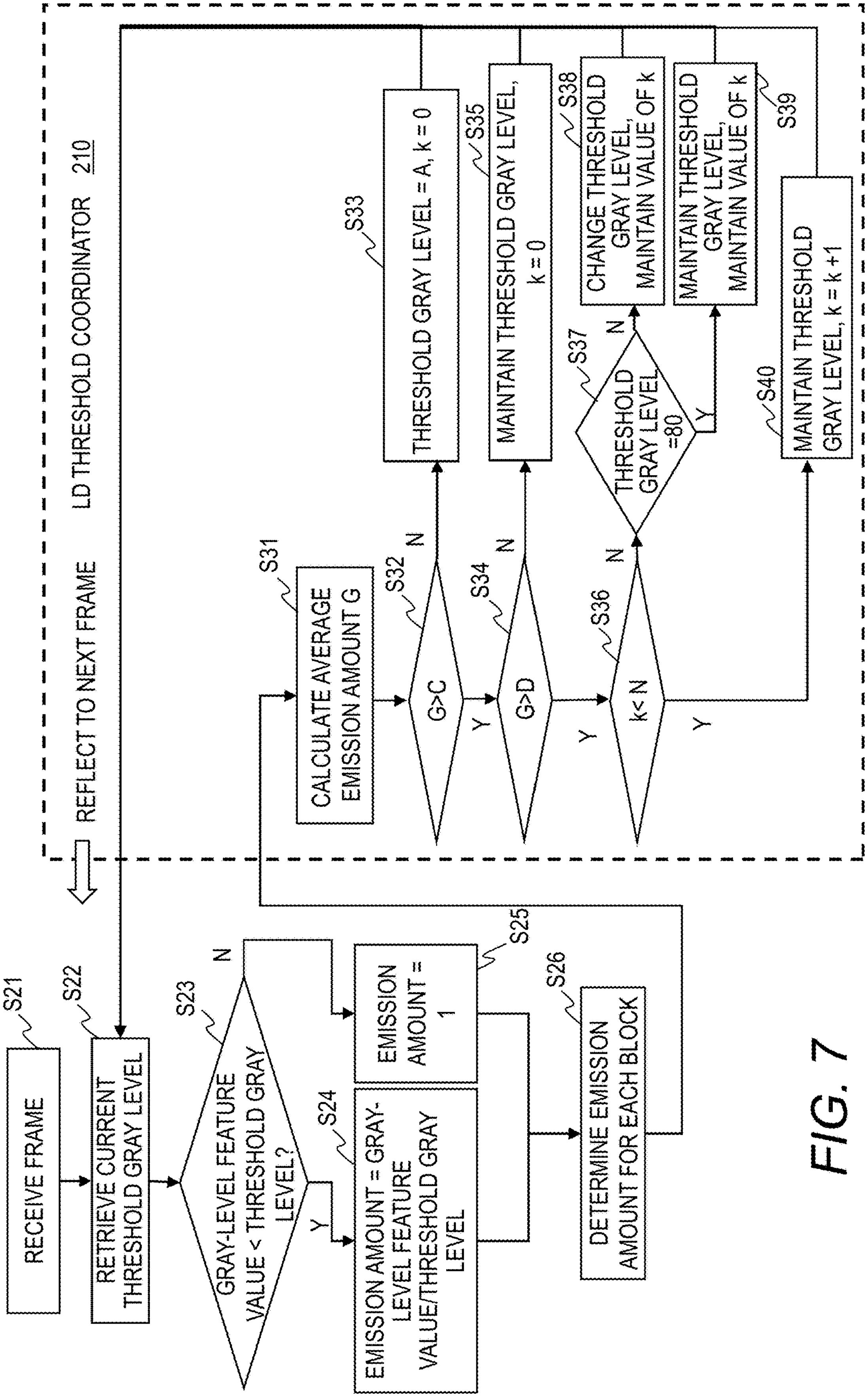
FIG. 7 is a flowchart of detailed processing of the video signal processing circuit.

FIG. 7 is a flowchart of detailed processing of the video signal processing circuit 12. The block emission amount determiner 202 receives one video frame (S21) and further, retrieves the current threshold gray level (S22). The block emission amount determiner 202 compares gray-level feature values of individual backlight blocks with the threshold gray level (S23). In the example described with reference to FIG. 5, the threshold gray level is 64 or 80.

If a gray-level feature value is equal to or higher than the threshold gray level (S23: N), the emission amount for the backlight block is determined to be 1 (S25). If the gray-level feature value is lower than the threshold gray level (S23: Y), the emission amount for the backlight block is obtained by dividing the gray-level feature value by the threshold gray level (S24). The block emission amount determiner 202 determines the emission amount calculated in accordance with the condition of the relation between the gray-level feature value and the threshold gray level to be the emission amount for the backlight block and determines emission amounts for all backlight blocks (S26).

The calculated emission amounts are forwarded to the LD threshold coordinator 210. The average block emission amount calculator 213 calculates the average emission amount G of the backlight blocks (S31). Next, the average comparator 211 compares the average emission amount G with the threshold emission amounts C and D. As indicated in FIG. 5, the threshold emission amount C is less than the threshold emission amount D.

First, the average comparator 211 compares the average emission amount G with the threshold emission amount C (S32). If the average emission amount G is equal to or less than the threshold emission amount C (S32: N), the threshold gray level determiner 212 determines the threshold gray level to be the initial threshold gray level A and further, resets the counter value k to 0 (S33). The determined threshold gray level is forwarded to the block emission amount determiner 202.

If the average emission amount G is more than the threshold emission amount C (S32: Y), the average comparator 211 compares the average emission amount G with the threshold emission amount D (S34). If the average emission amount G is equal to or less than the threshold emission amount D (S34: N), the threshold gray level determiner 212 determines to maintain the threshold gray level at the current value and further, resets the counter value k to 0 (S35). The determined threshold gray level is forwarded to the block emission amount determiner 202.

If the average emission amount G is more than the threshold emission amount D (S34: Y), the average comparator 211 compares the counter value k with a predetermined maximum value N (S36). If the counter value k has reached N (S36: N), the threshold gray level determiner 212 determines whether the current threshold gray level is the revised value 80 (S37).

If the current threshold gray level is 64 (S37: N), the threshold gray level determiner 212 changes the threshold gray level from 64 to 80 and maintains the counter value k (S38). The determined threshold gray level is forwarded to the block emission amount determiner 202. If the current threshold gray level is 80 (S37: Y), the threshold gray level determiner 212 maintains the threshold gray level at the current value of 80 and also maintains the counter value k (S39). The determined threshold gray level is forwarded to the block emission amount determiner 202.

If the determination at Step S36 is that the counter value k has not reached N (S36: Y), the threshold gray level determiner 212 maintains the threshold gray level at the current value and increments the counter value k (S40). The determined threshold gray level is forwarded to the block emission amount determiner 202.

This embodiment maintains the initial settings if sufficient power saving effect is attained with the threshold gray level and the gray-level feature value—emission amount conversion formula in the initial settings (for example, if the average emission amount is equal to or less than the threshold emission amount C), because additional power saving is unnecessary. If no power saving effect is attained with the threshold gray level and the gray-level feature value—emission amount conversion formula, this embodiment changes the threshold gray level and the gray-level feature value—emission amount conversion formula appropriately to attain power saving effect.

Second Embodiment

Hereinafter, the second embodiment of this disclosure will be described. The following mainly describes differences from the first embodiment. Unless stated otherwise, the description of the first embodiment is applicable to the second embodiment.

Figure 8:
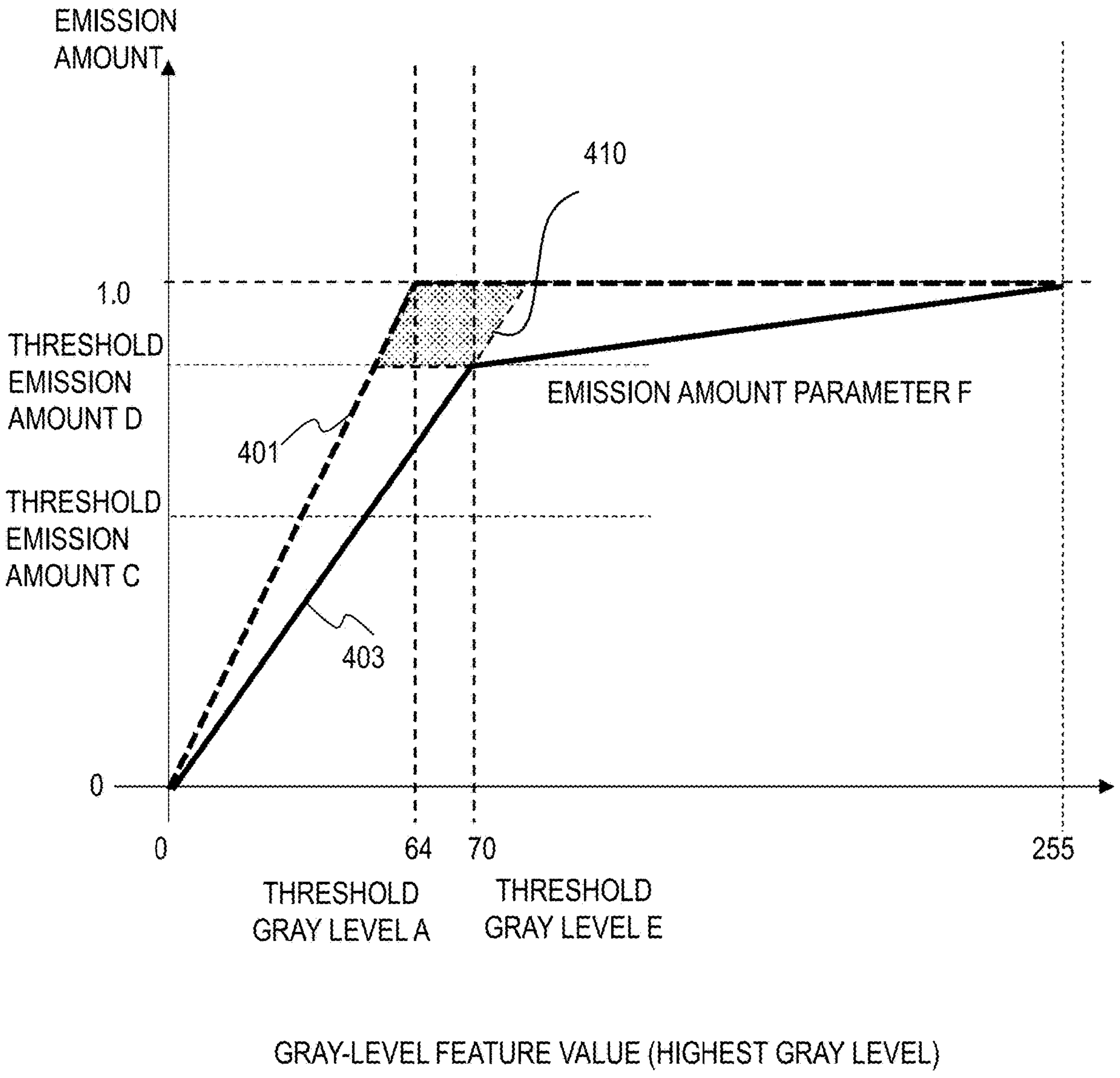
FIG. 8 provides examples of the function defining the relation between the gray-level feature value and the emission amount of a backlight block in the second embodiment.

FIG. 8 provides examples of the function (gray-level feature value—emission amount conversion formula) defining the relation between the gray-level feature value and the emission amount of a backlight block in the second embodiment. The block emission amount determiner 202 determines the function defining the relation between the gray-level feature value and the emission amount, depending on the threshold gray level received from the LD threshold coordinator 210. In the example of FIG. 8, the block emission amount determiner 202 selects one from two functions, depending on the designated threshold gray level.

In the graph of FIG. 8, the horizontal axis represents the gray-level feature value of a backlight block. The vertical axis represents the emission amount of the backlight block. The function 401 (first conversion function) is the initial function and its threshold gray level A is 64. The function 401 has the same configuration as described with reference to FIGS. 4 and 5. The function 403 (second conversion function) is a function revised from the initial function and its threshold gray level E (third threshold gray level) is 70. The emission amounts in accordance with the function 403 are equal to or less than the ones in accordance with the function 401 for all gray-level feature values and the emission amounts in accordance with the function 403 are less than the ones in accordance with the function 401 for at least a partial gray-level feature value range. The values of the threshold gray levels A and E are examples and can be other values. The threshold gray levels A and E in this example are fixed values.

The function 401 is expressed as a linear function (first linear function) monotonically increasing from 0 to 1.0 in the range where the gray-level feature value is from 0 to 64 and a constant linear function (second linear function) in the range where the gray-level feature value is from 64 to 255. The function 403 is expressed as a linear function (third linear function) monotonically increasing from 0 to an emission amount parameter F in the range where the gray-level feature value is from 0 to 70 and a linear function (fourth linear function) increasing from the emission amount parameter F to 1.0 in the range where the gray-level feature value is from 70 to 255. The slope in the range where the gray-level feature value is from 70 to 255 is smaller than the one in the range where the gray-level feature value is from 0 to 70. The emission amount parameter F takes a value greater than 0 and smaller than 1.0; for example, the value is 0.8. Although the value of the emission amount parameter F (the value of the emission amount) in the example of FIG. 8 is equal to the threshold emission amount D, these values can be different and either one can be larger.

The function 403 (revised function) in the part for the low gray-level feature value range where the gray-level feature value is from 0 to the threshold gray level E can be expressed by the following formula:

(Conversion Formula 1)

$$\text{Emission amount} = (\text{Emission amount parameter } F/\text{Threshold gray level } E) \times \text{Gray-level feature value}$$

The function 403 (revised function) in the part for the high gray-level feature value range where the gray-level feature value is from the threshold gray level E to the maximum gray level can be expressed by the following formula:

(Conversion Formula 2)

$$\text{Emission amount} = \big((1 - \text{Emission amount parameter } F)/(\text{Maximum gray level} - \text{Threshold gray level } E)\big) - (\text{Gray-level feature value} - \text{Maximum gray level}) + 1$$

For example, the emission amount parameter F can be 0.8; the threshold gray level E can be 70; and the maximum gray level can be 255.

In similar, the function 401 (initial function) can be expressed by the foregoing Conversion Formulae 1 and 2, although some parameters are changed. Specifically, the part for the low gray-level feature value range where the gray-level feature value is from 0 to the threshold gray level A can be expressed by Conversion Formula 1. The part for the high gray-level feature value range where the gray-level feature value is from the threshold gray level A to the maximum gray level can be expressed by Conversion Formula 2. The emission amount parameters in Conversion Formulae 1 and 2 are 1.0 and the threshold gray level A replaces the threshold gray level E. The threshold gray level A can be 64, for example. As understood from the above, the two functions can be defined using parameters of the emission amount parameter, the threshold gray level, and the maximum gray level.

As indicated in FIG. 8, the emission amounts in accordance with the two functions 401 and 403 take the same value when the gray-level feature value is 0 or 255 and the emission amount in accordance with the revised function 403 is less than the emission amount in accordance with the initial function 401 in the range between those values (when the gray-level feature value is in the range from 1 to 254). For this reason, the power consumption can be reduced more. Since the slope of the revised function is smaller in the high gray-level range, the effect on the display quality (degradation in luminance) can be minimized.

As noted from FIG. 8, each function for calculating the emission amount from the gray-level feature value has a folding point. This folding point can be located in a region 410. The region 410 is a rectangular region having vertices at the coordinates (A, 1.0), (0.8A, 0.8), (64, 0.8), and (80, 1.0), where A is the threshold gray level A, the gray level 80 is the allowable limit for the folding point, and the emission amount of 0.8 is the allowable limit for the folding point. The allowable limits are determined to suppress degradation of the display quality in designing the display device.

Like the first embodiment, this embodiment determines the threshold gray level depending on the overall emission amount of the backlight. Two threshold emission amounts C and D are predetermined, like in the first embodiment. The LD threshold coordinator 210 calculates the average emission amount of the backlight blocks for one frame and determines the threshold gray level for the next frame based on the relations of the average emission amount with the threshold emission amounts C and D. In this embodiment, the LD threshold coordinator 210 determines the threshold gray level in view of the following conditions.

First Condition: Average Emission Amount≤Threshold Emission Amount C

If the average emission amount of the backlight blocks is equal to or less than the threshold emission amount C, the LD threshold coordinator 210 determines the threshold gray level to be the initial threshold gray level A. In the case where the threshold emission amount C is 0.5, the threshold gray level is determined to be 64 if the average emission amount of the backlight blocks is equal to or less than 0.5.

Second Condition: Average Emission Amount>Threshold Emission Amount D

If the average emission amount of the backlight blocks is more than the threshold emission amount D for consecutive N frames (for a predetermined number of times consecutively), the LD threshold coordinator 210 determines the threshold gray level to be a revised threshold gray level E. The revised threshold gray level E can be a fixed value or a function of the average emission amount. The value N is an integer greater than 0. In the case where N is greater than 1 (a plurality of consecutive frames), degradation in display quality or difficulty in backlight control caused by frequent changes of the threshold gray level can be reduced.

Third Condition: Threshold Emission Amount C<Average Emission Amount≤Threshold Emission Amount D If the average emission amount of the backlight blocks is more than the threshold emission amount C and equal to or less than the threshold emission amount D, the LD threshold coordinator 210 maintains the threshold gray level for the previous frame. Then, degradation in display quality or difficulty in backlight control caused by frequent changes of the threshold gray level can be reduced.

The number of predetermined threshold emission amounts can be only one; if the average emission amount is more than the threshold emission amount, the threshold gray level E is selected and if the average emission amount is equal to or less than the threshold emission amount, the threshold gray level A is selected. The condition to select the threshold gray level E can be that the average emission amount is more than the threshold emission amount for a plurality of consecutive frames.

Figure 9:
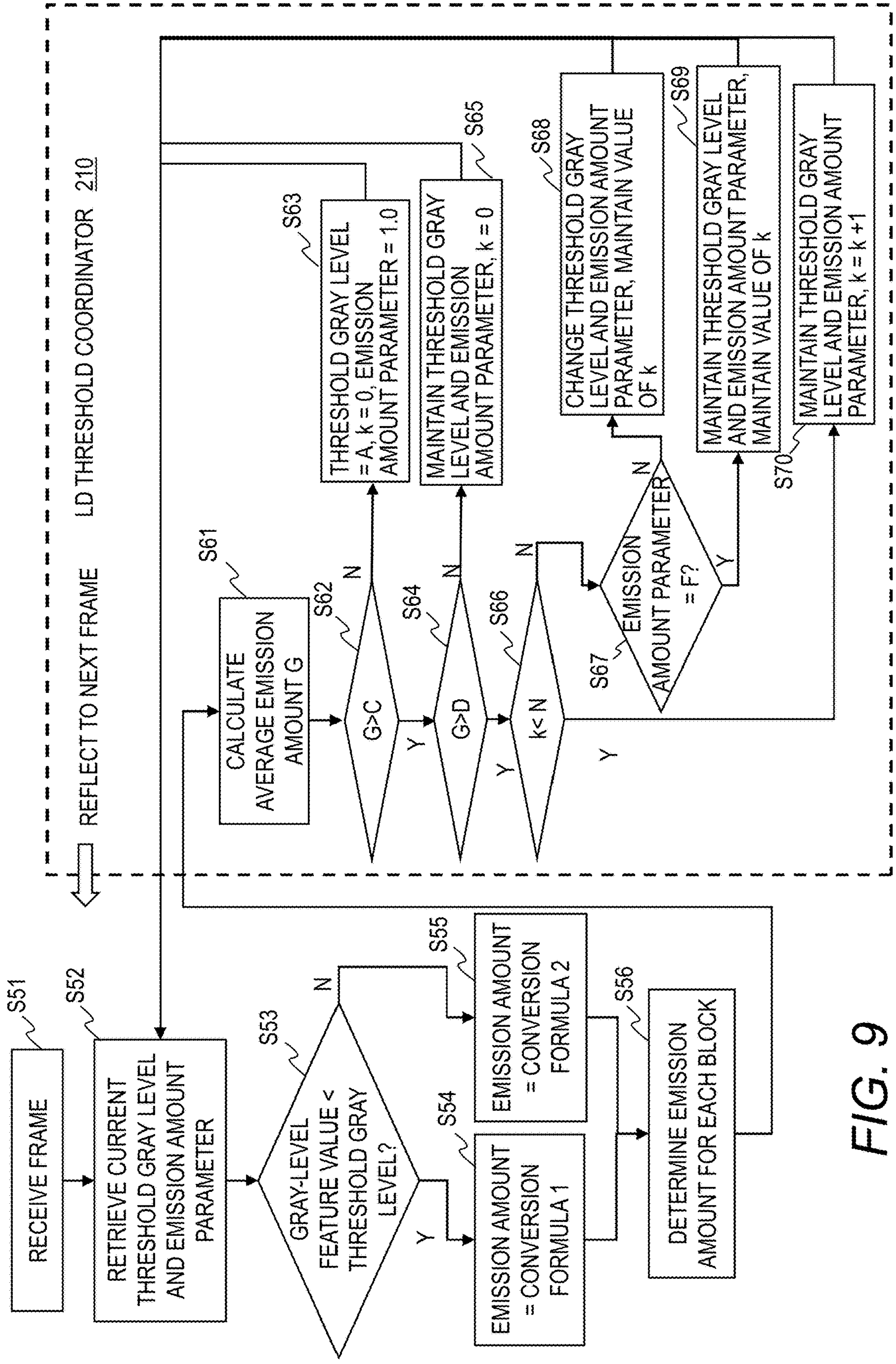
FIG. 9 is a flowchart of detailed processing of the video signal processing circuit in the second embodiment.

FIG. 9 is a flowchart of detailed processing of the video signal processing circuit 12. The block emission amount determiner 202 receives one video frame (S51) and further, retrieves the current threshold gray level and emission amount parameter. (S52). The block emission amount determiner 202 compares gray-level feature values of individual backlight blocks with the threshold gray level (S53). In the example described with reference to FIG. 8, the threshold gray level is 64 or 70.

If a gray-level feature value is lower than the threshold gray level (S53: Y), the emission amount of the backlight block is calculated by Conversion Formula 1 for the low gray-level feature value range (S54). If the gray-level feature value is equal to or higher than the threshold gray level (S53: N), the emission amount for the backlight block is calculated by Conversion Formula 2 for the high gray-level feature value range (S55).

Conversion Formula 1 in the initial function in the example of FIG. 8 is the conversion formula in the function 401 for the range where the gray-level feature value is from 0 to 64 and Conversion Formula 2 is the conversion formula in the function 401 for the range where the gray-level feature value is from 64 to 255. In similar, Conversion Formula 1 in the revised function is the conversion formula in the function 403 for the range where the gray-level feature value is from 0 to 70 and Conversion Formula 2 is the conversion formula in the function 403 for the range where the gray-level feature value is from 70 to 255.

The block emission amount determiner 202 determines the emission amount calculated in accordance with the condition of the relation between the gray-level feature value and the threshold gray level to be the emission amount for the backlight block and determines emission amounts for all backlight blocks (S56).

The calculated emission amounts are forwarded to the LD threshold coordinator 210. The average block emission amount calculator 213 calculates the average emission amount G of the backlight blocks (S61). Next, the average comparator 211 compares the average emission amount G with the threshold emission amounts C and D.

First, the average comparator 211 compares the average emission amount G with the threshold emission amount C (S62). If the average emission amount G is equal to or less than the threshold emission amount C (S62: N), the threshold gray level determiner 212 determines the threshold gray level to be the initial threshold gray level A and the emission amount parameter to be 1.0 and further, resets the counter value k to 0 (S63). The determined threshold gray level and emission amount parameter are forwarded to the block emission amount determiner 202.

If the average emission amount G is more than the threshold emission amount C (S62: Y), the average comparator 211 compares the average emission amount G with the threshold emission amount D (S64). If the average emission amount G is equal to or less than the threshold emission amount D (S64: N), the threshold gray level determiner 212 determines to maintain the threshold gray level and the emission amount parameter at the current values and further, resets the counter value k to 0 (S65). The determined threshold gray level and emission amount parameter are forwarded to the block emission amount determiner 202.

If the average emission amount G is more than the threshold emission amount D (S64: Y), the average comparator 211 compares the counter value k with a predetermined maximum value N (S66). If the counter value k has reached N (S66: N), the threshold gray level determiner 212 determines whether the current emission amount parameter is the revised value F (for example, 0.8) (S67).

If the current emission amount parameter is 1.0 and not F (S67: N), the threshold gray level determiner 212 changes the threshold gray level from 64 (threshold gray level A) to 70 (threshold gray level E) and changes the emission amount parameter from 1.0 to F. The counter value k is maintained (S68). The determined threshold gray level and emission amount parameter are forwarded to the block emission amount determiner 202.

If the current emission amount parameter is F (S67: Y), the threshold gray level determiner 212 maintains the threshold gray level at the current value and also maintains the emission amount parameter at the current value F. The counter value k is maintained (S69). The determined threshold gray level and emission amount parameter are forwarded to the block emission amount determiner 202.

If the determination at Step S66 is that the counter value k has not reached N (S36: Y), the threshold gray level determiner 212 maintains the threshold gray level and the emission amount parameter at the current values and increments the counter value k (S70). The determined threshold gray level and emission amount parameter are forwarded to the block emission amount determiner 202.

The revised function in the second embodiment produces smaller power saving effect than the initial function. The revised function produces power saving effect without significantly reducing the emission amounts of the backlight blocks for all gray levels and further, achieves reduction in power consumption in the high gray-level region.

Third Embodiment

Hereinafter, the third embodiment of this disclosure will be described. The following mainly describes differences from the first embodiment. Unless stated otherwise, the description of the first embodiment is applicable to the third embodiment. This embodiment raises the threshold gray level stepwise when high emission of the backlight continues for some time. This configuration suppresses degradation in display quality caused by sudden reduction of the emission amount while reducing the power consumption by reducing the emission amount.

Figure 10:
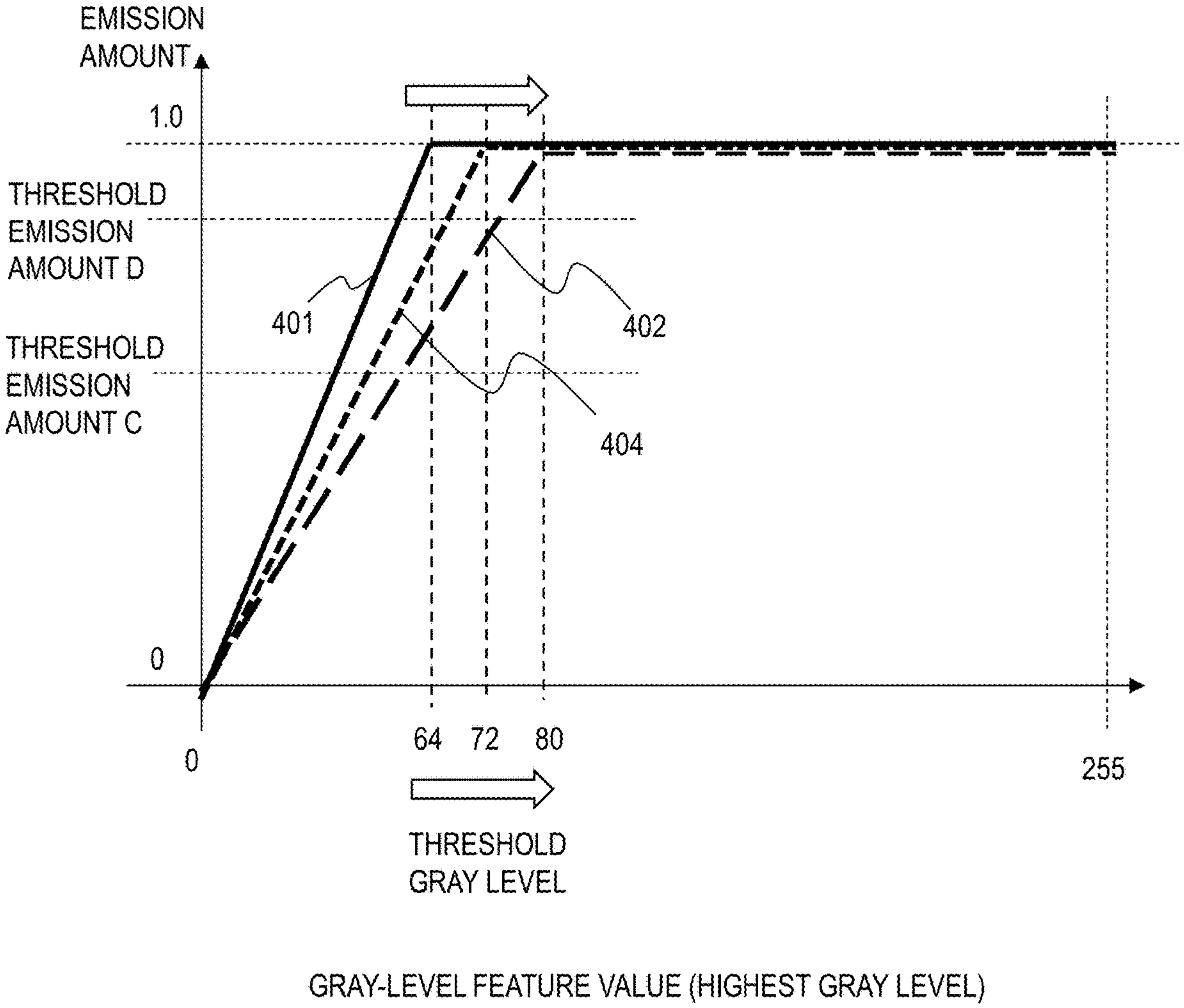
FIG. 10 schematically illustrates stepwise change of the threshold gray level in the third embodiment.

FIG. 10 schematically illustrates the stepwise change of the threshold gray level. FIG. 10 provides examples of the function (gray-level feature value—emission amount conversion formula) defining the relation between the gray-level feature value and the emission amount of a backlight block in the third embodiment. The block emission amount determiner 202 determines the function defining the relation between the gray-level feature value and the emission amount, depending on the threshold gray level received from the LD threshold coordinator 210. In the example of FIG. 10, the block emission amount determiner 202 determines the function, depending on the designated threshold gray level.

In the graph of FIG. 10, the horizontal axis represents the gray-level feature value of a backlight block. The vertical axis represents the emission amount of the backlight block. The function 401 (first conversion function) is the initial function and the initial threshold gray level (fourth threshold gray level) is 64. The function 401 has the same configuration as described with reference to FIGS. 4 and 5.

The function 404 (second conversion function) is a function revised from the initial function 401 and its threshold gray level (fifth threshold gray level) is 72. The function 404 is expressed as a linear function increasing from 0 to 1.0 in the range where the gray-level feature value is from 0 to 72 and shows a constant value of 1.0 in the range where the gray-level feature value is from 72 to 255. The difference in threshold gray level between the functions 404 and 401 is 8.

The function 402 (third conversion function) is a function revised from the function 404 and its threshold gray level (sixth threshold gray level) is 80. The function 402 has the same configuration as described with reference to FIGS. 4 and 5. The difference in threshold gray level between the functions 402 and 404 is 8. As noted from this description, the incremental step ΔJ to raise the threshold gray level stepwise is a constant. This value does not need to be a constant but can be increased or decreased stepwise.

Although the maximum threshold gray level in the example in FIG. 10 is 80, it can be a different value. Furthermore, the value for the step ΔJ for the threshold gray level is not limited to 8 and can be a smaller value, for example.

Like the first embodiment, this embodiment determines the threshold gray level depending on the overall emission amount of the backlight. Like in the first embodiment, two threshold emission amounts C and D are predetermined. The LD threshold coordinator 210 calculates the average emission amount of the backlight blocks for one frame and determines the threshold gray level for the next frame based on the relations of the average emission amount with the threshold emission amounts C and D. In this embodiment, the LD threshold coordinator 210 determines the threshold gray level in view of the following conditions.

First Condition: Average Emission Amount≤Threshold Emission Amount C

If the average emission amount of the backlight blocks is equal to or less than the threshold emission amount C, the LD threshold coordinator 210 determines the threshold gray level to be the initial threshold gray level A. In the case where the threshold emission amount C is 0.5, the threshold gray level is determined to be 64 if the average emission amount of the backlight blocks is equal to or less than 0.5.

Second Condition: Average Emission Amount>Threshold Emission Amount D

If the average emission amount of the backlight blocks is more than the threshold emission amount D for consecutive N frames (for a predetermined number of times consecutively), the LD threshold coordinator 210 raises the threshold gray level by ΔJ. The step value (adjustment amount) ΔJ can be a fixed value or a function of the latest threshold gray level. The value N is an integer greater than 0.

Third Condition: Threshold Emission Amount C<Average Emission Amount≤Threshold Emission Amount D If the average emission amount of the backlight blocks is more than the threshold emission amount C and equal to or less than the threshold emission amount D, the LD threshold coordinator 210 maintains the threshold gray level for the previous frame.

The threshold emission amounts C and D can be fixed values (their initial values can be maintained) or varied with the threshold gray level.

Figure 11:
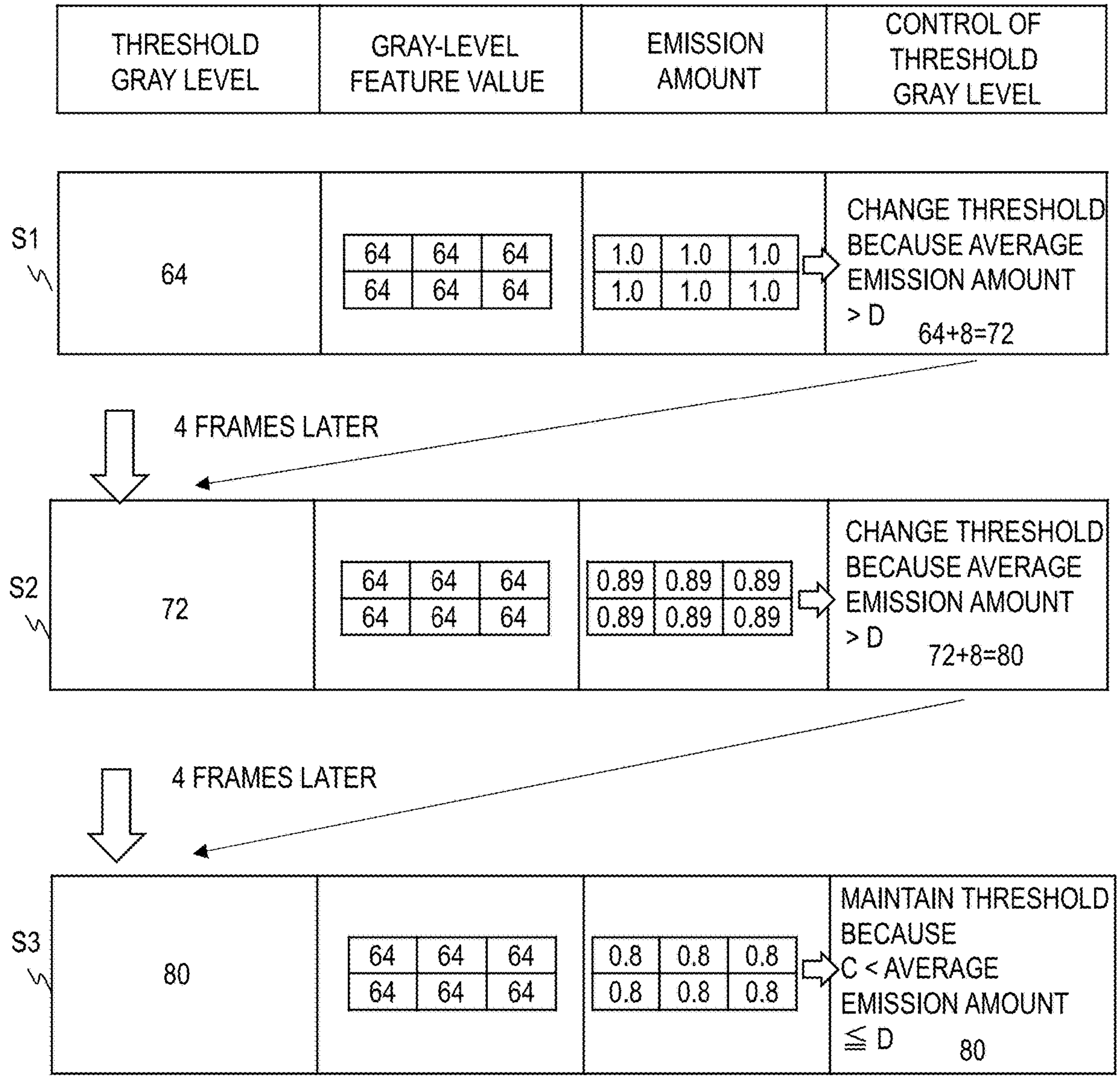
FIG. 11 is a diagram for explaining an example of controlling the threshold gray level in the third embodiment.

FIG. 11 is a diagram for explaining an example of controlling the threshold gray level in this embodiment. For convenience of description, the backlight consists of six backlight blocks and the number of display region blocks opposite the backlight blocks is also six. This example raises the threshold gray level stepwise from the initial value of 64 to 80. Assume that the maximum threshold gray level is higher than 80; the incremental step ΔJ for the threshold emission amount is 8; the threshold emission amount C is 0.5; the threshold emission amount D is 0.8; and the number of consecutive video frames (count value) N to raise the threshold gray level is 3. That is to say, if the average emission amount exceeds the threshold emission amount D=0.8 for three consecutive frames, the threshold gray level for the video frame next to the three consecutive frames is raised by ΔJ=8. If the threshold gray level has already reached the maximum value, the value is maintained.

In the state S1, the threshold gray level is the initial value of 64. The gray-level feature values of individual backlight blocks in accordance with the received video frame are all 64. Accordingly, the emission amounts of all backlight blocks are 1.0. The average emission amount is 1.0, which is more than the threshold emission amount D=0.8. If the state S1 continues for three consecutive video frames, the threshold gray level for the following fourth video frame is determined to be 72.

In the state S2, the threshold gray level is 72. Assuming that the display device keeps receiving video frames of the same data, the gray-level feature values of individual backlight blocks are 64. Since the threshold gray level is 72, the emission amount for the gray-level feature value 64 is 0.89. The average emission amount is 0.89, which is more than the threshold emission amount D=0.8. If the state S2 continues for three consecutive video frames, the threshold gray level for the following fourth video frame is determined to be 80.

In the state S3, the threshold gray level is 80. Assuming that the display device keeps receiving video frames of the same data, the gray-level feature values of individual backlight blocks are 64. Since the threshold gray level is 80, the emission amount for the gray-level feature value 64 is 0.8. The average emission amount is 0.8, which is equal to or less than the threshold emission amount D=0.8 and more than the threshold emission amount C=0.5. Accordingly, the threshold gray level is maintained at 80.

As described above, the third embodiment is control effective to avoid reduction of in-plane contrast.

Fourth Embodiment

Hereinafter, the fourth embodiment of this disclosure will be described. The following mainly describes differences from the first embodiment. Unless stated otherwise, the description of the first embodiment is applicable to the fourth embodiment. This embodiment stepwise decreases the emission amount at the folding point of the function for converting the gray-level feature value into the emission amount of a backlight block along the initial function when high emission of the backlight continues for some time. This means that the threshold gray level is lowered. This configuration suppresses degradation in display quality caused by sudden reduction of the emission amount and further, reduces the possibility that the emission amount for a low gray-level image becomes too low to provide good visibility of the image, while reducing the power consumption by reducing the emission amount.

Figure 12:
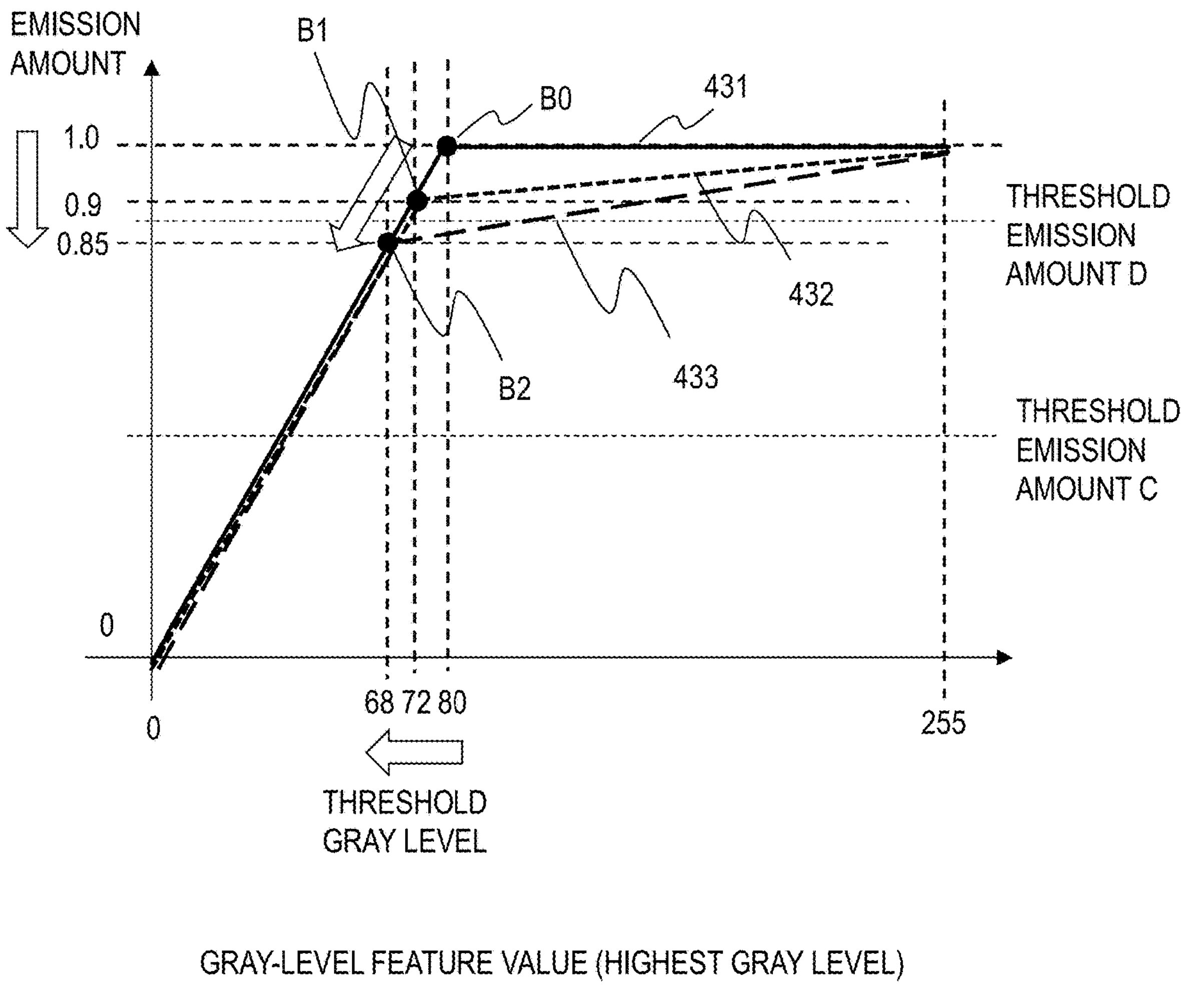
FIG. 12 provides examples of the function defining the relation between the gray-level feature value and the emission amount of a backlight block in the fourth embodiment.

FIG. 12 provides examples of the function (gray-level feature value—emission amount conversion formula) defining the relation between the gray-level feature value and the emission amount of a backlight block in the fourth embodiment. The block emission amount determiner 202 determines the function defining the relation between the gray-level feature value and the emission amount, depending on the threshold gray level received from the LD threshold coordinator 210. In the example of FIG. 12, the block emission amount determiner 202 determines the function, depending on the designated threshold gray level.

In the graph of FIG. 12, the horizontal axis represents the gray-level feature value of a backlight block. The vertical axis represents the emission amount of the backlight block. The function 431 (first conversion function) is the initial function and the initial threshold gray level is 80. The function 431 has the same configuration as the function 402 described with reference to FIGS. 4 and 5. The emission amount in accordance with the function 431 is expressed as a linear function monotonically increasing from the origin (0, 0) to the folding point B0 and showing a constant value of 1.0 in the range from the gray-level feature value at the folding point B0 to the maximum gray-level feature value. The emission amount in the range from the gray-level feature value at the folding point B0 to the maximum gray-level feature value can be expressed by a monotonically increasing linear function.

The function 432 (second conversion function) is a function acquired by revising the initial function 431 for one or more times. As described above, one revision decreases the emission amount at the folding point by a predetermined step. The folding point B1 of the function 432 is located at the coordinates where the emission amount in the initial function 431 is 0.9. The gray-level feature value at the folding point B1 or the threshold gray level (the seventh threshold gray level) in the revised function 432 is 72.

The function 432 consists of two linear functions, like the function 403 in FIG. 8. Specifically, in the function 432, the emission amount from the point where the gray-level feature value is 0 to the folding point B1 is expressed as a monotonically increasing linear function and the emission amount from the folding point B1 to the maximum gray-level feature value is expressed as another monotonically increasing linear function. The slope from the origin to the folding point B1 is larger than the slope from the folding point B1 to the point at the maximum gray-level feature value.

The function 433 (third conversion function) is a function acquired by revising the function 432 for one or more times. The folding point B2 of the function 433 is located at the coordinates where the emission amount in the initial function 431 is 0.85. The gray-level feature value at the folding point B2 or the threshold gray level (the eighth threshold gray level) in the revised function 433 is 68.

The functions 431, 432, and 433 can be expressed by Conversion Formulae 1 and 2 described in the second embodiment. The slope from the point where the gray-level feature value is 0 to the folding point is common to all the functions and in each function, the slope from the point where the gray-level feature value is 0 to the folding point is larger than the slope from the folding point to the point where the gray-level feature value is maximum. The slope from the folding point to the point at the maximum gray-level feature value gets larger in the order from the function 431 to the function 433. For example, the step (decrement) to decrease the emission amount at the folding point in revising the function can be a constant value of 0.01 and the minimum emission amount at the folding point after being decreased can be 0.8.

Like the first embodiment, this embodiment determines the threshold gray level depending on the overall emission amount of the backlight. Two threshold emission amounts C and D are predetermined, like in the first embodiment. The LD threshold coordinator 210 calculates the average emission amount of the backlight blocks for one frame and determines the position of the folding point or the threshold gray level for the next frame based on the relations of the average emission amount with the threshold emission amounts C and D. In this embodiment, the LD threshold coordinator 210 determines the threshold gray level in view of the following conditions.

First Condition: Average Emission Amount≤Threshold Emission Amount C

If the average emission amount of the backlight blocks is equal to or less than the threshold emission amount C, the LD threshold coordinator 210 determines the folding point to be the initial folding point B0 (the threshold gray level to be the initial threshold gray level). In the case where the threshold emission amount C is 0.5, the initial folding point is determined at the coordinates (80, 1.0) if the average emission amount of the backlight blocks is equal to or less than 0.5. In other words, the threshold gray level is determined to be 80.

Second Condition: Average Emission Amount>Threshold Emission Amount D

If the average emission amount of the backlight blocks is more than the threshold emission amount D for consecutive N frames (for a predetermined number of times consecutively), the LD threshold coordinator 210 decreases the emission amount at the folding point by $\Delta L$. In other words, the threshold gray level is lowered by $\Delta L$. The step value (adjustment amount) $\Delta L$ can be a fixed value or a function of the latest threshold gray level. If $\Delta L$ is a constant, $\Delta L$ is also a constant. An example of $\Delta L$ can be 0.01 and the value for N is an integer greater than 0.

Third Condition: Threshold Emission Amount C<Average Emission Amount≤Threshold Emission Amount D If the average emission amount of the backlight blocks is more than the threshold emission amount C and equal to or less than the threshold emission amount D, the LD threshold coordinator 210 maintains the folding point (the coordinates thereof) or the function for the previous frame. The threshold emission amounts C and D can be fixed values (their initial values can be maintained) or varied with the threshold gray level.

Figure 13:
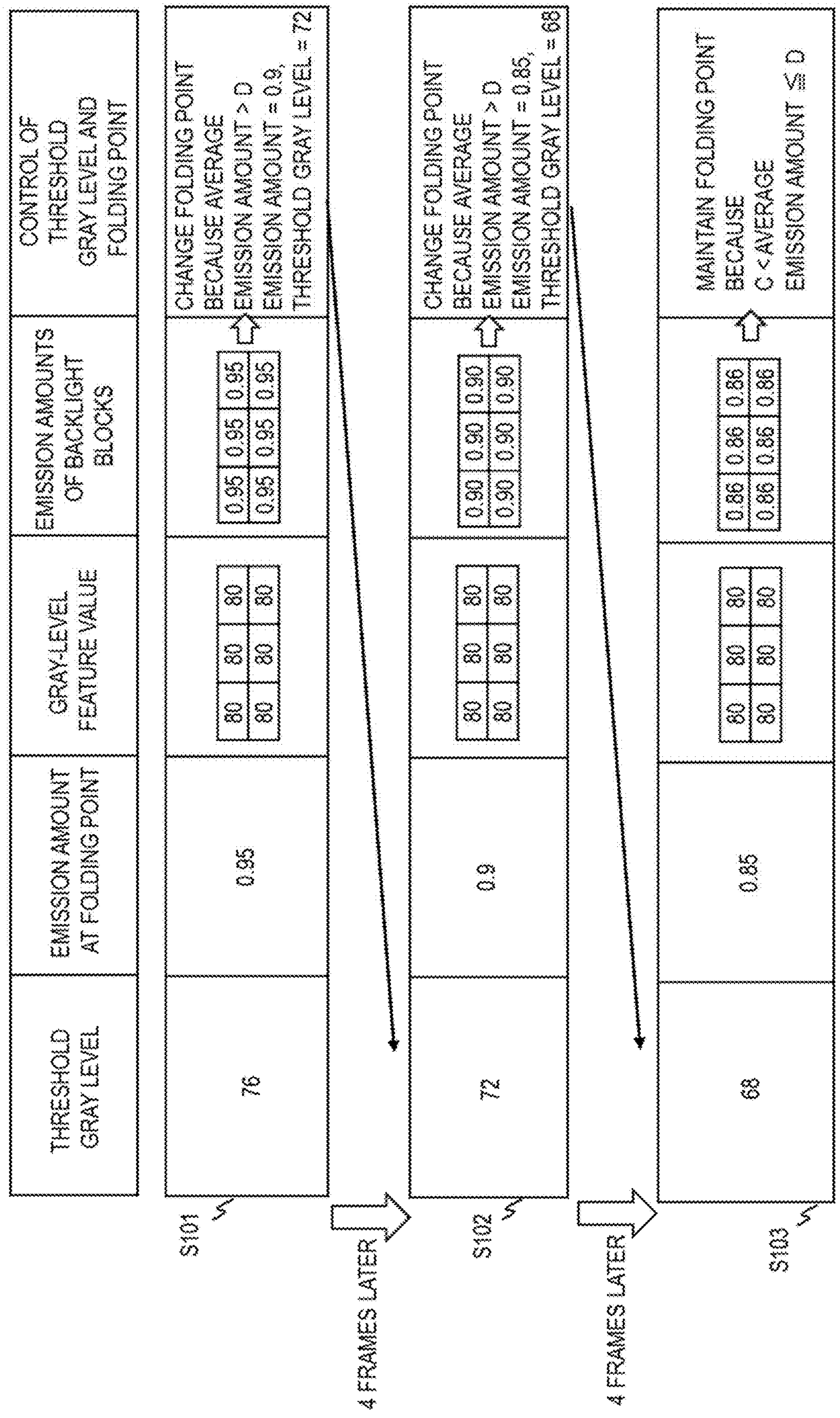
FIG. 13 is a diagram for explaining an example of controlling the folding point (threshold gray level) in the fourth embodiment.

FIG. 13 is a diagram for explaining an example of controlling the folding point (threshold gray level) in this embodiment. This example stepwise decreases the emission amount at the folding point from 0.95 to 0.85. The emission amount at initial the folding point is 1.0 and the decremental step $\Delta L$ is 0.05. The threshold gray level also changes with the emission amount at the folding point. In the example in FIG. 13, the threshold gray level stepwise decreases from 76 to 68. The decremental step $\Delta L$ is 4.

Assume that the threshold emission amount C is 0.5; the threshold emission amount D is 0.88; and the number of consecutive video frames (count value) N to lower the emission amount at the folding point is 3. In other words, if the average emission amount exceeds the threshold emission amount D=0.88 for three consecutive video frames, the emission amount at the folding point is decreased by $\Delta L$=0.05. If the emission amount at the folding point has already reached the minimum value, the value is maintained.

In the state S101, the threshold gray level is 76 and the emission amount at the folding point is 0.95. That is to say, the state S101 is a revised state next to the initial state. As described above, the threshold gray level in the initial state (initial function) is 80 and the emission amount at the folding point is 1.0. The gray-level feature values for individual backlight blocks in accordance with the input video frame are all 80.

For this reason, the emission amounts for individual backlight blocks are calculated by Conversion Formula 2 described in the second embodiment of the applied function and their values are 0.95. The average emission amount of the backlight blocks is 0.95, which is more than the threshold emission amount D=0.88. If the state S101 continues for three consecutive video frames, the emission amount at the folding point is changed to 0.9 and the threshold gray level is changed to 72 of the gray-level feature value at the folding point for the following fourth video frame.

In the state S102, the threshold gray level is 72 and the emission amount at the folding point is 0.90. Assuming that the display device keeps receiving video frames of the same data, the gray-level feature values for individual backlight blocks are all 80. The emission amounts for individual backlight blocks are calculated by Conversion Formula 2 of the applied function 432 and their values are 0.90. The average emission amount of the backlight blocks is 0.90, which is more than the threshold emission amount D=0.88. If the state S102 continues for three consecutive video frames, the emission amount at the folding point is changed to 0.85 and the threshold gray level is changed to 68 of the gray-level feature value at the folding point for the following fourth video frame.

In the state S103, the threshold gray level is 68 and the emission amount at the folding point is 0.85. Assuming that the display device keeps receiving video frames of the same data, the gray-level feature values for individual backlight blocks are all 80. The emission amounts of individual backlight blocks are calculated by Conversion Formula 2 of the applied function 433 and their values are 0.86. The average emission amount of the backlight blocks is 0.86, which is less than the threshold emission amount D=0.88 and more than the threshold emission amount C=0.5. Accordingly, the coordinates of the folding point are maintained, or the emission amount at the folding point and the threshold gray level are maintained.

As described above, the fourth embodiment is control effective to suppress unnaturalness of the display quality of images whose gray levels change successively.

Fifth Embodiment

Hereinafter, the fifth embodiment of this disclosure will be described. The fifth embodiment performs control of the gray-level feature value—emission amount conversion characteristic according to the third embodiment (first control) and thereafter, control of the gray-level feature value—emission amount conversion characteristic according to the fourth embodiment (second control). The first control can be the control of the gray-level feature value—emission amount conversion characteristic according to the first embodiment and the second control can be the control of the gray-level feature value—emission amount conversion characteristic according to the second embodiment. This embodiment suppresses degradation in display quality because of too much reduction in emission amount in the low gray-level region while reducing the overall emission amount of the backlight. The following describes an example of performing the control according to the third embodiment first and thereafter entering the control according to the fourth embodiment.

Figure 14:
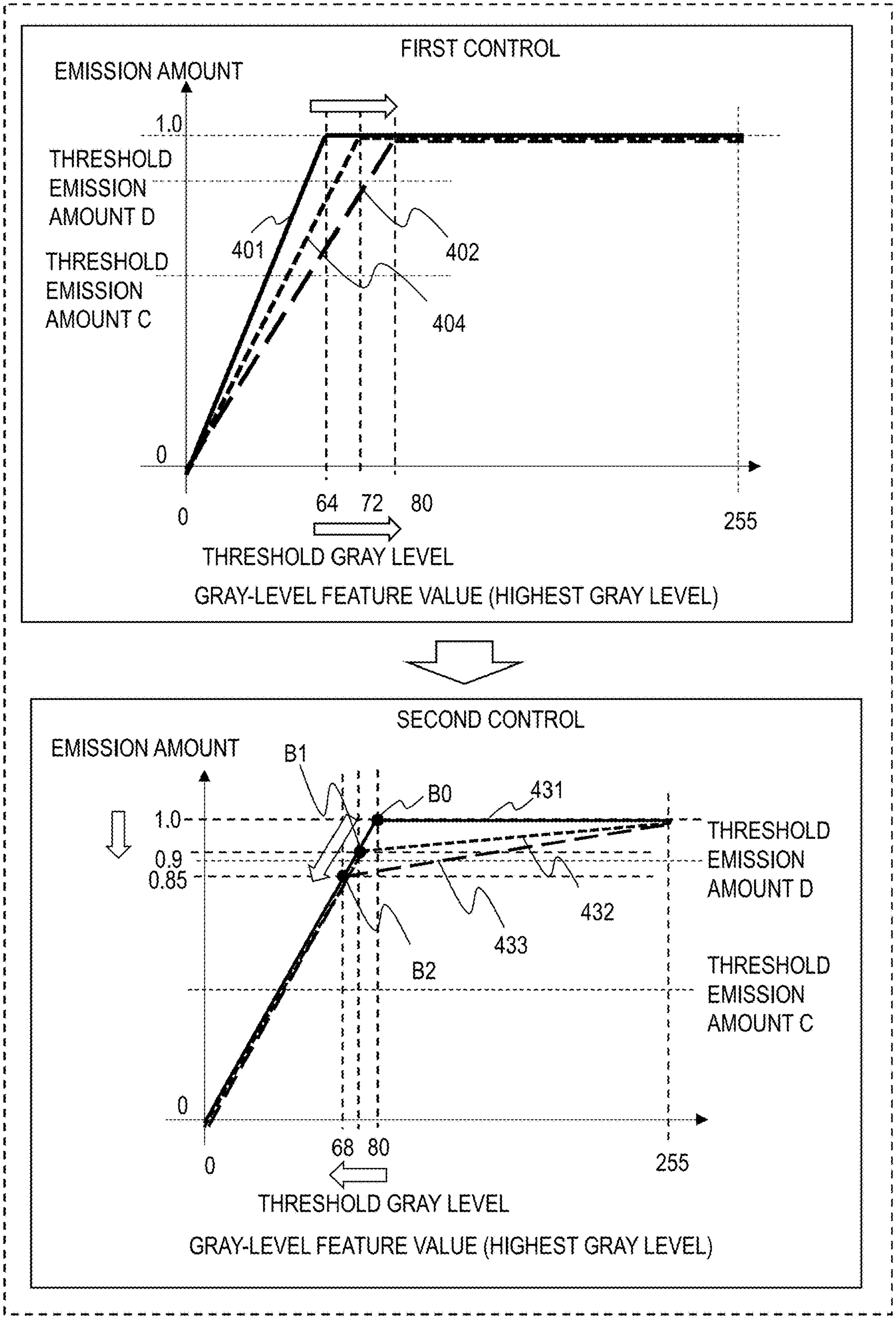
FIG. 14 is a diagram illustrating the method of controlling the gray-level feature value—emission amount conversion characteristic in the fifth embodiment.

FIG. 14 is a diagram illustrating the method of controlling the gray-level feature value—emission amount conversion characteristic in this embodiment. When the display device successively receives video frames requiring high emission of the backlight, this embodiment revises the gray-level feature value—emission amount conversion function in accordance with the first control and thereafter, further revises the gray-level feature value—emission amount conversion function in accordance with the second control.

The first control is the control described in the third embodiment and the second control is the control described in the fourth embodiment. In FIG. 14, the graph of the first control is identical to the graph of FIG. 10 and the graph of the second control is identical to the graph of FIG. 12. The definitive function 402 in the first control is identical to the initial function 431 in the second control. Accordingly, the first control can be continued to the second control seamlessly.

As described above, the first control revises the gray-level feature value—emission amount conversion function to be used from the function 401 into the function 404 (first conversion function) and further into the function 402 (second conversion function) as high emission of the backlight continues. The threshold gray level in the function 401 is 64; the threshold gray level (ninth threshold gray level) of the function 404 is 72; and the threshold gray level (tenth threshold gray level) of the function 402 is 80.

As described above, the function 402 and the function 431 in the second control are the identical functions (second conversion function). When the first control is continued to the second control, the second control revises the gray-level feature value—emission amount conversion function to be used from the function 402, namely the function 431, to the function 432 (third conversion function). The threshold gray level (eleventh threshold gray level) of the function 432 is 72 of the gray-level feature value at the folding point B1.

Figure 15A:
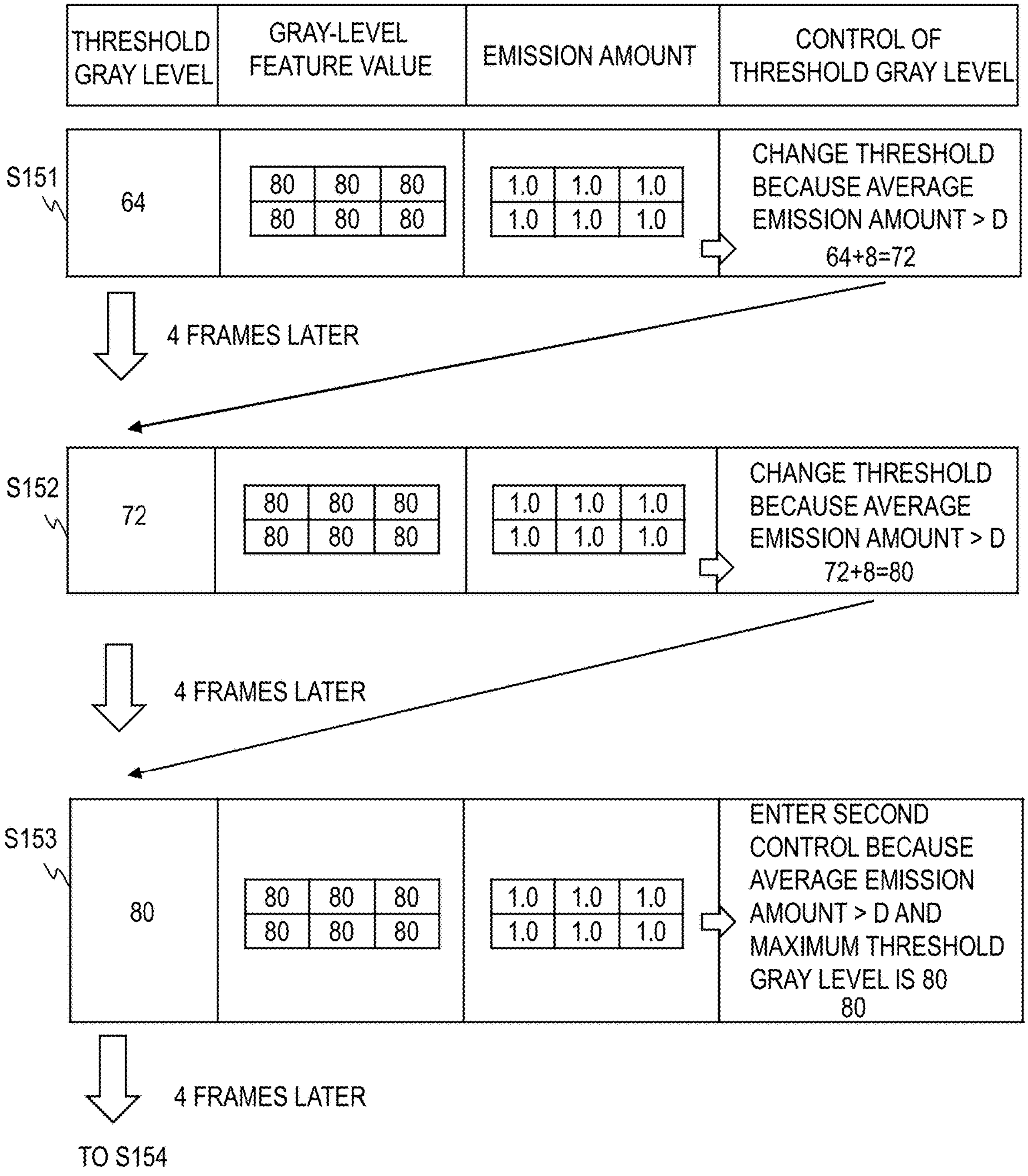
FIG. 15A is a diagram for explaining an example of controlling the threshold gray level in the first control in the fifth embodiment.

This embodiment performs the first control until the threshold gray level reaches the maximum value (in this example, 80) and then enters the second control. The following describes a specific example of the control in this embodiment. FIG. 15A is a diagram for explaining an example of controlling the threshold gray level in the first control. This example raises the threshold gray level stepwise from the initial value of 64 to 80, assuming that the maximum threshold gray level is 80.

Assume that the incremental step ΔJ for the threshold gray level is 8; the threshold emission amount C is 0.5; the threshold emission amount D is 0.8; and the number of consecutive video frames (count value) N to raise the threshold gray level is 3. That is to say, if the average emission amount exceeds the threshold emission amount D=0.8 for three consecutive frames, the threshold gray level for the video frame next to the three consecutive frames is raised by ΔJ=8.

As illustrated in FIG. 15A, the threshold gray level in the state S151 is the initial value of 64. The gray-level feature values of individual backlight blocks in accordance with the received video frame are all 80. Accordingly, the emission amounts of all backlight blocks are 1.0. The average emission amount of the backlight blocks is 1.0, which is more than the threshold emission amount D=0.8. If the state S151 continues for three consecutive video frames, the threshold gray level for the following fourth video frame is determined to be 72.

In the state S152, the threshold gray level is 72. Assuming that the display device keeps receiving video frames of the same data, the gray-level feature values for individual backlight blocks are all 80. Since the threshold gray level is 72, the emission amount for the gray-level feature value 80 is 1.0. The average emission amount is 1.0, which is more than the threshold emission amount D=0.8. If the state S152 continues for three consecutive video frames, the threshold gray level for the following fourth video frame is determined to be 80.

In the state S153, the threshold gray level is 80. Assuming that the display device keeps receiving video frames of the same data, the gray-level feature values for individual backlight blocks are all 80. Since the threshold gray level is 80, the emission amount for the gray-level feature value 80 is 1.0. The average emission amount is 1.0, which is more than the threshold emission amount D=0.8. Since the threshold gray level has already reached the maximum value of 80, the control of the gray-level feature value—emission amount conversion characteristic is changed from the first control to the second control.

Figure 15B:
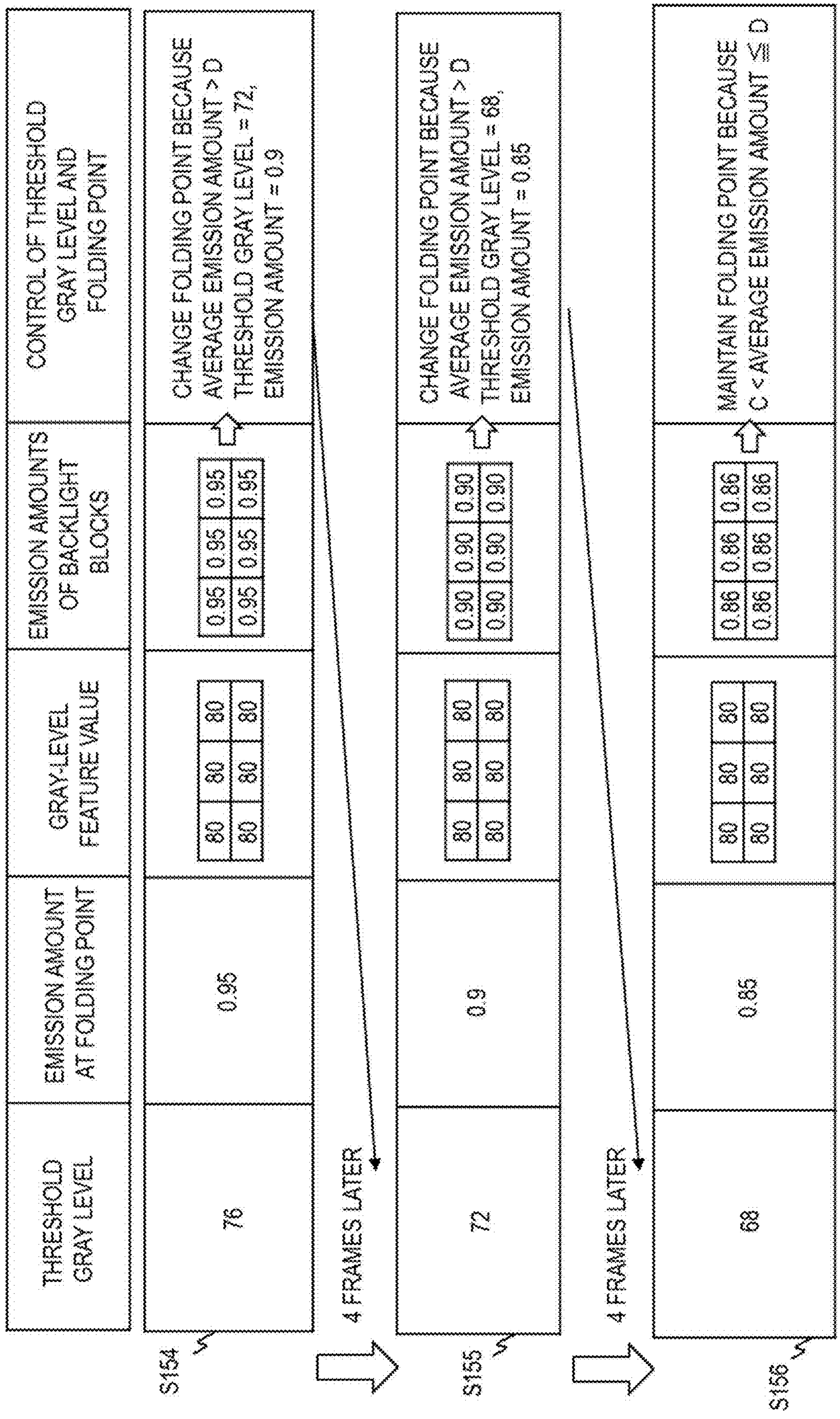
FIG. 15B is a diagram for explaining an example of stepwise decreasing the emission amount at the folding point from 0.95 to 0.85 in the second control in the fifth embodiment.

FIG. 15B is a diagram for explaining an example of stepwise decreasing the emission amount at the folding point from 0.95 to 0.85 in the second control. The emission amount at the initial folding point is 1.0; the initial threshold gray level is 80; and the decremental step ΔL is 0.05. The threshold gray level also changes with the emission amount at the folding point. In the example in FIG. 15B, the threshold gray level decreases stepwise from 76 to 68. The decremental step ΔL is 4.

Assume that the threshold emission amount C is 0.5 and the threshold emission amount D is 0.88. The values of the threshold emission amount C and D can be either the same or different in between the first control and the second control. The number of consecutive video frames (count value) N to lower the threshold gray level is 3. That is to say, if the average emission amount exceeds the threshold emission amount D=0.88 for three consecutive video frames, the emission amount at the folding point is decreased by ΔL=0.05. The value of ΔL can be 0.01. If the emission amount at the folding point has already reached the minimum value, the value is maintained. The threshold value N for the number of consecutive video frames can be either the same or different in between the first control and the second control. For example, the value N in the second control can be 1.

The state S154 is a state changed from the state S153 by the second control. The state S153 is the initial state in the second control. In the state S154, the threshold gray level is 76 and the emission amount at the folding point is 0.95. That is to say, the state S154 is a revised state next to the initial state S153. The threshold gray level in the state S153 is 80 and the emission amount at the folding point is 1.0. The gray-level feature values for individual backlight blocks in accordance with the input video frame are all 80, which are the same as before.

The emission amounts for individual backlight blocks are calculated by Conversion Formula 2 described in the second embodiment of the applied function and their values are 0.95. The average emission amount of the backlight blocks is 0.95, which is more than the threshold emission amount D=0.88. If the state S154 continues for three consecutive video frames, the emission amount at the folding point is changed to 0.9 and the threshold gray level is changed to 72 of the gray-level feature value at the folding point for the following fourth video frame.

In the state S155, the threshold gray level is 72 and the emission amount at the folding point is 0.90. Assuming that the display device keeps receiving video frames of the same data, the gray-level feature values for individual backlight blocks are all 80. The emission amounts for individual backlight blocks are calculated by Conversion Formula 2 of the applied function 432 and their values are 0.90. The average emission amount of the backlight blocks is 0.90, which is more than the threshold emission amount D=0.88. If the state S155 continues for three consecutive video frames, the emission amount at the folding point is changed to 0.85 and the threshold gray level is changed to 68 of the gray-level feature value at the folding point for the following fourth video frame.

In the state S156, the threshold gray level is 68 and the emission amount at the folding point is 0.85. Assuming that the display device keeps receiving video frames of the same data, the gray-level feature values for individual backlight blocks are all 80. The emission amounts for individual backlight blocks are calculated by Conversion Formula 2 of the applied function 433 and their values are 0.86. The average emission amount is 0.86, which is less than the threshold emission amount D=0.88 and more than the threshold emission amount C=0.5. Accordingly, the coordinates of the folding point are maintained, or the emission amount at the folding point and the threshold gray level are maintained.

FIG. 16 provides results of the control in this embodiment for gray-level feature values based on some video frames. Specifically, FIG. 16 indicates emission amounts for individual backlight blocks calculated from the gray-level feature values based on successively received video frames and the average emission amount of the backlight blocks. Assume that the threshold emission amount D is 0.88.

The case C1 provides a control result on successive video frames exhibiting gray-level feature values a little higher than the initial threshold gray level (=64). The emission amounts in accordance with the initial function with a threshold gray level of 64 are 1.0 for all backlight blocks and the average thereof is 1.0. The threshold gray level is raised by the first control and as a result, the emission amounts of the backlight blocks are reduced and the average thereof is decreased to 0.87. This amount is less than 0.88 of the threshold emission amount D and therefore, changing the control to the second control is not necessary.

The case C2 provides a control result on successive video frames exhibiting a mixture of low gray-level feature values (=48) and comparatively high gray-level feature values (=160). The average emission amount in accordance with the initial function with a threshold gray level of 64 is 0.97. The threshold gray level is raised by the first control and as a result, the emission amounts of the backlight blocks are reduced and the average thereof is decreased to 0.95. This amount is more than 0.88 of the threshold emission amount D and therefore, the control is changed from the first control to the second control. The threshold gray level is lowered by the second control and as a result, the emission amounts of the backlight blocks are reduced and the average thereof is decreased to 0.85. This amount is less than 0.88 of the threshold emission amount D.

The case C3 provides a control result on successive video frames exhibiting a mixture of low gray-level feature values (=48) and high gray-level feature values (=200). The average emission amount in accordance with the initial function with a threshold gray level of 64 is 0.95. The threshold gray level is raised by the first control and as a result, the emission amounts of the backlight blocks are reduced and the average thereof is decreased to 0.92. This amount is more than 0.88 of the threshold emission amount D and therefore, the control is changed from the first control to the second control. The threshold gray level is lowered by the second control and as a result, the emission amounts of the backlight blocks are reduced and the average thereof is decreased to 0.87. This amount is smaller than 0.88 of the threshold emission amount D.

This embodiment increases the possibility that the backlight blocks can keep their emission amounts at 80% or more of the initial amounts. Especially, this embodiment can control the backlight not to reduce the emission amount for a low gray-level range too much.

Sixth Embodiment

Hereinafter, the sixth embodiment of this disclosure will be described. The sixth embodiment describes various characteristics, or conversion formulae from the gray-level feature value to the emission amount, in the range where the gray-level feature value is from 0 to the threshold gray level after the threshold gray level is revised from the initial value. All the functions (conversion formulae) described in the following are monotonically increasing functions.

Figure 17A:
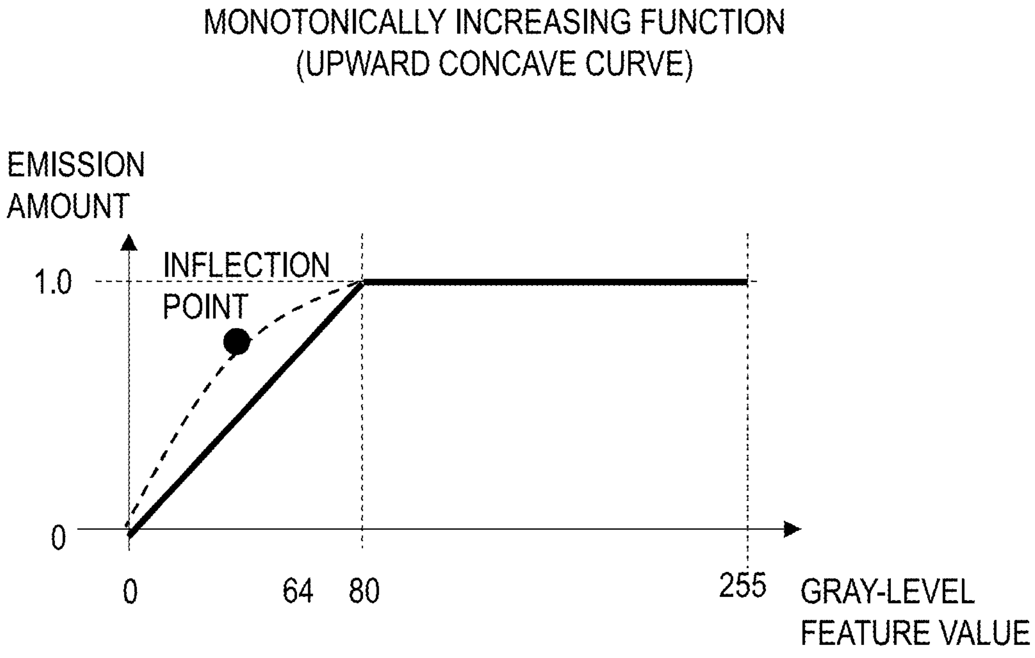
FIG. 17A provides an example of the function in the range where the gray-level feature value is from 0 to the threshold gray level in the sixth embodiment.

FIGS. 17A to 17F provide examples of the function in the range where the gray-level feature value is from 0 to the threshold gray level. FIG. 17A provides a function consisting of an upward concave curve. As a comparative example, a monotonically increasing linear function is also provided. The linear function can be implemented with a small-scale circuit and minimizes the part that causes unnaturalness of the display quality because the rate of variation of the function is fixed. The upward concave curve requires a relatively large-scale circuit but achieves smaller reduction in emission amount around the inflection point and therefore, it is effective to prioritize the display quality around the threshold.

Figure 17B:
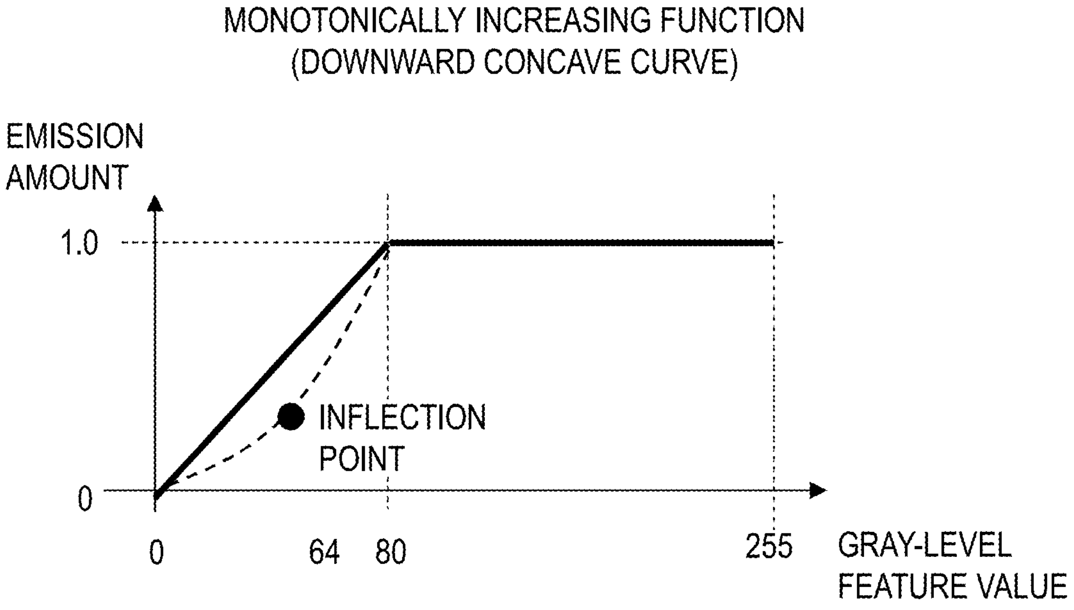
FIG. 17B provides another example of the function in the range where the gray-level feature value is from 0 to the threshold gray level in the sixth embodiment.

FIG. 17B provides a function consisting of a downward concave curve. As a comparative example, a monotonically increasing linear function is also provided. Although the downward concave curve requires a relatively large-scale circuit, it is effective to prioritize the power saving effect over the emission amount around the inflection point.

Figure 17C:
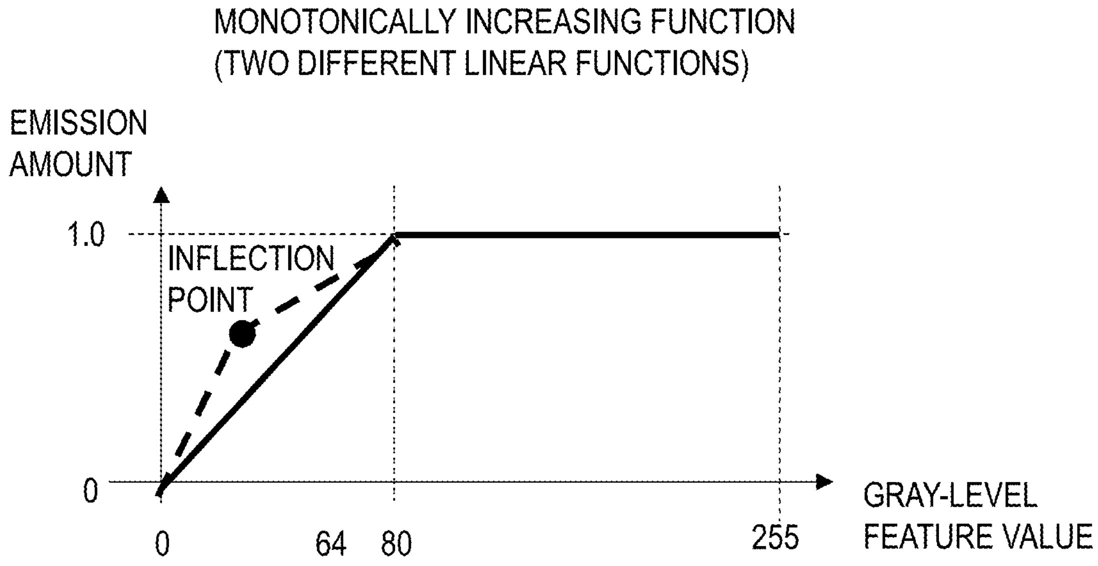
FIG. 17C provides still another example of the function in the range where the gray-level feature value is from 0 to the threshold gray level in the sixth embodiment.

FIG. 17C provides a function forming a convex fold in which two linear functions having different slopes are connected. As a comparative example, a monotonically increasing linear function is also provided. This function can be implemented with a relatively small-scale circuit and achieves smaller reduction in emission amount around the inflection point and therefore, it is effective to prioritize the display quality around the threshold.

Figure 17D:
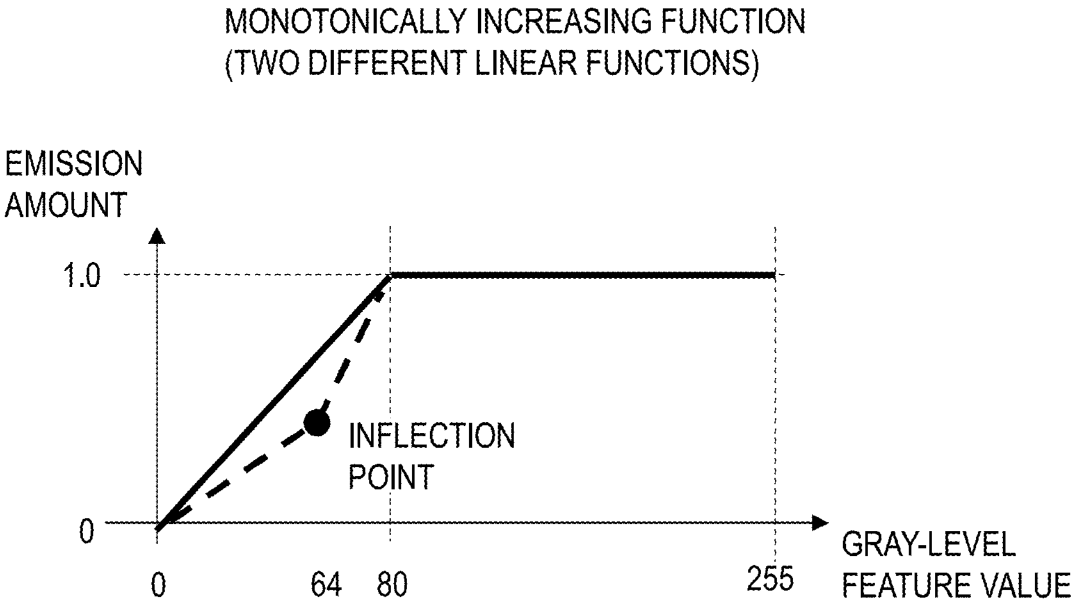
FIG. 17D provides still another example of the function in the range where the gray-level feature value is from 0 to the threshold gray level in the sixth embodiment.

FIG. 17D provides a function forming a concave fold in which two linear functions having different slopes are connected. As a comparative example, a monotonically increasing linear function is also provided. This function can be implemented with a relatively small-scale circuit and it is effective to prioritize the power saving effect over the emission amount around the inflection point.

Figure 17E:
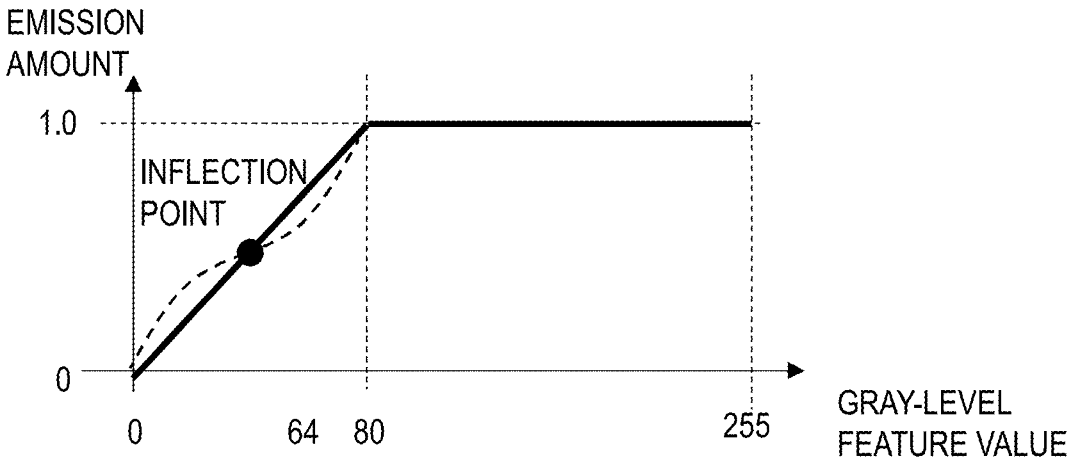
FIG. 17E provides still another example of the function in the range where the gray-level feature value is from 0 to the threshold gray level in the sixth embodiment.

FIG. 17E provides a function in which an upward concave curve and a downward concave curve are connected. As a comparative example, a monotonically increasing linear function is also provided. Although the function like this requires a relatively large-scale circuit, it is effective for control not to reduce the emission amount in the low gray-level region as much as possible.

Figure 17F:
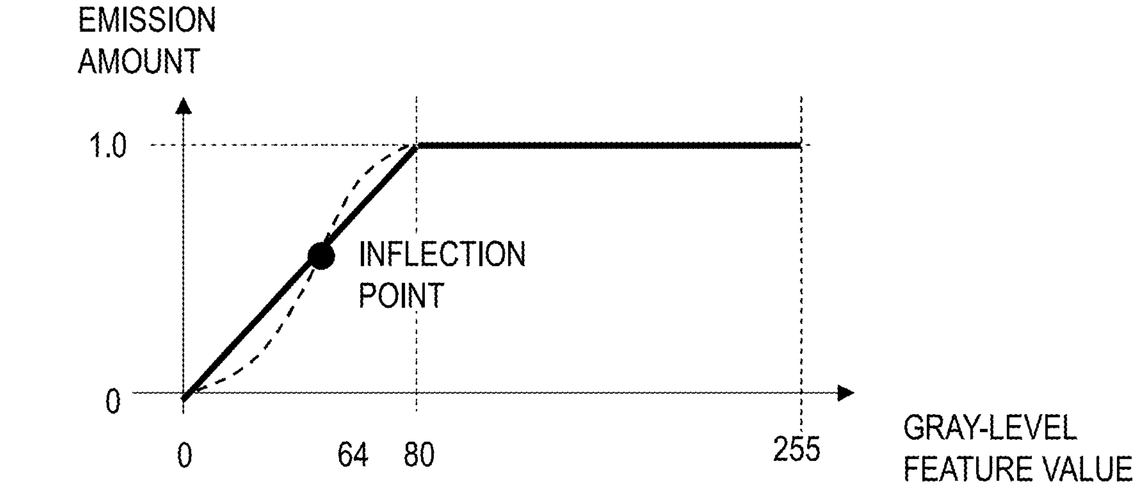
FIG. 17F provides still another example of the function in the range where the gray-level feature value is from 0 to the threshold gray level in the sixth embodiment.

FIG. 17F provides a function in which a downward concave curve and an upward concave curve are connected. As a comparative example, a monotonically increasing linear function is also provided. The function like this is effective to prioritize the luminance around the inflection point over the luminance in the low gray-level region.

Seventh Embodiment

Hereinafter, the seventh embodiment of this disclosure will be described. The seventh embodiment modifies the gray-level feature value—emission amount conversion functions described in the first embodiment to the fourth embodiment in the opposite direction.

The first embodiment changes the gray-level feature value—emission amount conversion function from the initial function 401 to the revised function 402, as described with reference to FIG. 5. This embodiment uses the threshold value B as the initial threshold gray level and the function 402 as the initial function and selects the function to be used from the initial function 402 and the function 401 based on the relations of the average emission amount with the threshold emission amounts. The conditions to determine the threshold gray level in the first embodiment can be rewritten as follows.

First Condition: Average Emission Amount≤Threshold Emission Amount C

If the average emission amount of the backlight blocks is equal to or less than the threshold emission amount C (first threshold emission amount) for N consecutive frames (for a predetermined number of times consecutively), the LD threshold coordinator 210 determines the threshold gray level to be the revised threshold gray level A. The value of N is an integer greater than 0. The revised threshold gray level A can be a fixed value or a function of the average emission amount.

Second Condition: Average Emission Amount>Threshold Emission Amount D

If the average emission amount of the backlight blocks is more than the threshold emission amount D, the LD threshold coordinator 210 determines the threshold gray level to be the initial threshold gray level B.

Third Condition: Threshold Emission Amount C<Average Emission Amount≤Threshold Emission Amount D If the average emission amount of the backlight blocks is more than the threshold emission amount C and equal to or less than the threshold emission amount D, the LD threshold coordinator 210 maintains the threshold gray level for the previous frame.

The second embodiment changes the gray-level feature value—emission amount conversion function from the initial function 401 to the revised function 403, as described with reference to FIG. 8. This embodiment uses the threshold value E as the initial threshold gray level and the function 403 as the initial function and selects the function to be used from the initial function 403 and the function 401 based on the relations of the average emission amount with the threshold emission amounts. The conditions to determine the threshold gray level in the second embodiment can be rewritten as follows.

First Condition: Average Emission Amount≤Threshold Emission Amount C

If the average emission amount of the backlight blocks is equal to or less than the threshold emission amount C for N consecutive frames (for a predetermined number of times consecutively), the LD threshold coordinator 210 determines the threshold gray level to be the threshold gray level A. The threshold gray level A can be a fixed value or a function of the average emission amount. The value for N is an integer greater than 0.

Second Condition: Average Emission Amount>Threshold Emission Amount D

If the average emission amount of the backlight blocks is more than the threshold emission amount D, the LD threshold coordinator 210 determines the threshold gray level to be the initial threshold gray level E.

Third Condition: Threshold Emission Amount C<Average Emission Amount≤Threshold Emission Amount D If the average emission amount of the backlight blocks is more than the threshold emission amount C and equal to or less than the threshold emission amount D, the LD threshold coordinator 210 maintains the threshold gray level for the previous frame.

Figure 18:
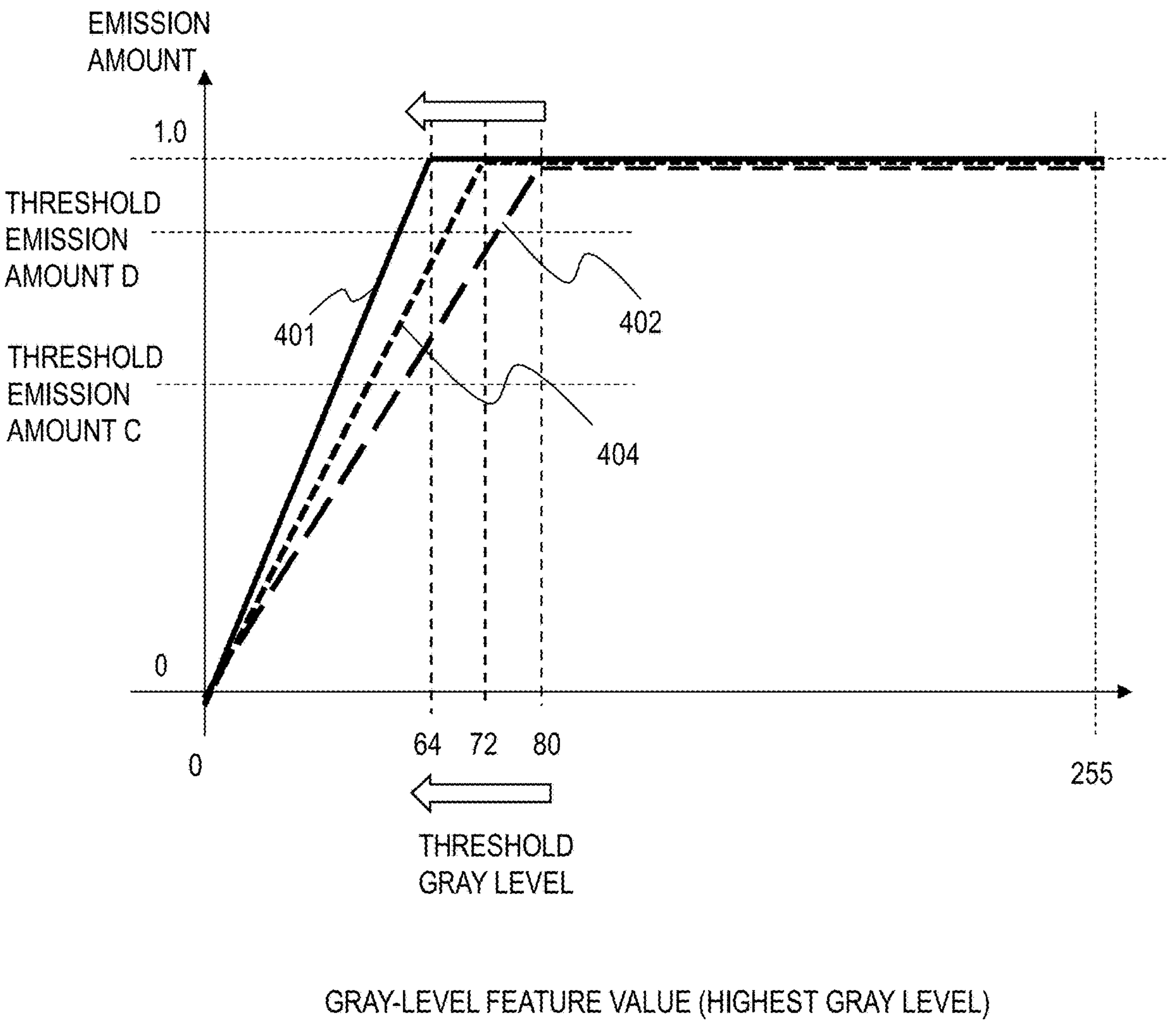
FIG. 18 illustrates a method of lowering the threshold gray level stepwise from the initial value in the seventh embodiment.

The third embodiment stepwise raises the threshold gray level from the initial value, as described with reference to FIG. 10. This embodiment stepwise lowers the threshold gray level from the initial value as illustrated in FIG. 18. In this embodiment, the maximum threshold gray level as the initial value, the minimum threshold gray level, and the decrement at each step for the threshold gray level are predetermined. The conditions to determine the threshold gray level in the third embodiment are rewritten as follows.

First Condition: Average Emission Amount≤Threshold Emission Amount C

If the average emission amount of the backlight blocks is equal to or less than the threshold emission amount C for N consecutive frames (for a predetermined number of times consecutively), the LD threshold coordinator 210 lowers the threshold gray level by ΔJ. The value ΔJ can be a fixed value or a function of the latest threshold gray level. The value N is an integer greater than 0.

Second Condition: Average Emission Amount>Threshold Emission Amount D

If the average emission amount of the backlight blocks is more than the threshold emission amount D, the LD threshold coordinator 210 determines that the threshold gray level to be the initial threshold gray level (the maximum value).

Third Condition: Threshold Emission Amount C<Average Emission Amount≤Threshold Emission Amount D If the average emission amount of the backlight blocks is more than the threshold emission amount C and equal to or less than the threshold emission amount D, the LD threshold coordinator 210 maintains the threshold gray level for the previous frame. The threshold emission amounts C and D can be fixed values (their initial values can be maintained) or varied with the threshold gray level.

The fourth embodiment stepwise decreases the emission amount at the folding point from the initial value, as described with reference to FIG. 12. In other words, the fourth embodiment stepwise lowers the threshold gray level or the gray-level feature value at the folding point. This embodiment stepwise increases the emission amount at the folding point from the initial value. As a result, the threshold gray level rises stepwise from the initial value. In this embodiment, the minimum emission amount at the folding point as the initial value, the maximum emission amount at the folding point, and the increment at each step for the emission amount at the folding point are predetermined. The initial folding point is the folding point B2 in FIG. 12. The folding point of the function changes stepwise from the folding point B2 to the folding point B0. The conditions to determine the threshold gray level in the fourth embodiment are rewritten as follows.

First Condition: Average Emission Amount≤Threshold Emission Amount C

If the average emission amount of the backlight blocks is equal to or less than the threshold emission amount C for consecutive N frames (for a predetermined number of times consecutively), the LD threshold coordinator 210 increases the emission amount at the folding point by ΔL. The value ΔL can be a fixed value or a function of the latest threshold gray level. The value N is an integer greater than 0.

Second Condition: Average Emission Amount>Threshold Emission Amount D

If the average emission amount of the backlight blocks is more than the threshold emission amount D, the LD threshold coordinator 210 determines that the folding point is the initial folding point B2.

Third Condition: Threshold Emission Amount C<Average Emission Amount≤Threshold Emission Amount D If the average emission amount of the backlight blocks is more than the threshold emission amount C and equal to or less than the threshold emission amount D, the LD threshold coordinator 210 maintains the folding point (the coordinates thereof) for the previous frame. The threshold emission amounts C and D can be fixed values (their initial values can be maintained) or varied with the threshold gray level.

The first control and the second control in the fifth embodiment can be modified by modifying the first to the fourth embodiments as described above. The seventh embodiment determines to use the first conversion function if the average emission amount is equal to or less than the threshold emission amount C for N or more consecutive frames, determines to maintain the current conversion function if the average emission amount is more than the threshold emission amount C and equal to or less than the threshold emission amount D, and determines to use the second conversion function when the average emission amount is more than the threshold emission amount D, as described above.

The embodiments of this disclosure employ gray levels not higher than 80 for a threshold gray level. In displaying an image whose gray-level feature values are lower than the threshold gray level, the emission amounts of the backlight blocks are reduced and accordingly, effect of luminance distribution of each backlight block and leakage light from neighboring blocks are also reduced. Therefore, adjustment of emission amounts in consideration of the effect of the luminance distribution of each backlight block and leakage light from neighboring blocks can be eliminated by employing a low threshold gray level. For this reason, the liquid crystal display device 1 of this disclosure includes neither a storage unit for storing the luminance distribution nor an operational circuit for the adjustment to conform to the luminance distribution like the ones in an existing art. The embodiments of this disclosure can avoid enlargement of the circuit scale.

Figure 19A:
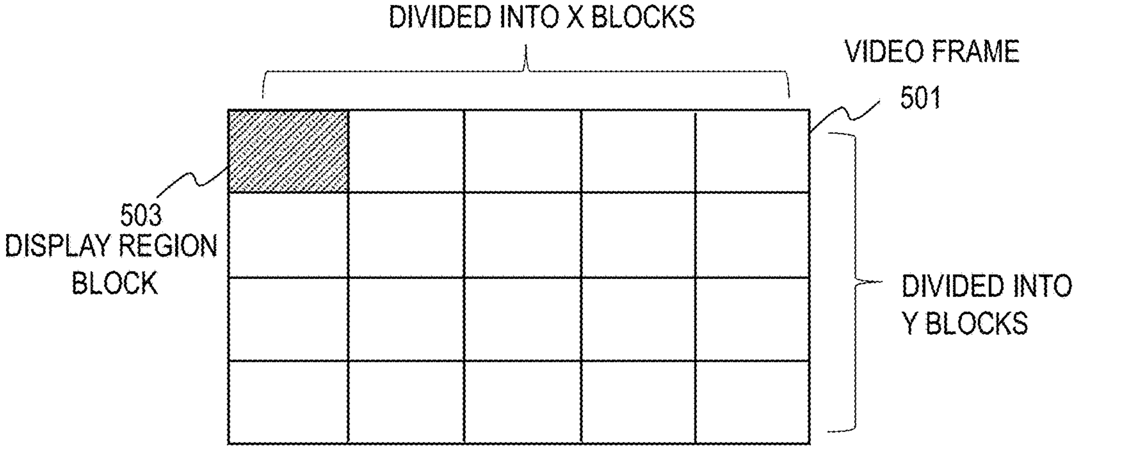
FIG. 19A is a diagram illustrating a relation between a video frame and display region blocks.

The embodiments of this disclosure employ the highest gray level within a display region block as a gray-level feature value. Hereinafter, an example of a method of determining a gray-level feature value is described with reference to FIGS. 19A, 19B, and 20. FIG. 19A illustrates a plurality of display region blocks 503 corresponding to video frame 501 and FIG. 19B is an enlarged diagram of the shadowed display region block 503 in FIG. 19A.

Figure 19B:
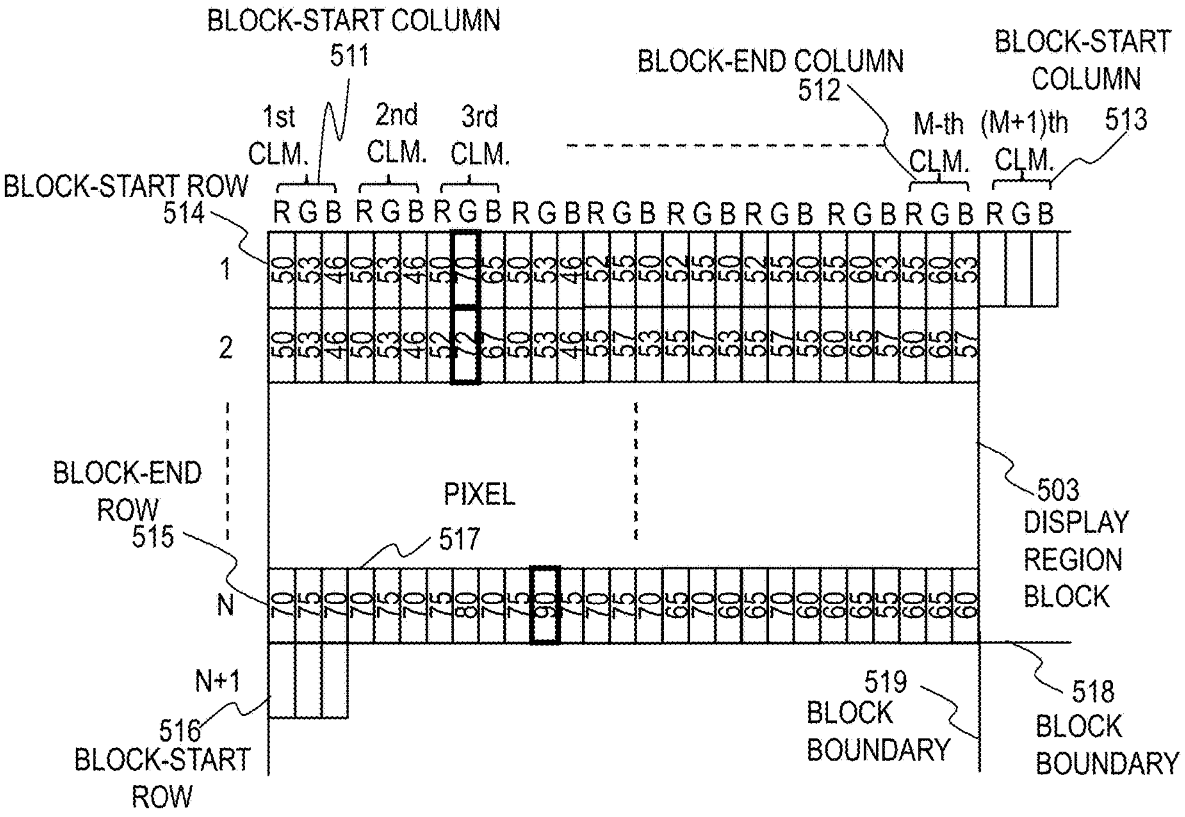
FIG. 19B is a diagram illustrating details of a display region block.

As illustrated in FIG. 19B, each display region block 503 of the video frame 501 includes M columns by N rows by 3 (R,G,B) of pixels 517. Each R, G, or B pixel 517 is assigned gray-level data. The numerical value in each pixel 517 in FIG. 19B represents the gray-level data assigned to the pixel 517. For example, in the first column in the first row, the gray-level data for the R pixel is 50; the gray-level data for the G pixel is 53; and the gray-level data for the B pixel is 46.

The display region block 503 consists of N rows from the block-start row 514 to the block-end row 515. Each row is composed of cyclically disposed R pixels, G pixels, and B pixels 517. The row 516 next to the block-end row 515 is the block-start row of the next display region block 503. The display region block 503 also consists of M columns from the block-start column 511 to the block-end column 512. The column 513 next to the block-end column 512 is the block-start column of the next display region block 503. Each column consists of an R-pixel column, a G-pixel column, and a B-pixel column. FIG. 19B further indicates the right boundary 519 and the lower boundary 518 of the display region block 503.

Figure 20:
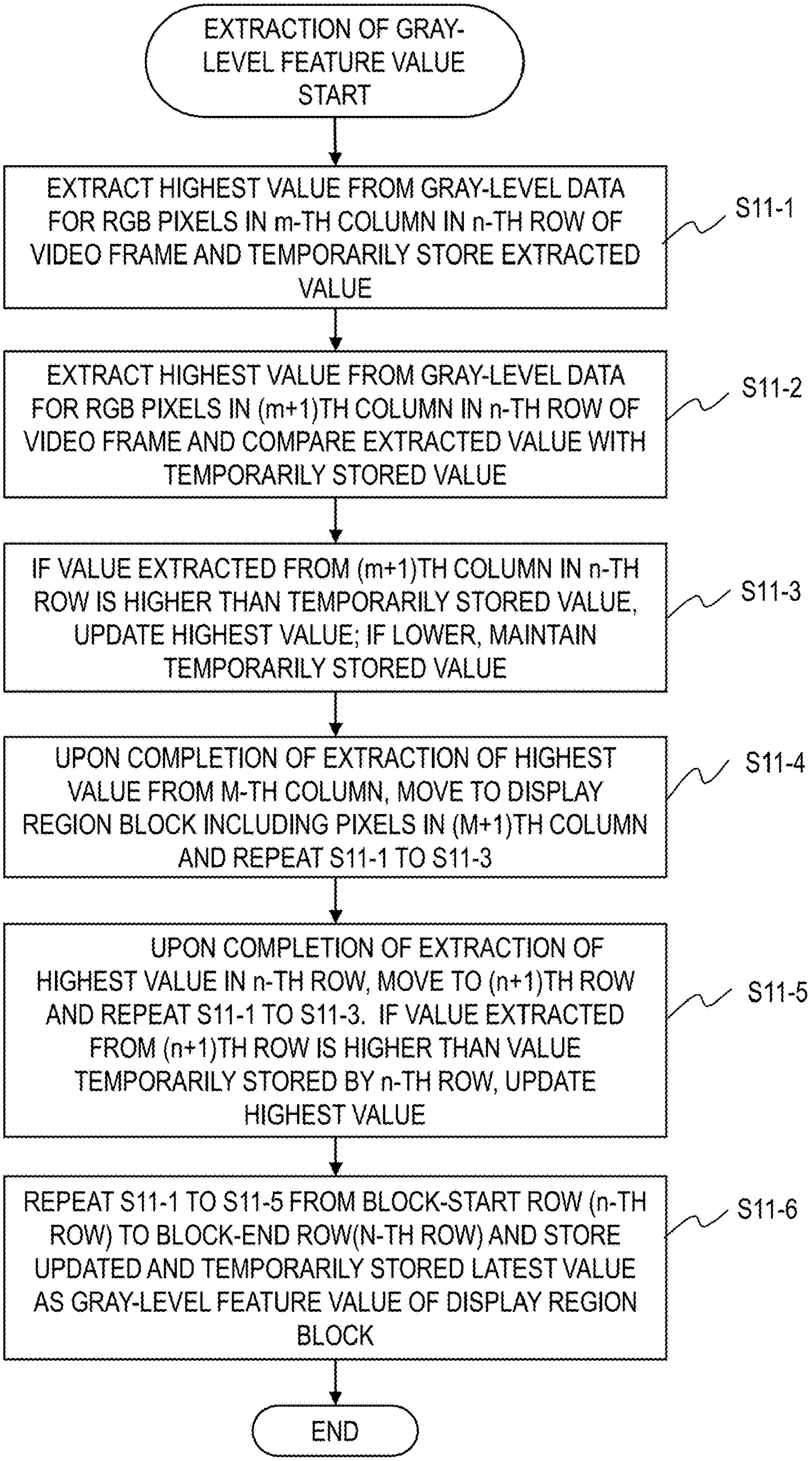
FIG. 20 is a flowchart of detailed processing of determining a gray-level feature value from a video frame.

Next, determination of a gray-scale feature value is described with reference to FIG. 20. When the liquid crystal display device 1 receives a video frame, the block emission amount determiner 202 starts extracting gray-level data from the first column in the first row of the video frame. Specifically, the block emission amount determiner 202 extracts the highest value in the gray-level data to be assigned to the RGB pixels in the first column in the first row in the target display region block, which is the gray-level data (53) for the G pixel, and temporarily stores the data (S11-1). Moving to the second column in the first row, the block emission amount determiner 202 extracts the highest value in the gray-level data to be assigned to the RGB pixels there, which is the gray-level data (53) for the G pixel, and compares the value with the highest value extracted from the first column in the first row (S11-2). In this case, the compared two highest values are the same value, the value 53 is temporarily stored as the highest gray level (S11-3).

Moving to the third column in the first row, the block emission amount determiner 202 extracts the highest value in the gray-level data to be assigned to the RGB pixels there, which is the gray-level data (70) for the G pixel (S11-1), and compares the value with the temporarily stored highest data (53) (S11-2). Since the comparison result is that the newly extracted gray level 70 is higher, the block emission amount determiner 202 updates the highest value with 70 and temporarily stores it (S11-3). The block emission amount determiner 202 repeats the foregoing processing until the block-end column (the M-th column). In the case where the extracted and temporarily stored gray-level data (70) for the G pixel of the third column in the first row is the highest value as a result of repeating the extraction of the highest value and comparison until the block-end column, this value is temporarily stored as the highest value of the first row of the display region block.

When extraction of the highest value is complete until the block-end column (the M-th column in the first row) of the target display region block, the block emission amount determiner 202 changes the target display region block to the display region block adjacent in the x-axis direction and continues the extraction of the highest value. In other words, the block emission amount determiner 202 performs the above-described processing on the RGB pixels in the block-start column ((M+1)th column) and subsequent columns in the first row and temporarily stores the highest value in the first row of each display region block (S11-4).

When extraction of the highest value is complete in the first row of the video frame, the block emission amount determiner 202 moves to extraction of gray-level data for the RGB pixels in the second row. For example, assume that the gray-level data to be assigned to the G pixel among the RGB pixels in the third column in the second row is 72 as shown in FIG. 19B. At this time, the temporarily stored highest value is 70 and the newly extracted 72 in the third column of the second row is higher.

Accordingly, the block emission amount determiner 202 updates the stored value with 72 as the highest value (S11-5). Thereafter, the block emission amount determiner 202 proceeds to the third row, the fourth row, and the subsequent rows and repeats extracting the highest value, comparing the value with the stored value, and temporarily storing the highest value.

The block emission amount determiner 202 performs extraction of the highest value until the block-end row (the N-th row) of the display region block. Assume that the value 90 is extracted as the highest value from the block-end row (the N-th row), as indicated in FIG. 19B. If the temporarily stored value by the (N−1)th row is 72, the value 90 newly extracted from the last row is higher. Accordingly, the block emission amount determiner 202 updates the highest value with 90 and temporarily stores it.

When operation of extracting the highest value is complete on one display region block, the highest value among the highest values extracted from the individual rows from the block-start row to the block-end row is acquired. The block emission amount determiner 202 stores this highest value among the highest values to the memory as the gray-level feature value (S11-6). For the video frame in FIG. 19A divided into X blocks in the x-axis direction and Y blocks in the y-axis direction, X×Y gray-level feature values are determined and stored to the memory.

The embodiments of this disclosure extract and temporarily store the highest value in the gray-level data for the RGB pixels in a row of a video frame on a block-by-block basis, and further, updates the highest value for each block row by row. Since the number of values to be stored is one per display region block, a register circuit can be used for temporary storage. Furthermore, the extraction circuit can be implemented with a memory in the amount of at least two to ten lines because the highest gray level for the RGB pixels included in a row is extracted one after another from the beginning of the video frame. Accordingly, gray-level feature values can be determined with a small-scale circuit, without using a frame memory.

Eighth Embodiment

Figure 21:
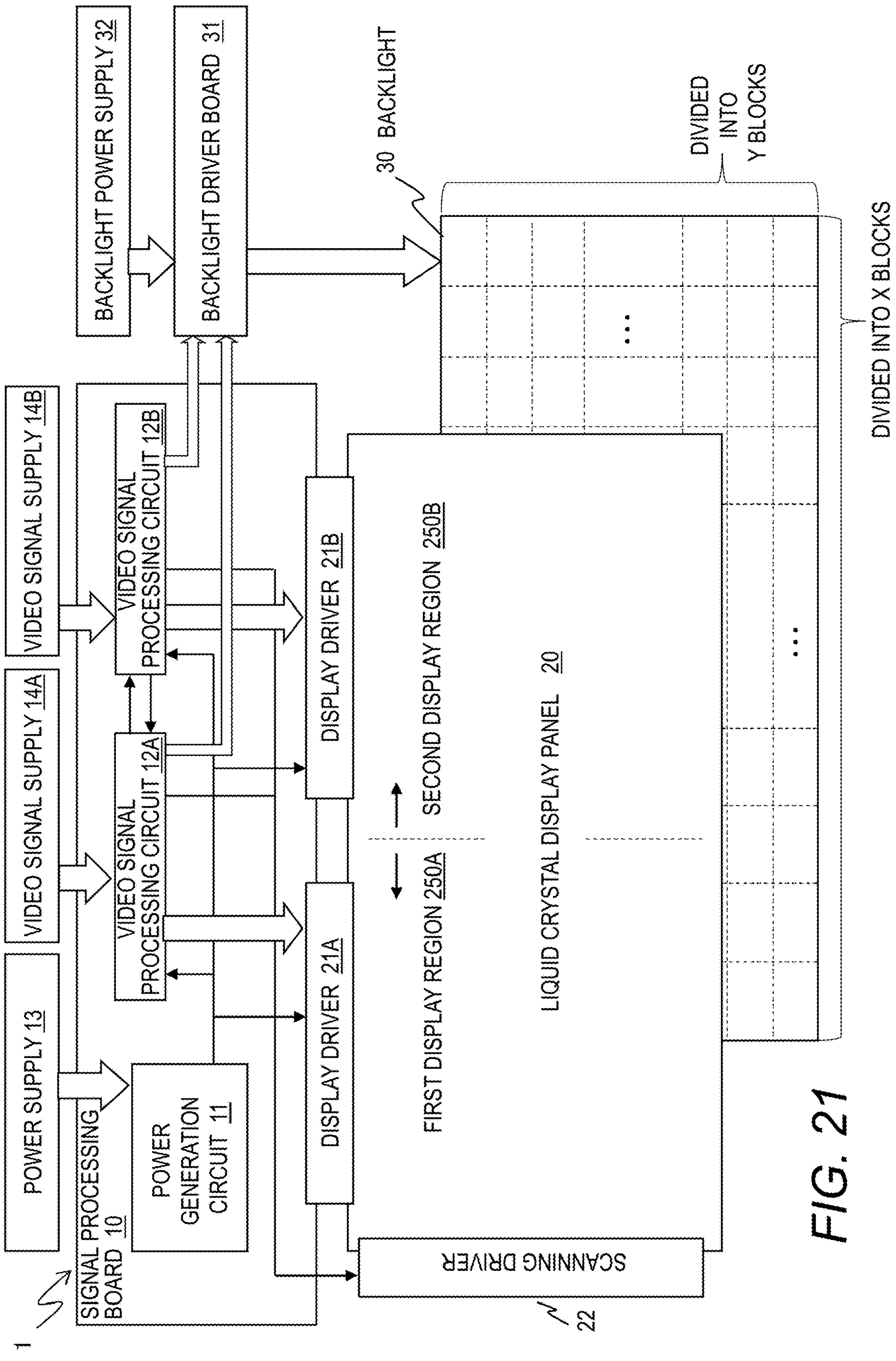
FIG. 21 illustrates another configuration example of the display device in an embodiment of this specification.

FIG. 21 illustrates another configuration example of a display device in an embodiment of this specification. The following mainly describes differences from the configuration example in FIG. 1. The liquid crystal display device 1 includes video signal supplies 14A and 14B and display drivers 21A and 21B. The signal processing board 10 includes video signal processing circuits 12A and 12B. The video signal processing circuit 12A is a first processing circuit and the video signal processing circuit 12B is a second processing circuit. This configuration can be employed when the display region is divided horizontally or vertically to be driven by different ICs because the display region has a resolution too high to be driven by one IC.

The liquid crystal display panel 20 includes a first display region 250A and a second display region 250B adjoining each other. The video signal processing circuit 12A performs processing involved in displaying a picture, such as generating a signal for displaying an image in the first display region 250A and a signal for controlling the backlight 30. The video signal processing circuit 12B performs processing involved in displaying a picture, such as generating a signal for displaying an image in the second display region 250B and a signal for controlling the backlight 30. The video signal supply 14A supplies a video signal to the video signal processing circuit 12A and the video signal supply 14B supplies a video signal to the video signal processing circuit 12B.

The display driver 21A generates a data signal from the video signal sent from the video signal processing circuit 12A and supplies the data signal to the first display region 250A. The display driver 21B generates a data signal from the video signal sent from the video signal processing circuit 12B and supplies the data signal to the second display region 250B. The video signal processing circuit 12A also sends a timing signal to the display driver 21A and the display driver 21A generates a data signal from the received video signal and supplies the data signal to the first display region 250A in accordance with the timing signal. The video signal processing circuit 12B also sends a timing signal to the display driver 21B and the display driver 21B generates a data signal from the received video signal and supplies the data signal to the second display region 250B in accordance with the timing signal.

The video signal processing circuit 12A converts the data arrangement of the video signal input from the external to send it to the display driver 21A and generates and sends a timing signal for the display driver 21A and the scanning driver 22 to operate, using the power supplied from the power generation circuit 11. The video signal processing circuit 12A further generates a driving control signal for controlling the driving of the backlight 30 and sends it to the backlight driver board 31.

The video signal processing circuit 12B converts the data arrangement of the video signal input from the external to send it to the display driver 21B and generates and sends a timing signal for the display driver 21B and the scanning driver 22 to operate, using the power supplied from the power generation circuit 11. The video signal processing circuit 12B further generates a driving control signal for controlling the driving of the backlight 30 and sends it to the backlight driver board 31.

The backlight driver board 31 includes a backlight driver circuit and controls the lighting (luminance) of the backlight 30 in accordance with the driving control signals sent from the video signal processing circuits 12A and 12B.

Each of the video signal processing circuits 12A and 12B generates a driving control signal for controlling the luminance of individual blocks of the backlight 30 and sends the driving control signal to the backlight driver board 31. The backlight driver board 31 drives and controls the light sources of the backlight 30 so that the individual blocks light at the luminance values specified in the driving control signals from the video signal processing circuits 12A and 12B.

The video signal processing circuit 12A generates a timing signal for the display driver 21A and the scanning driver 22 in accordance with the received timing signal for the video signal and also, successively sends a signal (frame signal) of each video frame in the video signal to the display driver 21A. The video signal processing circuit 12B generates a timing signal for the display driver 21B and the scanning driver 22 in accordance with the received timing signal for the video signal and also, successively sends a signal (frame signal) of each video frame in the video signal to the display driver 21B.

The video signal processing circuit 12A analyzes the video frame, generates a driving control signal for the backlight 30 to illuminate the first display region 250A from its behind based on the analysis result, and sends the driving control signal to the backlight 30. The video signal processing circuit 12B analyzes the video frame, generates a driving control signal for the backlight 30 to illuminate the second display region 250B from its behind based on the analysis result, and sends the driving control signal to the backlight 30.

Figure 22:
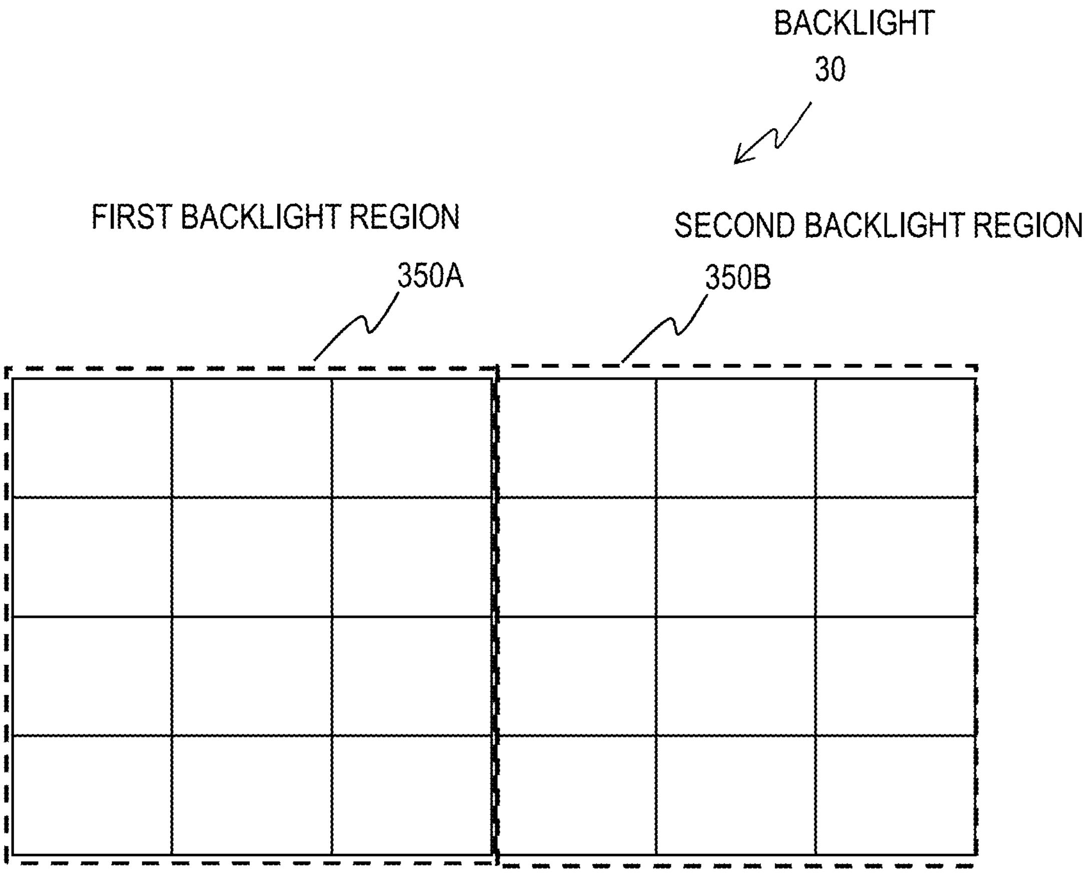
FIG. 22 schematically illustrates another configuration of a backlight.

FIG. 22 schematically illustrates the configuration of the backlight 30. The backlight 30 has a first backlight region 350A on the left and a second backlight region 350B on the right. In the example described in the following, each of the first backlight region 350A and the second backlight region 350B consists of twelve backlight blocks.

The first backlight region 350A is directly beneath the first display region 250A. The first backlight region 350A is behind and opposite the first display region 250A to illuminate the first display region 250A. The second backlight region 350B is directly beneath the second display region 250B. The second backlight region 350B is behind and opposite the first display region 250B to illuminate the second display region 250B.

The video signal processing circuit 12A determines gray-level feature values and emission amounts of individual backlight blocks in the first backlight region 350A, as described in the foregoing other embodiments. In similar, the video signal processing circuit 12B determines gray-level feature values and emission amounts of individual backlight blocks in the second backlight region 350B, as described in the foregoing other embodiments.

In this embodiment, the video signal processing circuits 12A and 12B use the same conversion function in calculating emission amounts from gray-level feature values. Specifically, the video signal processing circuits 12A and 12B selects the same conversion function in their initial states. Furthermore, the video signal processing circuits 12A and 12B determine whether to change or maintain the conversion function based on the average emission amount of the whole backlight 30 including the first backlight region 350A and the second backlight region 350B.

This configuration enables the video signal processing circuits 12A and 12B to always select the same conversion function, so that they can determine the same emission amount for the backlight blocks having the same gray-level feature value in the first backlight region 350A and the second backlight region 350B.

The video signal processing circuit 12A receives only video data for the first display region 250A and independently controls the first backlight region 350A. The video signal processing circuit 12B receives only video data for the second display region 250B and independently controls the second backlight region 350B. The video signal processing circuits 12A and 12B in this embodiment communicate information with each other so that one video signal processing circuit can determine the average of the emission amounts of the backlight blocks calculated by the other video signal processing circuit. This configuration enables the video signal processing circuits 12A and 12B to efficiently calculate the average emission amount of the whole backlight 30.

In the example described in the following, each of the average emission amount of the first backlight region 350A and the average emission amount of the second backlight region 350B is sent from the video signal processing circuit assigned the backlight region to the other video signal processing circuit. The information to be communicated between the video signal processing circuits 12A and 12B can be any information that enables one video signal processing circuit to determine the average emission amount of the backlight region assigned to the other video signal processing circuit, for example, the emission amounts of all backlight blocks in the assigned backlight region.

Each of the video signal processing circuits 12A and 12B calculates the average emission amount of the whole backlight 30 from the average emission amount of the backlight region assigned to itself and the average emission amount of the other backlight region. Furthermore, each of the video signal processing circuits 12A and 12B determines the function for determining emission amounts from gray-level feature values to be used next to the current conversion function based on the average emission amount of the whole backlight 30. As described above, the conversion function to be used is maintained or changed to a different one.

The following describes a specific example. Assume that the conversion function currently used by the video signal processing circuits 12A and 12B is the conversion function 401 in FIG. 14. The conversion function can be any other conversion function described in the other embodiments.

Figure 23:
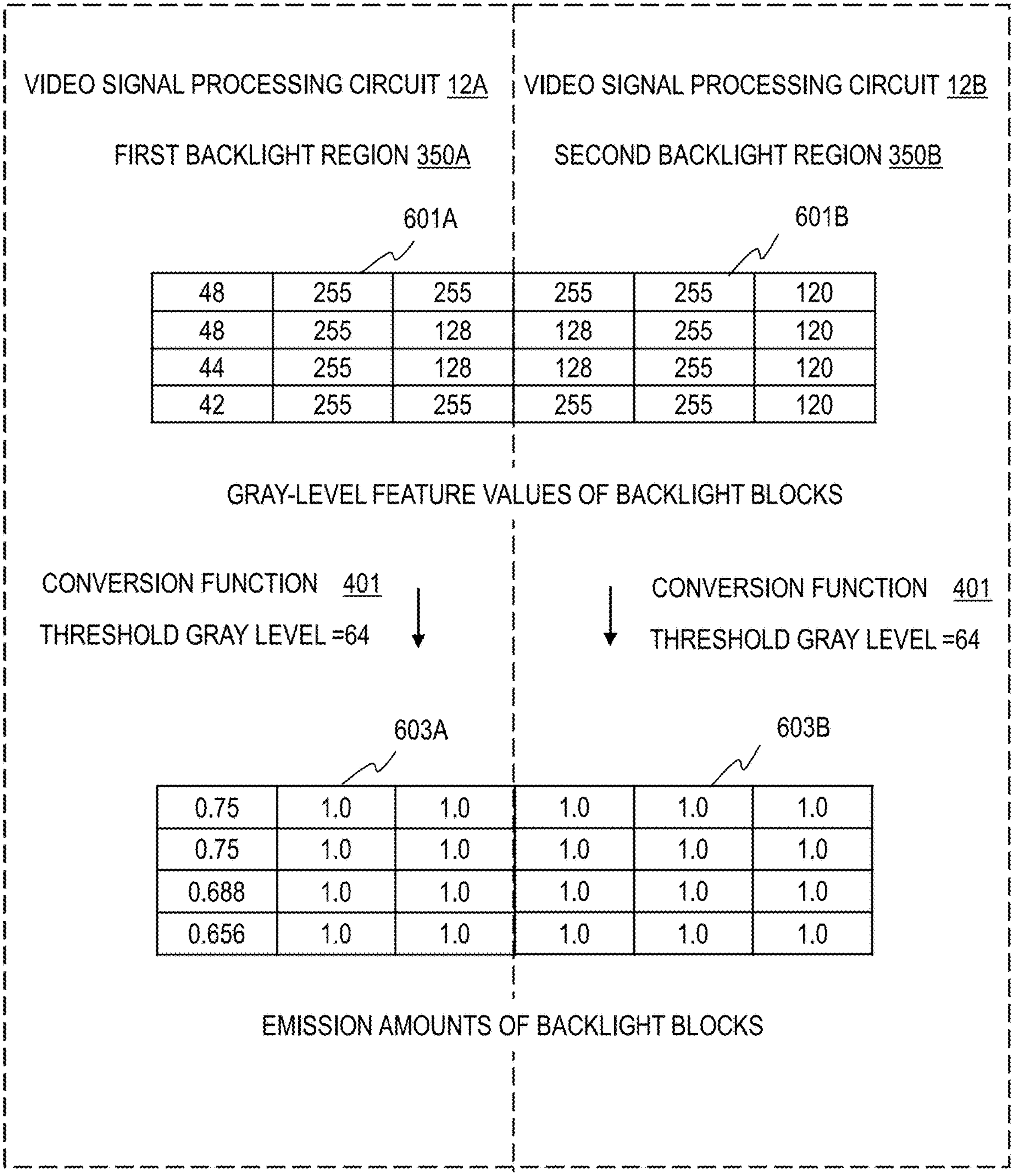
FIG. 23 illustrates an example of calculation of emission amounts from gray-level feature values of individual backlight blocks by two video signal processing circuits.

FIG. 23 illustrates an example of calculation of emission amounts from gray-level feature values of individual backlight blocks by the video signal processing circuits 12A and 12B. The video signal processing circuit 12A calculates gray-level feature values for the backlight blocks in the first backlight region 350A based on the video data acquired from the video signal supply 14A. The matrix 601A is the calculation results; the value in each cell represents the gray-level feature value of the corresponding backlight block.

In similar, the video signal processing circuit 12B calculates gray-level feature values for the backlight blocks in the second backlight region 350B based on the video data acquired from the video signal supply 14B. The matrix 601B is the calculation results; the value in each cell represents the gray-level feature value of the corresponding backlight block.

Next, the video signal processing circuit 12A calculates emission amounts 603A for the individual backlight blocks from the gray-level feature values 601A with the conversion function 401. As indicated in FIG. 14, the threshold gray level of the conversion function 401 is 64; the conversion function 401 is a linearly increasing function in the range where the gray level feature value is lower than 64 and outputs the upper limit value (1.0) in the range where the gray level feature value is not lower than 64. In similar, the video signal processing circuit 12B calculates emission amounts 603B for the individual backlight blocks from the gray-level feature values 601B with the conversion function 401.

Figure 24:
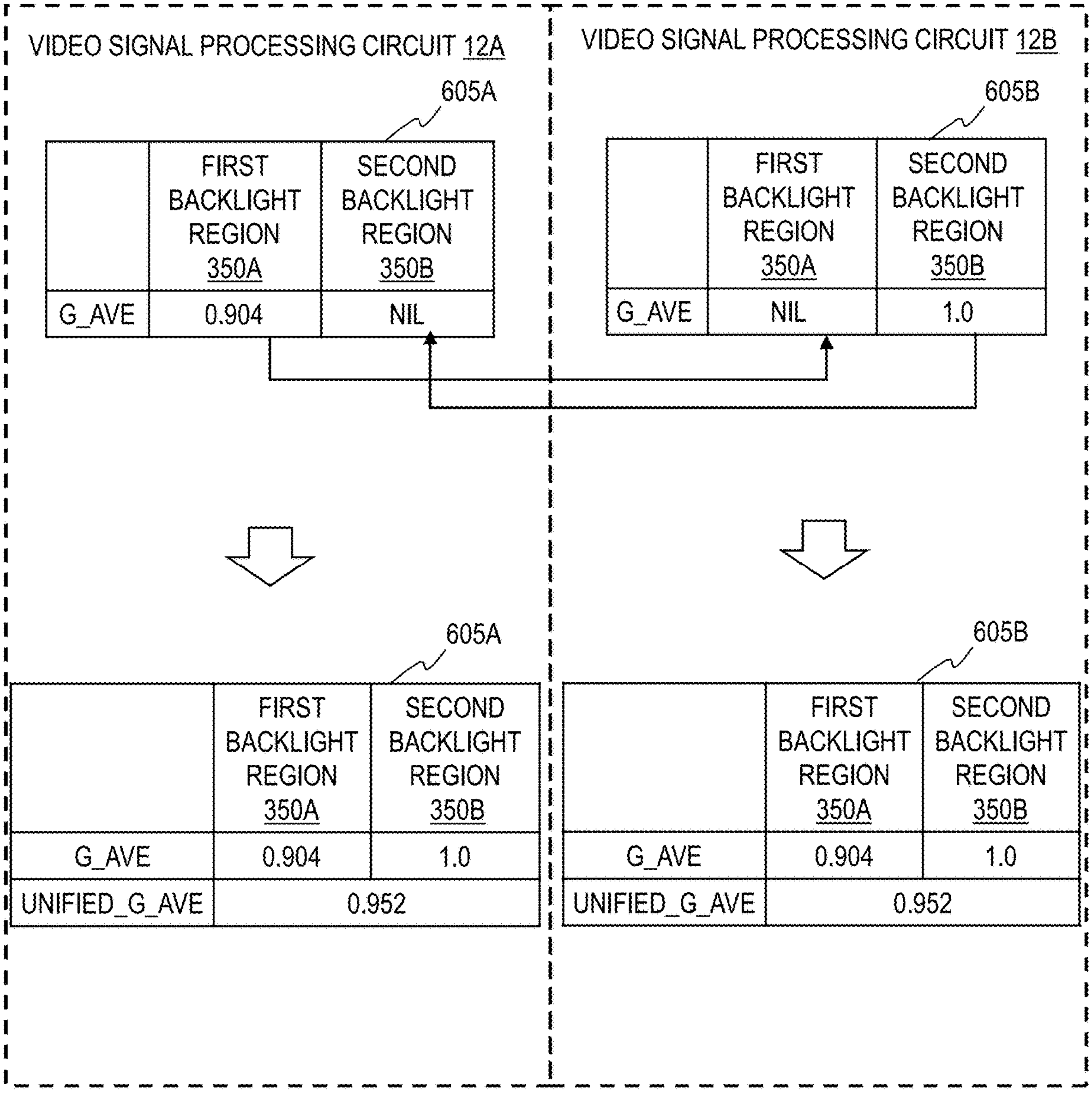
FIG. 24 illustrates calculation of an average emission amount by the two video signal processing circuits.

Next, the video signal processing circuits 12A and 12B calculate the average emission amount of the backlight 30. FIG. 24 illustrates the calculation of the average emission amount by the video signal processing circuits 12A and 12B. First, the video signal processing circuit 12A calculates the average emission amount (G_ave) of the first backlight region 350A from the emission amounts 603A for backlight blocks and includes it into its management information 605A. In this example, the value is 0.904. In similar, the video signal processing circuit 12B calculates the average emission amount (G_ave) of the second backlight region 350B from the emission amounts 603B for backlight blocks and includes it into its management information 605B. In this example, the value is 1.0.

The video signal processing circuit 12A sends the calculated average emission amount of the first backlight region 350A to the video signal processing circuit 12B. The video signal processing circuit 12B includes the received value into the management information 605B. The video signal processing circuit 12B sends the calculated average emission amount of the second backlight region 350B to the video signal processing circuit 12A. The video signal processing circuit 12A includes the received value into the management information 605A. Each of the video signal processing circuits 12A and 12B calculates the average emission amount of the whole backlight 30 from the two average emission amounts of the backlight regions 350A and 350B and includes the calculated value into its own management information 605A or 605B. In this example, the average emission amount (Unified_G_ave) of the whole backlight 30 is 0.952.

Each of the video signal processing circuits 12A and 12B determines the next conversion function based on the average emission amount of the whole backlight 30. Since the conversion function in use is common to the video signal processing circuits 12A and 12B, the next conversion function to be selected is also common to them. Hence, a common conversion function is always used for the first backlight region 350A and the second backlight region 350B, so that backlight blocks having the same gray-level feature value can be assigned the same emission amount. It is preferable that the backlight blocks having the same gray-level feature value be assigned the same emission amount because if they are assigned different emission amounts, the user feels the difference in luminance as unnaturalness of the display quality.

The following describes changes of the emission amounts of the backlight blocks in the first backlight region 350A and the second backlight region 350B in response to successive video frames of the identical gray-level data. Assume that the video signal processing circuits 12A and 12B perform the example of control illustrated in FIG. 14 and start their processing with the conversion function 401.

First, the changes of emission amounts of the backlight blocks in the first backlight region 350A are described. Steps LS1 to LS5 in the following description are executed each time a predetermined number of video frames are received, for example.

With reference to FIG. 25A, the video signal processing circuit 12A at Step LS1 determines gray-level feature values 611A for the backlight blocks in the first backlight region 350A from one received video frame. The video signal processing circuit 12A calculates emission amounts 613A for the backlight blocks in the first backlight region 350A from the gray-level feature values 611A with the conversion function 401.

The average emission amount (G_ave) of the emission amounts 613A is 0.904. As will be described later, the average emission amount (G_ave) of the second backlight region 350B is 1.0. Accordingly, the average emission amount (Unified_G_ave) of the whole backlight 30 is 0.952. This amount is more than the threshold emission amount D=0.88 in FIG. 14. Therefore, the conversion function to be used is changed from the conversion function 401 to the conversion function 404.

With reference to FIG. 25B, the gray-level feature values 611B of the video frame at Step LS2 are the same as those 611A of the video frame at Step LS1. The video signal processing circuit 12A calculates emission amounts 613B from the gray-level feature values 611B with the conversion function 404.

The average emission amount (G_ave) of the emission amounts 613B is 0.877. As will be described later, the average emission amount (G_ave) of the second backlight region 350B is 1.0. Accordingly, the average emission amount (Unified_G_ave) of the whole backlight 30 is 0.938. This amount is more than the threshold emission amount D=0.88 in FIG. 14. Therefore, the conversion function to be used is changed from the conversion function 404 to the conversion function 402.

With reference to FIG. 25C, the gray-level feature values 611C of the video frame at Step LS3 are the same as those 611B of the video frame at Step LS2. The video signal processing circuit 12A calculates emission amounts 613C from the gray-level feature values 611C with the conversion function 402.

The average emission amount (G_ave) of the emission amounts 613C is 0.856. As will be described later, the average emission amount (G_ave) of the second backlight region 350B is 1.0. Accordingly, the average emission amount (Unified_G_ave) of the whole backlight 30 is 0.928. This amount is more than the threshold emission amount D=0.88 in FIG. 14. Therefore, the conversion function to be used is changed from the conversion function 402 of the first control to the conversion function 432 of the second control.

With reference to FIG. 25D, the gray-level feature values 611D of the video frame at Step LS4 are the same as those 611C of the video frame at Step LS3. The video signal processing circuit 12A calculates emission amounts 613D from the gray-level feature values 611D with the conversion function 432.

The average emission amount (G_ave) of the emission amounts 613D is 0.845. As will be described later, the average emission amount (G_ave) of the second backlight region 350B is 0.982. Accordingly, the average emission amount (Unified_G_ave) of the whole backlight 30 is 0.914. This amount is more than the threshold emission amount D=0.88 in FIG. 14. Therefore, the conversion function to be used is changed from the conversion function 432 to the conversion function 433.

With reference to FIG. 25E, the gray-level feature values 611E of the video frame at Step LS5 are the same as those 611D of the video frame at Step LS4. The video signal processing circuit 12A calculates emission amounts 613E from the gray-level feature values 611E with the conversion function 433.

The average emission amount (G_ave) of the emission amounts 613E is 0.839. As will be described later, the average emission amount (G_ave) of the second backlight region 350B is 0.947. Accordingly, the average emission amount (Unified_G_ave) of the whole backlight 30 is 0.893. This amount is more than the threshold emission amount D=0.88 in FIG. 14. Since the emission amount at the folding point has reached the lower limit, the conversion function 433 is maintained.

Next, the changes of emission amounts of the backlight blocks in the second backlight region 350B are described. Steps RS1 to RS5 in the following description correspond to the above-described Steps LS1 to LS5.

With reference to FIG. 26A, the video signal processing circuit 12B at Step RS1 determines gray-level feature values 631A for the backlight blocks in the second backlight region 350B from one received video frame. The video signal processing circuit 12B calculates emission amounts 633A for the backlight blocks in the second backlight region 350B from the gray-level feature values 631A with the conversion function 401.

The average emission amount (G_ave) of the emission amounts 633A is 1.0. As described above, the average emission amount (G_ave) of the first backlight region 350A is 0.904. Accordingly, the average emission amount (Unified_G_ave) of the whole backlight 30 is 0.952. This amount is more than the threshold emission amount D=0.88 in FIG. 14. Therefore, the conversion function to be used is changed from the conversion function 401 to the conversion function 404.

With reference to FIG. 26B, the gray-level feature values 631B of the video frame at Step RS2 are the same as those 631A of the video frame at Step RS1. The video signal processing circuit 12B calculates emission amounts 633B from the gray-level feature values 631B with the conversion function 404.

The average emission amount (G_ave) of the emission amounts 633B is 1.0. As described above, the average emission amount (G_ave) of the first backlight region 350A is 0.877. Accordingly, the average emission amount (Unified_G_ave) of the whole backlight 30 is 0.938. This amount is more than the threshold emission amount D=0.88 in FIG. 14. Therefore, the conversion function to be used is changed from the conversion function 404 to the conversion function 402.

With reference to FIG. 26C, the gray-level feature values 631C of the video frame at Step RS3 are the same as those 631B of the video frame at Step RS2. The video signal processing circuit 12B calculates emission amounts 633C from the gray-level feature values 631C with the conversion function 402.

The average emission amount (G_ave) of the emission amounts 633C is 1.0. As described above, the average emission amount (G_ave) of the first backlight region 350A is 0.856. Accordingly, the average emission amount (Unified_G_ave) of the whole backlight 30 is 0.928. This amount is more than the threshold emission amount D=0.88 in FIG. 14. Therefore, the conversion function to be used is changed from the conversion function 402 of the first control to the conversion function 432 of the second control.

With reference to FIG. 26D, the gray-level feature values 631D of the video frame at Step RS4 are the same as those 631C of the video frame at Step RS3. The video signal processing circuit 12B calculates emission amounts 633D from the gray-level feature values 631D with the conversion function 432.

The average emission amount (G_ave) of the emission amounts 633D is 0.982. As described above, the average emission amount (G_ave) of the first backlight region 350A is 0.845. Accordingly, the average emission amount (Unified_G_ave) of the whole backlight 30 is 0.914. This amount is more than the threshold emission amount D=0.88 in FIG. 14. Therefore, the conversion function to be used is changed from the conversion function 432 to the conversion function 433.

With reference to FIG. 26E, the gray-level feature values 631E of the video frame at Step RS5 are the same as those 631D of the video frame at Step RS4. The video signal processing circuit 12B calculates emission amounts 633E from the gray-level feature values 631E with the conversion function 433.

The average emission amount (G_ave) of the emission amounts 633E is 0.947. As described above, the average emission amount (G_ave) of the first backlight region 350A is 0.839. Accordingly, the average emission amount (Unified_G_ave) of the whole backlight 30 is 0.893. This amount is more than the threshold emission amount D=0.88 in FIG. 14. Since the emission amount at the folding point has reached the lower limit, the conversion function 433 is maintained.

Comparing Steps RS1 to RS5 with Steps LS1 to LS5, the conversion functions used in processing the identical video frames are the same between each step pair. Accordingly, the emission amounts for the same gray-level feature value in different backlight regions become the same.

In the example described above, each of the display region and the backlight region is divided into two regions to be controlled by two different video signal processing circuits. In another example, the number of divisions of the display region and backlight region and the number of video signal processing circuits can be three or more. Information is communicated between the video signal processing circuits that control adjacent display regions and backlight regions. The following describes an example of control in the case where the display region and the backlight region are each divided into four regions.

Figure 27:
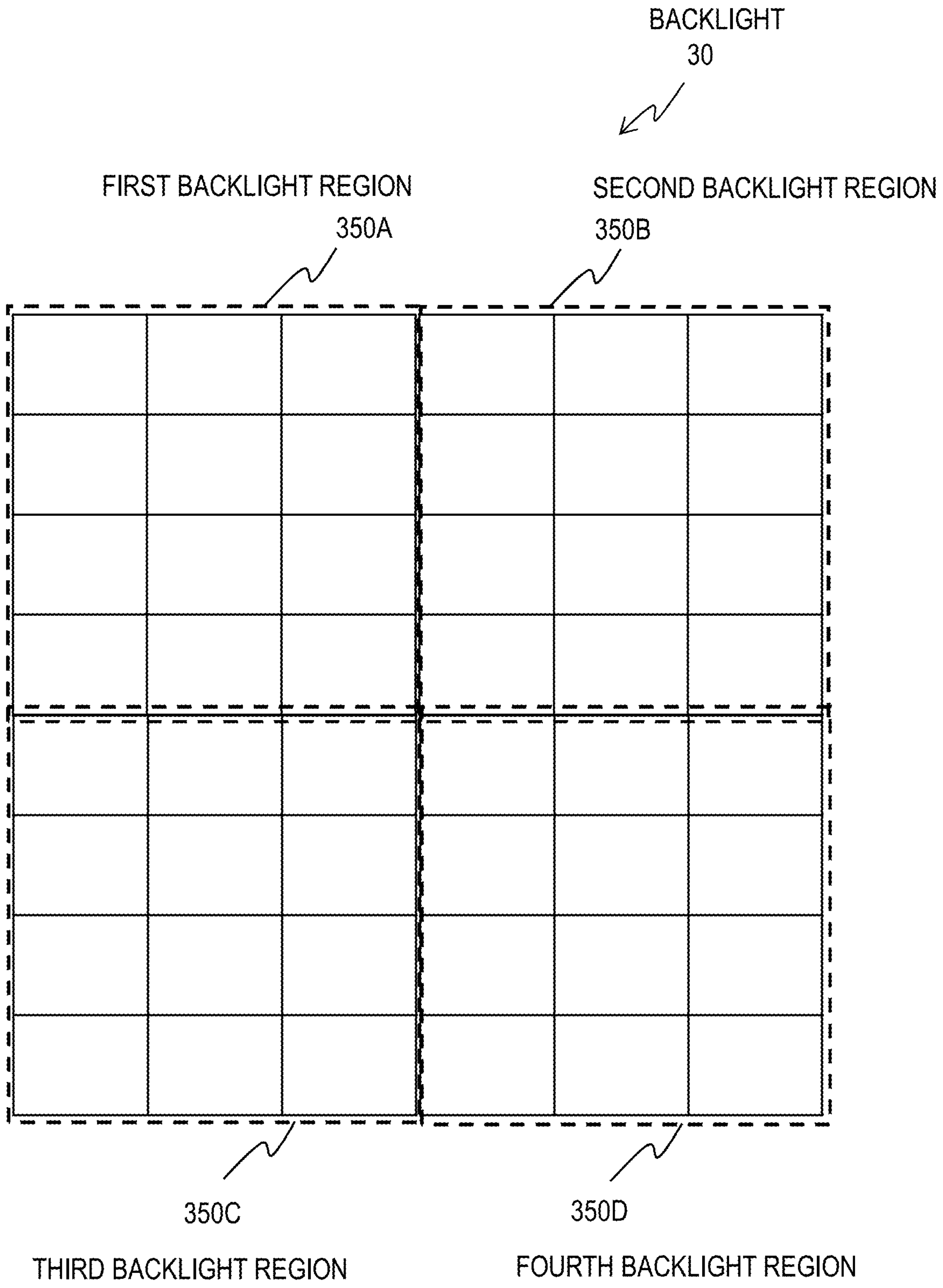
FIG. 27 schematically illustrates still another configuration of a backlight.

FIG. 27 schematically illustrates still another configuration of the backlight 30. The backlight 30 has an upper-left first backlight region 350A, an upper-right second backlight regio 350B, a lower-left third backlight region 350C, and a lower-right fourth backlight region 350D. In the example described in the following, each of the backlight regions 350A to 350D consists of twelve backlight blocks.

Each of the backlight regions 350A to 350D is directly beneath and opposite a different display region to illuminate the opposite display region. The display device includes four video signal processing circuits for controlling the four pairs of display regions and backlight regions.

Figure 28:
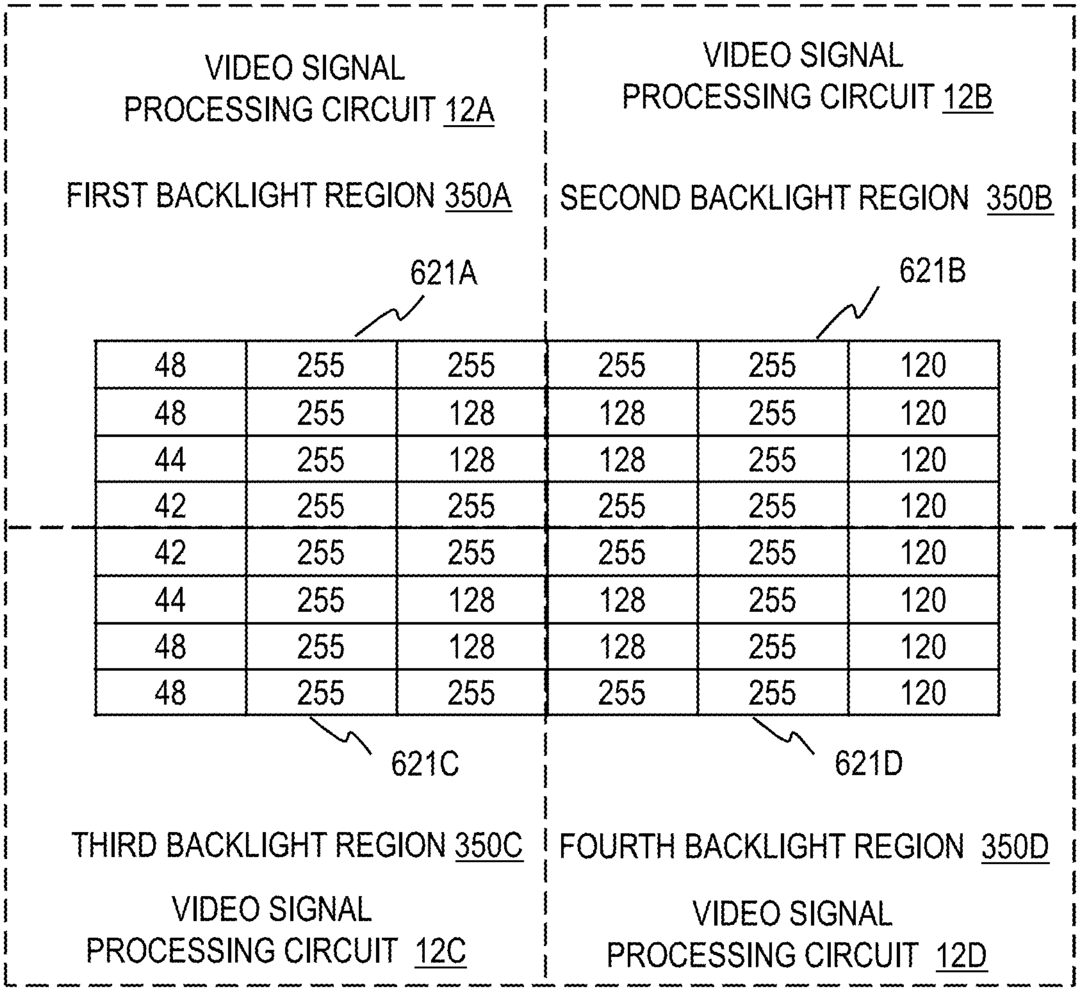
FIG. 28 provides examples of gray-level feature values of backlight blocks calculated by four video signal processing circuits.

FIG. 28 provides examples of gray-level feature values of the backlight blocks calculated by the four video signal processing circuits 12A to 12D. The video signal processing circuit 12A calculates gray-level feature values for the backlight blocks in the first backlight region 350A based on the video data acquired from the associated video signal supply. The matrix 621A is the calculation result; the value in each cell represents the gray-level feature value of the corresponding backlight block.

The video signal processing circuit 12B calculates gray-level feature values for the backlight blocks in the second backlight region 350B based on the video data acquired from the associated video signal supply. The matrix 621B is the calculation result; the value in each cell represents the gray-level feature value of the corresponding backlight block.

The video signal processing circuit 12C calculates gray-level feature values for the backlight blocks in the third backlight region 350C based on the video data acquired from the associated video signal supply. The matrix 621C is the calculation result; the value in each cell represents the gray-level feature value of the corresponding backlight block.

The video signal processing circuit 12D calculates gray-level feature values for the backlight blocks in the fourth backlight region 350D based on the video data acquired from the associated video signal supply. The matrix 621D is the calculation result; the value in each cell represents the gray-level feature value of the corresponding backlight block.

Figure 29:
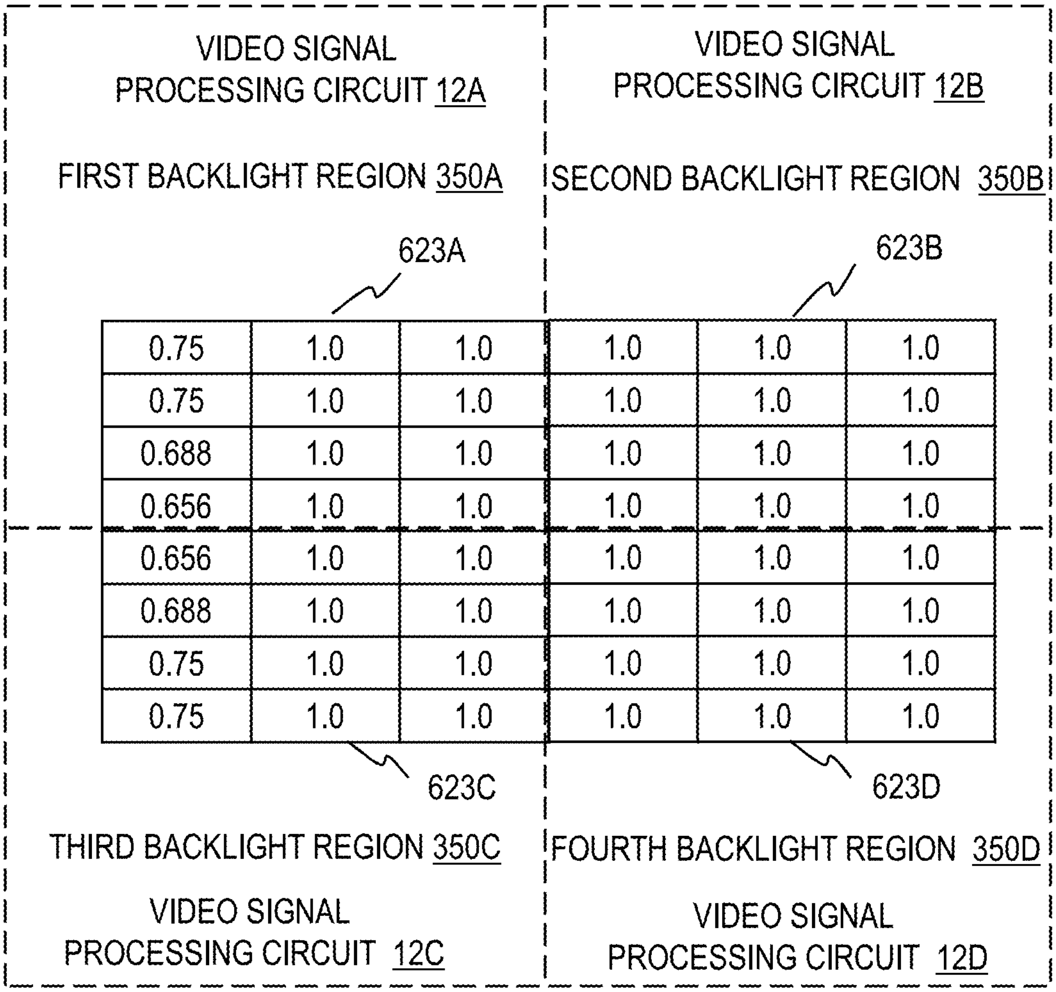
FIG. 29 provides emission amounts of the backlight blocks calculated by the four video signal processing circuits.

FIG. 29 provides emission amounts of the backlight blocks calculated by the video signal processing circuits 12A to 12D. The video signal processing circuits 12A to 12D calculate emission amounts 623A to 623D for the backlight blocks from the gray-level feature values 621A to 621D with the conversion function 401.

Next, the video signal processing circuits 12A to 12D calculate an average emission amount of the backlight 30. FIG. 30 provides average emission amounts of the backlight regions 350A to 350D calculated by the associated video signal processing circuits 12A to 12D.

The video signal processing circuit 12A calculates the average emission amount of the first backlight region 350A from the emission amounts 623A for the backlight blocks and includes it into its management information 625A. In this example, the value is 0.904. The video signal processing circuit 12B calculates the average emission amount of the second backlight region 350B from the emission amounts 623B for the backlight blocks and includes it into its management information 625B. In this example, the value is 1.0.

The video signal processing circuit 12C calculates the average emission amount of the third backlight region 350C from the emission amounts 623C for the backlight blocks and includes it into its management information 625C. In this example, the value is 0.904. The video signal processing circuit 12D calculates the average emission amount of the fourth backlight region 350D from the emission amounts 623D for the backlight blocks and includes it into its management information 625D. In this example, the value is 1.0.

Next, each of the video signal processing circuits 12A to 12D sends information on its calculated average emission amount to other video signal processing circuits. For example, the video signal processing circuits 12A and 12C communicate their information on the average emission amount and the video signal processing circuits 12B and 12D communicate their information on the average emission amount. Thereafter, the video signal processing circuits 12A and 12B communicate their information on the average emission amount and the video signal processing circuits 12C and 12D communicate their information on the average emission amount. The manner to exchange the information is not limited as far as each video signal processing circuit can acquire information on average emission amounts of all backlight regions 350A to 350D.

Figures 31, 32:
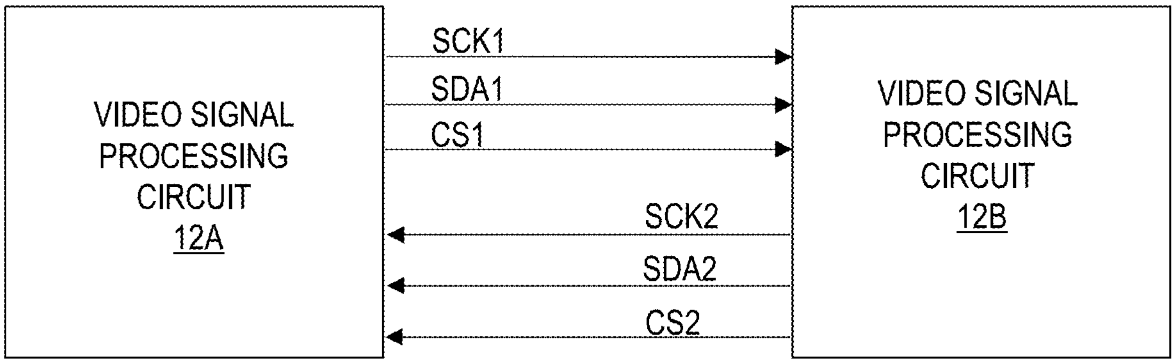
FIG. 31 provides definitive management information on the average emission amounts to be held by each of the four video signal processing circuits.
FIG. 32 illustrates examples of data to be communicated between two video signal processing circuits.

FIG. 31 provides the definitive management information on the average emission amounts to be held by each of the video signal processing circuits 12A to 12D. Since information on the average emission amounts of the backlight regions 350A to 350D is communicated among the video signal processing circuits 12A to 12D as described above, the definitive information on the average emission amounts is common to the management information of the video signal processing circuits 12A to 12D. In this example, the average emission amount (Unified_G_ave) of the whole backlight 30 is 0.952.

The video signal processing circuits 12A to 12D determine the next conversion function based on the average emission amount of the whole backlight 30. Since the conversion function in use is common to the video signal processing circuits 12A to 12D, the next conversion function to be selected is also common to them. Hence, a common conversion function is always used for all backlight regions 350A to 350D, so that backlight blocks having the same gray-level feature value can be assigned the same emission amount.

FIG. 32 illustrates examples of data to be communicated between the video signal processing circuits 12A and 12B. The following description is applicable to the communication between any two of the video signal processing circuits. The video signal processing circuit 12A sends the video signal processing circuit 12B a data signal SDA1 specifying an average emission amount using a clock signal SCK1 and a control signal CS1. The video signal processing circuit 12B sends the video signal processing circuit 12A a data signal SDA2 specifying an average emission amount using a clock signal SCK2 and a control signal CS2. For example, serial transmission can be employed for the data transmission. The signal transmission lines can be reduced by sharing one or more of the signal lines between the video signal processing circuits 12A and 12B.

Figure 33:
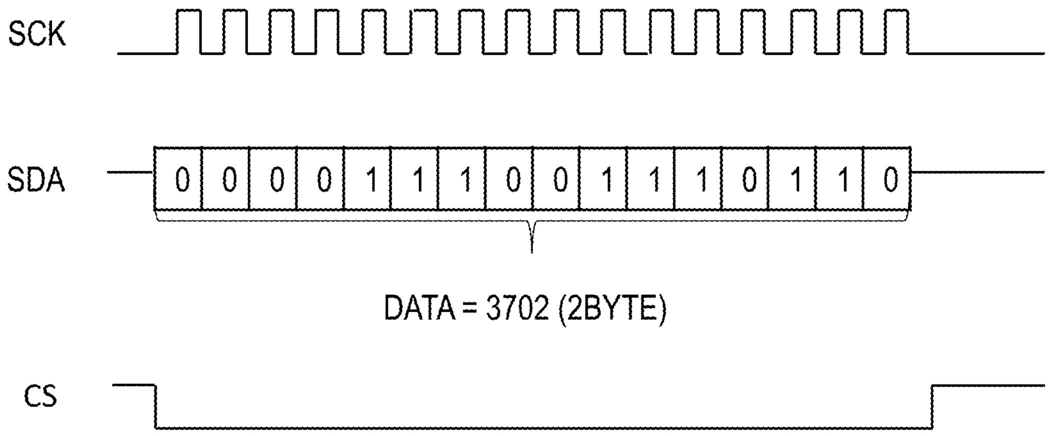
FIG. 33 illustrates examples of waveforms of a clock signal, a data signal, and a control signal.

FIG. 33 illustrates examples of waveforms of the clock signal SCK, the data signal SDA, and the control signal CS. The data signal SDA indicates the average emission amount of a backlight region (e.g., the first backlight region). Taking the example of FIG. 31, the value of G_ave "0.904" calculated by the video signal processing circuit 12A is sent by 16-bit serial transmission. For example, the value 0.904 of the average emission amount can be expressed as "3702" in 12-bit resolution.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A display device comprising:

a backlight including a plurality of backlight blocks;

a display panel configured to display an image with light from the backlight; and a controller, wherein the controller is configured to:

acquire a video frame;

determine gray-level feature values to be associated with the plurality of backlight blocks from gray levels of pixels specified in the video frame;

determine emission amounts for the plurality of backlight blocks from the gray-level feature values in accordance with a current conversion function defining a relation between gray-level feature values and emission amounts for one of the backlight blocks; and determine whether to change the current conversion function based on results of comparison of a statistic of the emission amounts of the plurality of backlight blocks with a plurality of predetermined threshold emission amounts, the predetermined threshold emission amounts including a first predetermined emission amount and a second predetermined threshold emission amount more than the first predetermined threshold emission amount.

2. The display device according to claim 1, wherein the statistic of the emission amounts is an average of the emission amounts.

3. The display device according to claim 2, wherein the current conversion function is a first conversion function or a second conversion function, wherein emission amounts in accordance with the second conversion function are equal to or less than emission amounts in accordance with the first conversion function for all of the gray-level feature values, wherein emission amounts in accordance with the second conversion function are less than emission amounts in accordance with the first conversion function for at least a partial gray-level feature value range, and wherein the controller is configured to:

use the first conversion function in a case where the average of the emission amounts is equal to or less than the first predetermined threshold emission amount, determine to maintain the current conversion function in a case where the average of the emission amounts is more than the first predetermined threshold emission amount and equal to or less than the second predetermined threshold emission amount, and use the second conversion function in a case where the average of the emission amounts is more than the second predetermined threshold emission amount for a predetermined number of times consecutively.

4. The display device according to claim 3, wherein each of the gray-level feature values is the highest gray level among gray levels of pixels associated with a backlight block, wherein the first conversion function is defined in such a manner that the emission amount monotonically increases from zero to a maximum amount in a gray-level feature value range from zero gray level to a first threshold gray level and constantly stays at the maximum amount in a gray-level feature value range higher than the first threshold gray level, wherein the second conversion function is defined in such a manner that the emission amount monotonically increases from zero to the maximum amount in a gray-level feature value range from zero gray level to a second threshold gray level and constantly stays at the maximum amount in a gray-level feature value range higher than the second threshold gray level, and wherein the second threshold gray level is higher than the first threshold gray level.

5. The display device according to claim 3, wherein the first conversion function is defined to show a minimum emission amount for a minimum gray-level feature value and a maximum emission amount for a maximum gray-level feature value, wherein the second conversion function is defined to show the minimum emission amount for the minimum gray-level feature value and the maximum emission amount for the maximum gray-level feature value, and wherein emission amounts in accordance with the second conversion function are less than emission amounts in accordance with the first conversion function in a gray-level feature value range higher than a third threshold gray level and lower than the maximum gray-level feature value.

6. The display device according to claim 3, wherein the first conversion function is defined to show a minimum emission amount for a minimum gray-level feature value and a maximum emission amount for a maximum gray-level feature value, wherein the second conversion function is defined to show the minimum emission amount for the minimum gray-level feature value and the maximum emission amount for the maximum gray-level feature value, wherein the first conversion function consists of a first linear function monotonically increasing in a gray-level feature value range from the minimum gray-level feature value to a first threshold gray level and a second linear function that is constant or monotonically increases in a gray-level feature value range from the first threshold gray level to the maximum gray-level feature value, wherein the second conversion function consists of a third linear function monotonically increasing in a gray-level feature value range from the minimum gray-level feature value to a third threshold gray level and a fourth linear function monotonically increasing in a gray-level feature value range from the third threshold gray level to the maximum gray-level feature value, wherein the third threshold gray level is lower than the first threshold gray level, wherein a slope of the third linear function is equal to or smaller than a slope of the first linear function, and wherein a slope of the fourth linear function is larger than a slope of the second linear function.

7. The display device according to claim 2, wherein the current conversion function is the first conversion function, wherein the controller is configured to:

change the current conversion function from the first conversion function to the second conversion function in a case where the average of the emission amounts is more than the second predetermined threshold emission amount for a predetermined number of times consecutively, and change the current conversion function from the second conversion function to a third conversion function in a case where the average of the emission amounts is more than the second predetermined threshold emission amount for a predetermined number of times consecutively after the current conversion function is changed to the second conversion function, wherein emission amounts in accordance with the second conversion function are equal to or less than emission amounts in accordance with the first conversion function for all gray-level feature values, wherein emission amounts in accordance with the second conversion function are less than emission amounts in accordance with the first conversion function for at least a partial gray-level feature value range, wherein emission amounts in accordance with the third conversion function are equal to or less than emission amounts in accordance with the second conversion function for all gray-level feature values, and wherein emission amounts in accordance with the third conversion function are less than emission amounts in accordance with the second conversion function for at least a partial gray-level feature value range.

8. The display device according to claim 7, wherein each of the gray-level feature values is the highest gray level among gray levels of pixels associated with a backlight block, wherein the first conversion function is defined in such a manner that the emission amount monotonically increases from zero to a maximum amount in a gray-level feature value range from zero gray level to a fourth threshold gray level and constantly stays at the maximum amount in a gray-level feature value range higher than the fourth threshold gray level, wherein the second conversion function is defined in such a manner that the emission amount monotonically increases from zero to the maximum amount in a gray-level feature value range from zero gray level to a fifth threshold gray level and constantly stays at the maximum amount in a gray-level feature value range higher than the fifth threshold gray level, wherein the fifth threshold gray level is higher than the fourth threshold gray level, wherein the third conversion function is defined in such a manner that the emission amount monotonically increases from zero to the maximum amount in a gray-level feature value range from zero gray level to a sixth threshold gray level and constantly stays at the maximum amount in a gray-level feature value range higher than the sixth threshold gray level, and wherein the sixth threshold gray level is higher than the fifth threshold gray level.

9. The display device according to claim 7, wherein each of the gray-level feature values is the highest gray level among gray levels of pixels associated with a backlight block, wherein the first conversion function is defined to show a minimum emission amount for a minimum gray-level feature value and a maximum emission amount for a maximum gray-level feature value, wherein the second conversion function is defined to show the minimum emission amount for the minimum gray-level feature value and the maximum emission amount for the maximum gray-level feature value, wherein the third conversion function is defined to show the minimum emission amount for the minimum gray-level feature value and the maximum emission amount for the maximum gray-level feature value, wherein emission amounts in accordance with the second conversion function are less than emission amounts in accordance with the first conversion function in a gray-level feature value range higher than a seventh threshold gray level and lower than the maximum gray-level feature value, wherein emission amounts in accordance with the third conversion function are less than emission amounts in accordance with the second conversion function in a gray-level feature value range higher than an eighth threshold gray level and lower than the maximum gray-level feature value, and wherein the eighth threshold gray level is lower than the seventh threshold gray level.

10. The display device according to claim 7, wherein each gray-level feature value is the highest gray level among gray levels of pixels associated with a backlight block, wherein the first conversion function is defined in such a manner that the emission amount monotonically increases from zero to a maximum amount in a gray-level feature value range from zero gray level to a ninth threshold gray level and constantly stays at the maximum amount in a gray-level feature value range higher than the ninth threshold gray level, wherein the second conversion function is defined in such a manner that the emission amount monotonically increases from zero to the maximum amount in a gray-level feature value range from zero gray level to a tenth threshold gray level and constantly stays at the maximum amount in a gray-level feature value range higher than the tenth threshold gray level, wherein the tenth threshold gray level is higher than the ninth threshold gray level, wherein the third conversion function is defined to show zero emission amount for zero gray-level feature value and the maximum emission amount for a maximum gray-level feature value, wherein emission amounts in accordance with the third conversion function are less than emission amounts in accordance with the second conversion function in a gray-level feature value range higher than an eleventh threshold gray level and lower than the maximum gray-level feature value, and wherein the eleventh threshold gray level is lower than the tenth threshold gray level.

11. The display device according to claim 2, wherein the current conversion function is a first conversion function or a second conversion function, wherein emission amounts in accordance with the second conversion function are equal to or less than emission amounts in accordance with the first conversion function for all of the gray-level feature values, wherein emission amounts in accordance with the second conversion function are less than emission amounts in accordance with the first conversion function for at least a partial gray-level feature value range, and wherein the controller is configured to:

use the first conversion function in a case where the average of the emission amounts is equal to or less than the first predetermined threshold emission amount for a predetermined number of times consecutively, determine to maintain the current conversion function in a case where the average of the emission amounts is more than the first predetermined threshold emission amount and equal to or less than the second predetermined threshold emission amount, and use the second conversion function in a case where the average of the emission amounts is more than the second predetermined threshold emission amount.

12. The display device according to claim 1, wherein the controller includes a plurality of processing circuits, wherein each of the plurality of processing circuits is configured to control a different backlight region of the backlight opposite a different display region of the display panel, and wherein each of the plurality of processing circuits is configured to:

determine a statistic of emission amounts for backlight blocks of a backlight region assigned to control, acquire information for determining statistics of emission amounts for backlight blocks of the backlight regions other than the assigned backlight region from one or more of the other processing circuits, determine a statistic of emission amounts for all backlight blocks of the backlight from the statistics of the emission amounts for the backlight blocks of the assigned backlight region and the backlight regions other than the assigned backlight region, and determine whether to change the current conversion function based on results of comparison of the statistic of the emission amounts for all backlight blocks of the backlight with the predetermined threshold emission amounts.

13. The display device according to claim 12, wherein each of the plurality of processing circuits is configured to receive the statistics of emission amounts for the backlight blocks in the backlight regions other than the assigned backlight region sent from the one or more of the other processing circuits by serial transmission.

14. A method of controlling a backlight of a display device, the backlight including a plurality of backlight blocks, the method comprising:

acquiring a video frame;

determining gray-level feature values to be associated with the plurality of backlight blocks from gray levels of pixels specified in the video frame;

determining emission amounts for the plurality of backlight blocks from the gray-level feature values in accordance with a current conversion function defining a relation between gray-level feature values and emission amounts for one of the backlight blocks; and determining whether to change the current conversion function based on results of comparison of a statistic of the emission amounts of the plurality of backlight blocks with a plurality of predetermined threshold emission amounts, the predetermined threshold emission amounts including a first predetermined threshold emission amount and a second predetermined threshold emission amount more than the first predetermined threshold emission amount.

* * * * *